(12) United States Patent
Maeda et al.

(10) Patent No.: US 9,320,016 B2
(45) Date of Patent: Apr. 19, 2016

(54) COMMUNICATION SYSTEM

(75) Inventors: Miho Maeda, Tokyo (JP); Mitsuru Mochizuki, Tokyo (JP); Yasushi Iwane, Tokyo (JP); Takayuki Nonami, Tokyo (JP); Taisei Suemitsu, Tokyo (JP); Yuichi Nakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/877,302

(22) PCT Filed: Sep. 27, 2011

(86) PCT No.: PCT/JP2011/071980
§ 371 (c)(1),
(2), (4) Date: Apr. 1, 2013

(87) PCT Pub. No.: WO2012/043523
PCT Pub. Date: Apr. 5, 2012

(65) Prior Publication Data
US 2013/0182632 A1 Jul. 18, 2013

(30) Foreign Application Priority Data
Oct. 1, 2010 (JP) .................................. 2010-223641

(51) Int. Cl.
*H04W 72/00* (2009.01)
*H04W 68/00* (2009.01)
*H04W 28/10* (2009.01)
*H04W 28/02* (2009.01)
*H04W 4/00* (2009.01)
(Continued)

(52) U.S. Cl.
CPC ............ *H04W 72/005* (2013.01); *H04W 4/005* (2013.01); *H04W 28/0205* (2013.01); *H04W 28/10* (2013.01); *H04W 72/1263* (2013.01); *H04W 84/045* (2013.01)

(58) Field of Classification Search
CPC ... H04W 72/005; H04W 72/04; H04W 28/10; H04W 4/00; H04W 40/00; H04W 68/00; H04W 4/005; H04W 28/0205; H04W 72/1263; H04W 84/045
USPC .......................................... 370/312, 328, 466
See application file for complete search history.

(56) References Cited

U.S. PATENT DOCUMENTS 6,665,280 B2 * 12/2003 Forssell et al. ................ 370/329
2011/0299492 A1 * 12/2011 Lee et al. ...................... 370/329
(Continued)

OTHER PUBLICATIONS

NEC, Potential of Bulk Signalling in Overload Control, 3GPP TSG SA WG2 Meeting #79E (Electronic), Jul. 6-13, 2010, Elbonia, 3GPP TD S2-103186.*

(Continued)

*Primary Examiner* — Chi H Pham
*Assistant Examiner* — Shailendra Kumar
(74) *Attorney, Agent, or Firm* — Oblon, McClelland, Maier & Neustadt, L.L.P.

(57) ABSTRACT

A communication system in which when judging to have received an RRC message from a communication terminal device, a base station device, for example, HeNB checks an MTCD indicator to be mapped to the received RRC message. Then, when judging that the UE that has transmitted the RRC message received is an MTCD being a device for machine type communication (MTC) from the checked MTCD indicator, the HeNB performs a concentration process on the data from the MTCD to the core network.

4 Claims, 44 Drawing Sheets

(51) Int. Cl.
    *H04W 72/12* (2009.01)
    *H04W 84/04* (2009.01)

(56) References Cited

U.S. PATENT DOCUMENTS

2012/0039253 A1* 2/2012 Wang ............... H04W 72/1263
                                                        370/328
2013/0051228 A1* 2/2013 Kim ..................... H04W 4/005
                                                        370/230

OTHER PUBLICATIONS

3rd Generation Partnership Project; Technical Specification Group Radio Access Network; Evolved Universal Terrestrial Access Network (E-UTRAN); S1 General aspects and principles (Release 8), Dec. 2007, 3GPP TS 36.410 V8.0.0 (Dec. 2007).*
NEC, Potential of Bulk Signalling in Overload Control, 3GPP TSG SA WG2 Meeting #79E (Electronic), Jul. 6-13, 2010, Elbonia, TD S2-103186.*
3GPP TSG SA WG2 Meeting #79E (Electronic), "Potential of Bulk Signalling in Overload Control," NEC, TD S2-103186, SA WG2 Temporary Document, MTC / Rel. 10, Total 2 pages, (Jul. 6, 2010).
3GPP TS 36.300 V10.0.0, "$3^{rd}$ Generation Partnership Project; Technical Specification Group Radio Access Network; Evolved Universal Terrestrial Radio Access (E-UTRA) and Evolved Universal Terrestrial Radio Access Network (E-UTRA); Overall description; State 2 (Release 10)" Total 183 pages, (Jun. 2010).
3GPP TS 36.331 V9.3.0, 3rd Generation Partnership Project; Technical Specification Group Radio Access Network; Evolved Universal Terrestrial Radio Access (E-UTRA); Radio Resource Control (RRC); Protocol specification (Release 9), Total 250 pages, (Jun. 2010).
3GPP TS 36.304 V9.3.0, "$3^{rd}$ Generation Partnership Project; Technical Specification Group Radio Access Network; Evolved Universal Terrestrial Radio Access (E-UTRA); User Equipment (UE) procedures in idle mode (Release 9)," Total 32 pages, (Jun. 2010).
3GPP TSG-SA1 #42, S1-083461, "LS on HNB/HeNB Open Access Mode," 3GPP SA WG1, Rel-9, Total 2 pages, (Oct. 13-17, 2008).
3GPP TSG-RAN WG 2 meeting # 62, R2-082899, "LS on CSG cell identification," Qualcomm Proprietary and Confidential, RAN2, Total pp. 2, (May 5-9, 2008).
3GPP TR 36.814 V9.0.0, $3^{rd}$ Generation Partnership Project; Technical Specification Group Radio Access Network; Evolved Universal Terrestrial Radio Access (E-UTRA); Further advancement for E-UTRA physical layer aspects (Release 9), Total 105 pages, (Mar. 2010).
3GPP TR 36.912, V9.0.0, $3^{rd}$ Generation Partnership Project; Technical Specification Group Radio Access Network; Feasibility study for Further Advancements for E-UTRA (LTE-Advanced) (Release 9), Total 256 pages, (Sep. 2009).
3GPP TS 22.368 V2.0.0, "$3^{rd}$ Generation Partnership Project; Technical Specification Group Services and System Aspects; Service requirements for macine-type communications; Stage 1, (Release 10)," Total 22 Pages, (Mar. 2010).
3GPP TSG-RAN WG3 Meeting #66bis, R3-100315, "MTC Features, RAN Enhancements and Related Procedures,", CMCC, Total 3 pages, (Jan. 18-22, 2010).
3GPP TSG SA WG2 Meeting # 78, TD S2-101008, "Network Based Optimization Solution for Smart Metering Support in 3GPP System," InterDigital Communication Corporation, NIMTC / Rel-10, Total 5 pages, (Feb. 22-26, 2010).
3GPP TSG-RAN WG2 #70, R2-103269, "Modifications to RACH Intensity of Smart Meters in TR 37.868," Institute for Information Industry (III), CHTTL, Coiler Corporation, Total 8 pages, (May 10-14, 2010).
3GPP TS 23.401, V1.0.0, "$3^{rd}$ Generation Partnership Project; Technical Specification Group Services and System Aspects; GPRS enhancements for E-UTRAN access (Release 8)," Global System for Mibile Communiations, Total 50 pages, (May 2007).
3GPP TS 36.413, V9.3.0, $3^{rd}$ Generation Partnership Project; Technical Specification Group Radio Access Network; Evolved Universal Terrestrial Radio Access Network (E-UTRAN); S1 Application Protocol (S1AP) (Release 9), Total 240 Pages, (Jun. 2010).
3GPP TR 23.888 V0.5.1, "$3^{rd}$ Generation Partnership Project; Technical Specification Group Services and System Aspects; System Improvements for Machine-Type Communications; (Release 10)," Total 75 Pages, (Jul. 2010).
3GPP TS 36.321 V9.3.0, $3^{rd}$ Generation Partnership Project; Technical Specification Group Radio Access Network; Evolved Universal Terrestrial Radio Access (E-UTRA); Medium Access Control (MAC) protocol specificatin (Release 9), Total 48 pages, (Jun. 2010).
International Preliminary Report on Patentability Issued Nov. 22, 2011 in PCT/JP11/71980 Filed Sep. 27, 2011 (with English translation).
International Search Report Issued Dec. 6, 2011 in PCT/JP11/71980 Filed Sep. 27, 2011.
Supplementary European Search Report issued Feb. 16, 2016 in European Patent Application No. 11829076.6.
Sierra Wireless, "Broadcasting MTC Group Access Control for Overload Control", 3GPP TSG SA WG2 Meeting #79, May 10-14, 2010, Kyoto, Japan; TD S2-102320, XP050434509, pp. 1-5.
LG Electronics, Inc., "Overload control for MTC in Geran", 3GPP TSG-GERAN#46, May 17-21, 2010, Jeju, South Korea; GP100716, XP050417151, pp. 1-7.
HTC, "Conclusion on time-controlled solution for overload/congestion situations", 3GPP TSG SA WG2 Meeting #80, Aug. 30-Sep. 3, 2010, Brunstad, Norway; TD S2-103430, XP050458489, pp. 1-8.
Huawei, China Unicom, "Pull based RAN overload control", 3GPP TSG-RAN WG2 Meeting #71, Aug. 23-Aug. 27, 2010, Madrid, Spain; R2-104870, XP050451998, pp. 1-4.
"$3^{rd}$ Generation Partnership Project; Technical Specification Group Services and System Aspects; System Improvements for Machine-Type Communications; (Release 10)", 3GPP TR 23.888 V1.0.0, Jul. 2010, XP050442131, pp. 1-80.

* cited by examiner

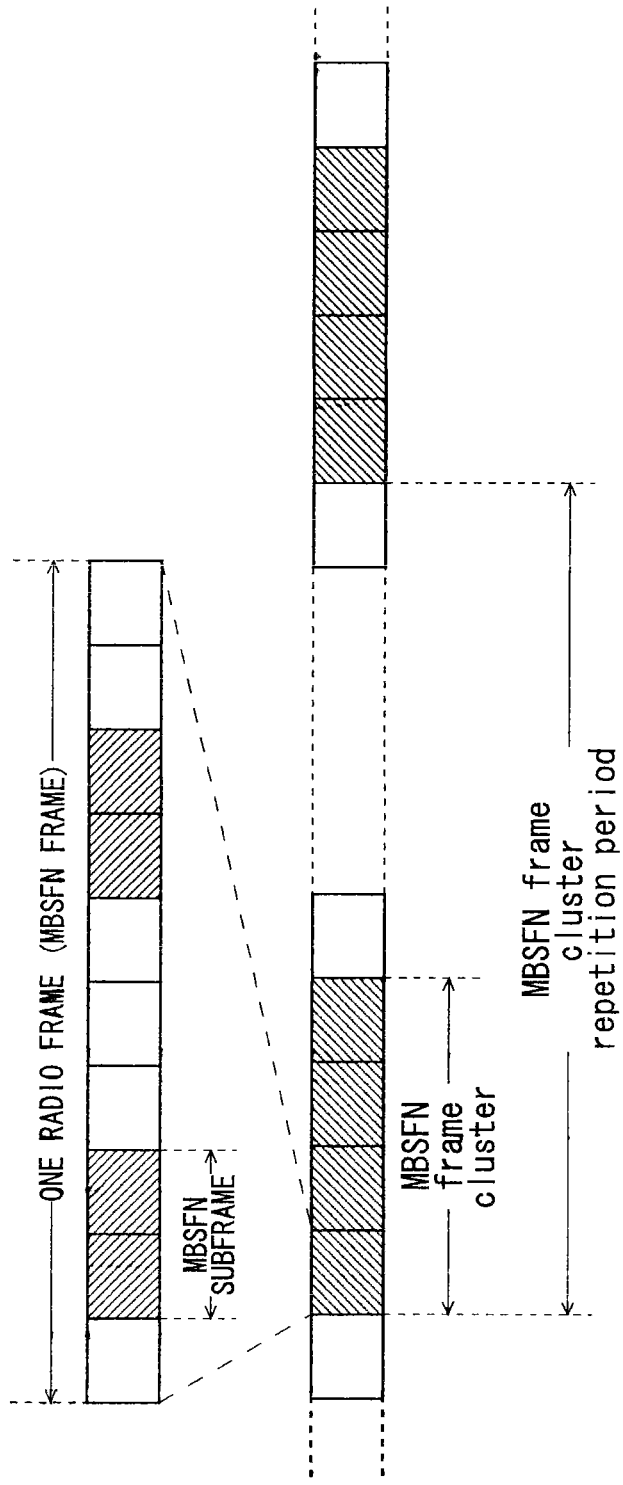

F I G . 5
(A)
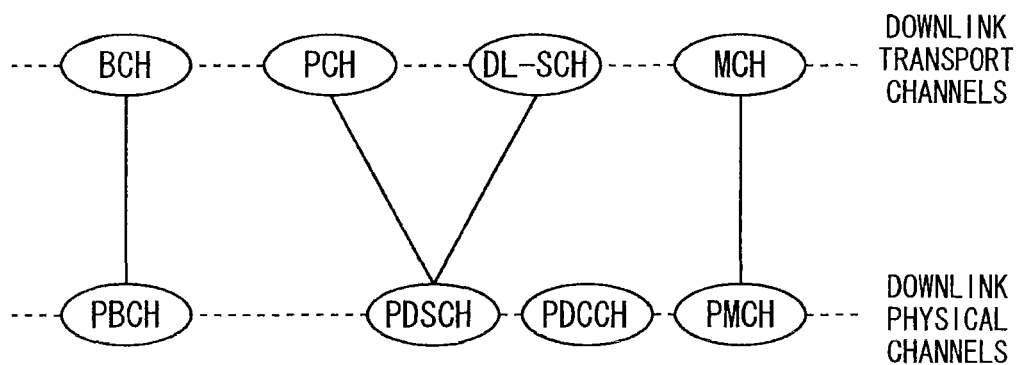
(B)
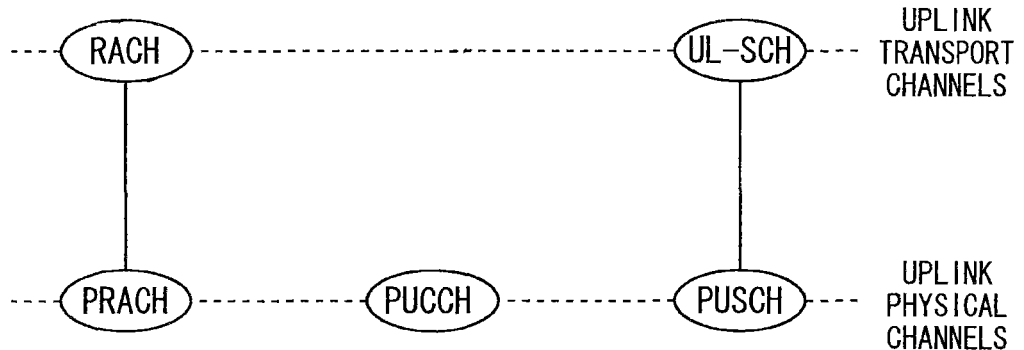

FIG. 6
(A)
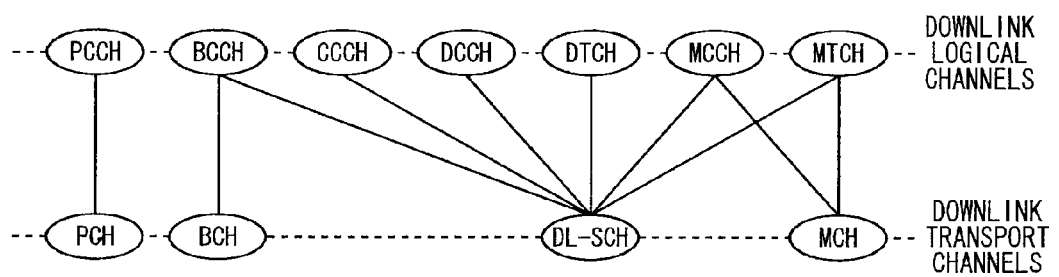
(B)
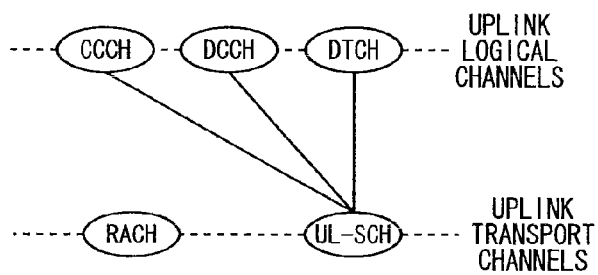

F I G. 1 0
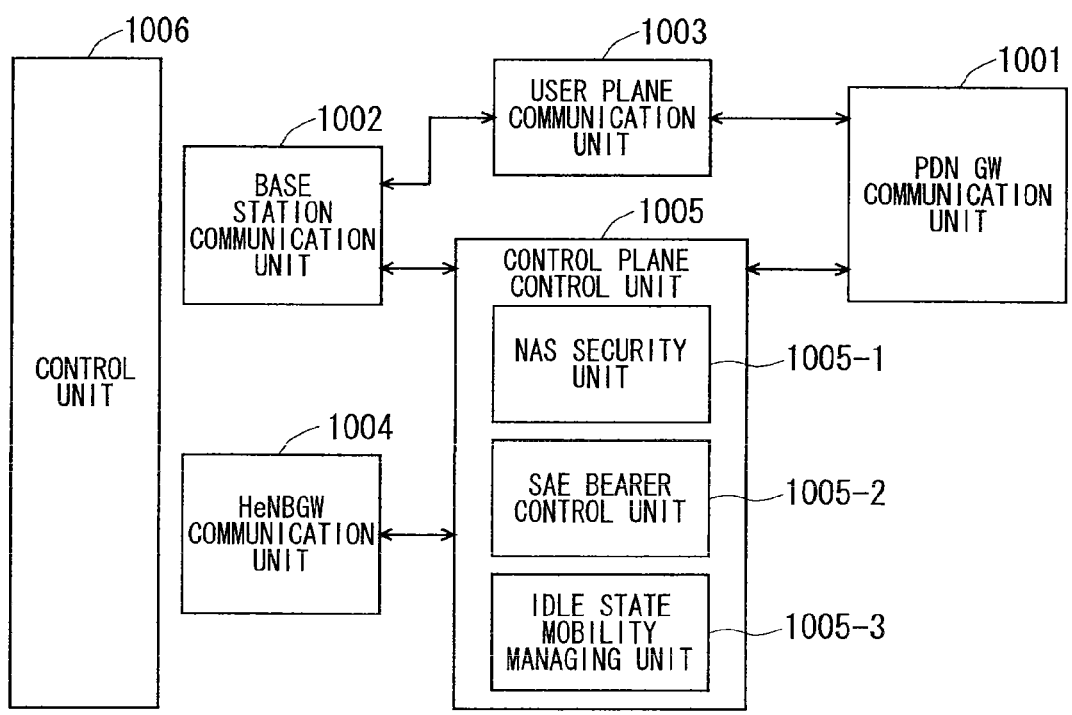

F I G. 1 1
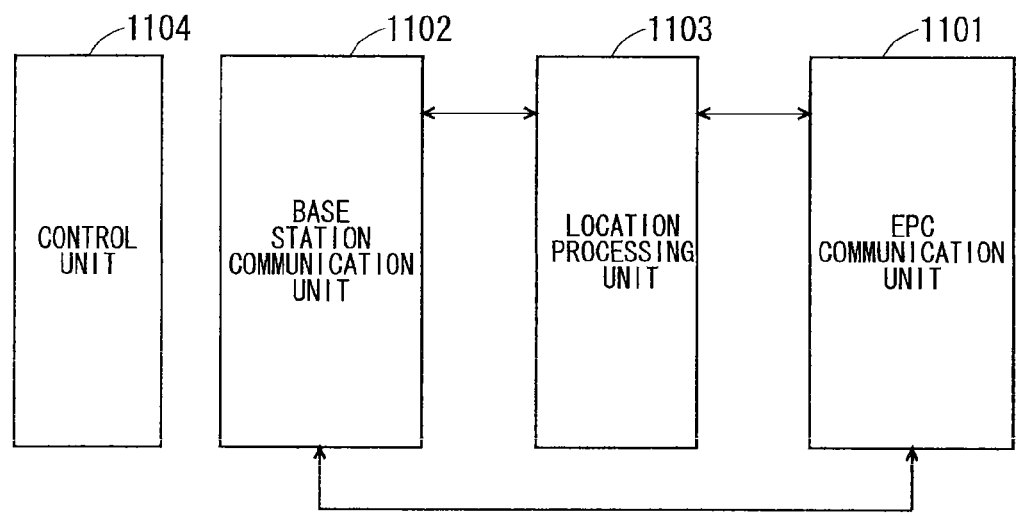

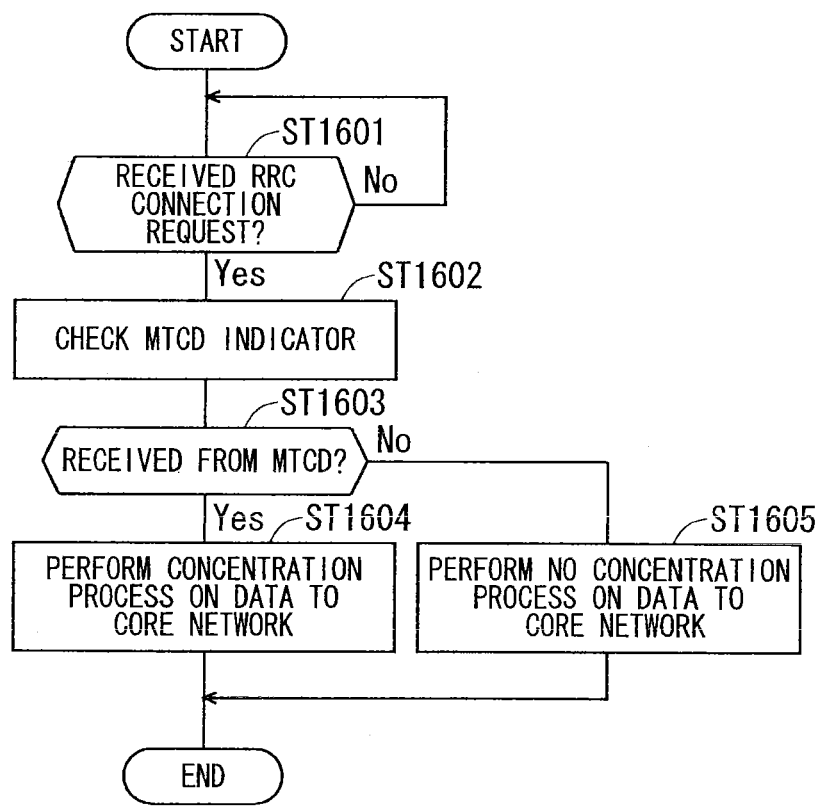
F I G. 1 6

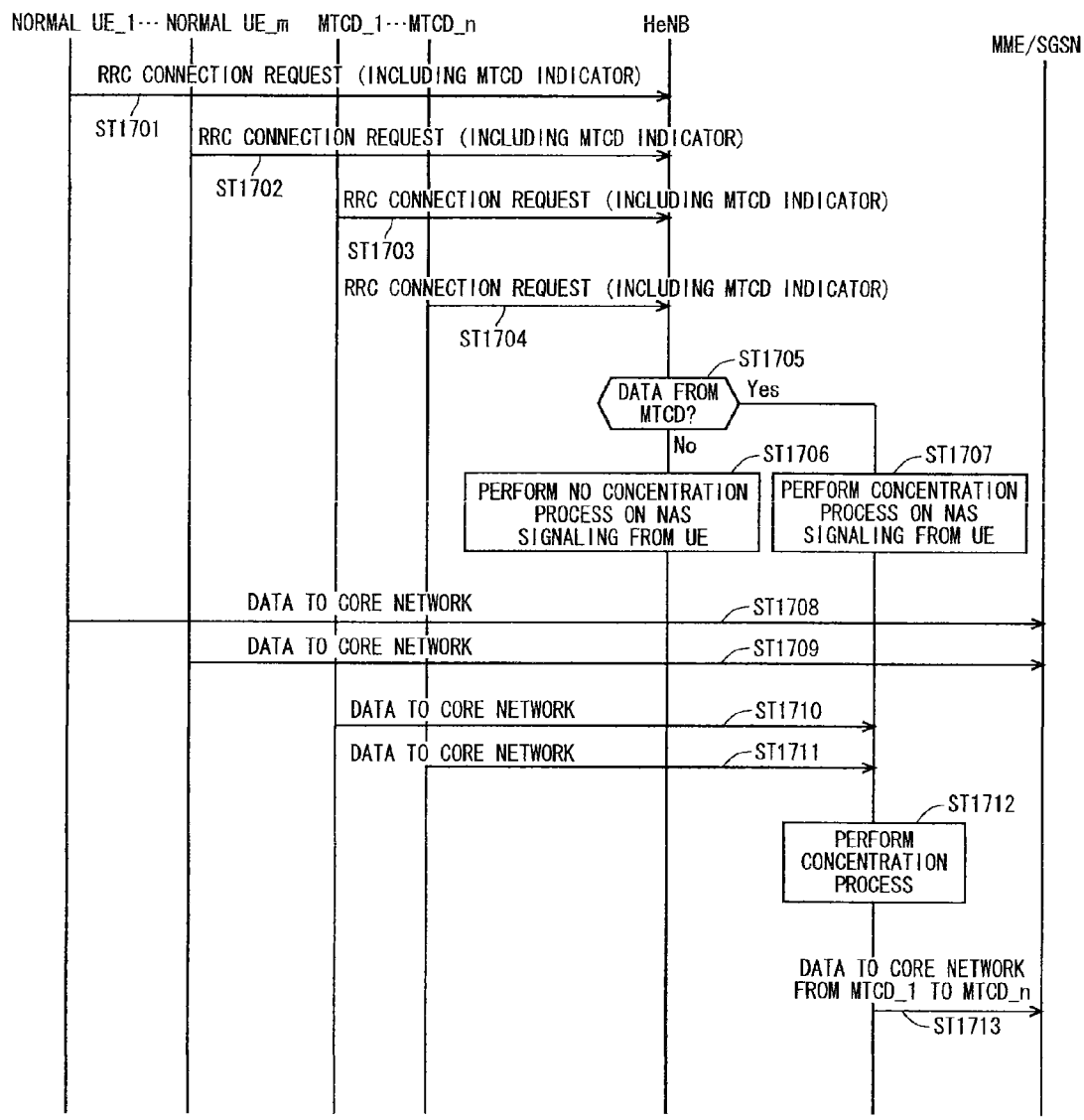

F I G . 1 8
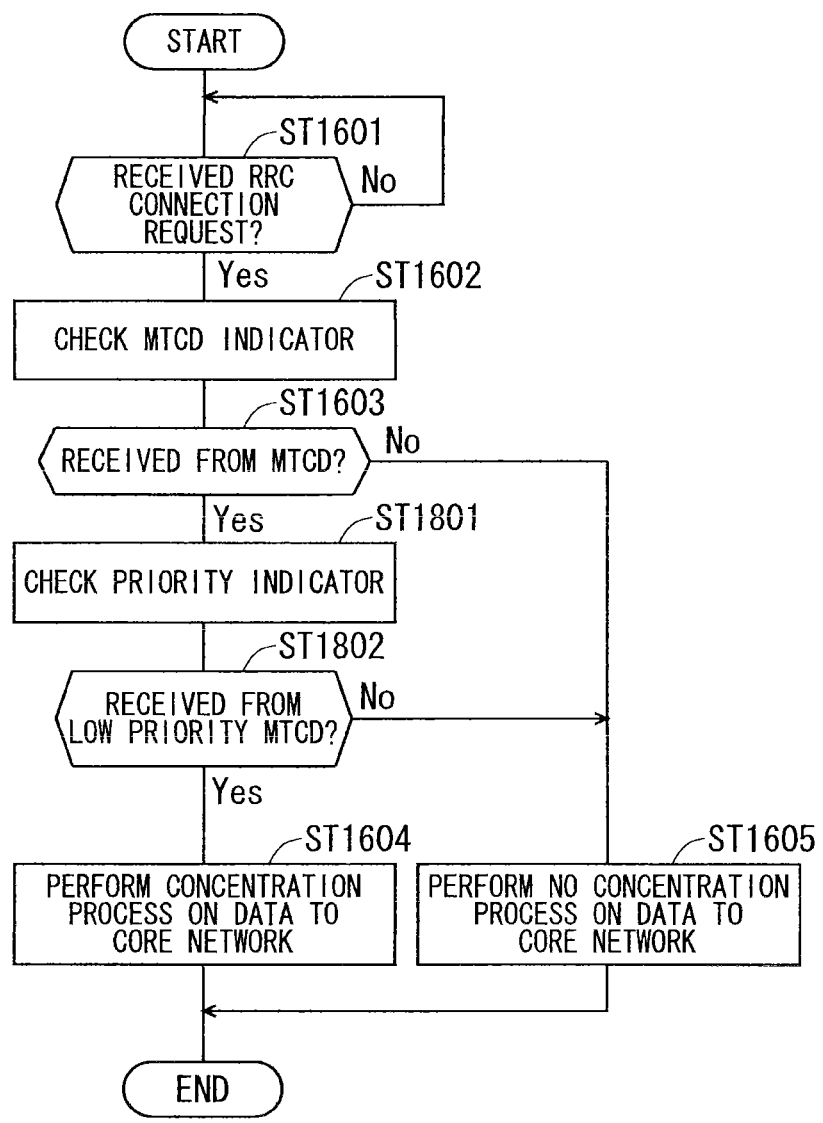

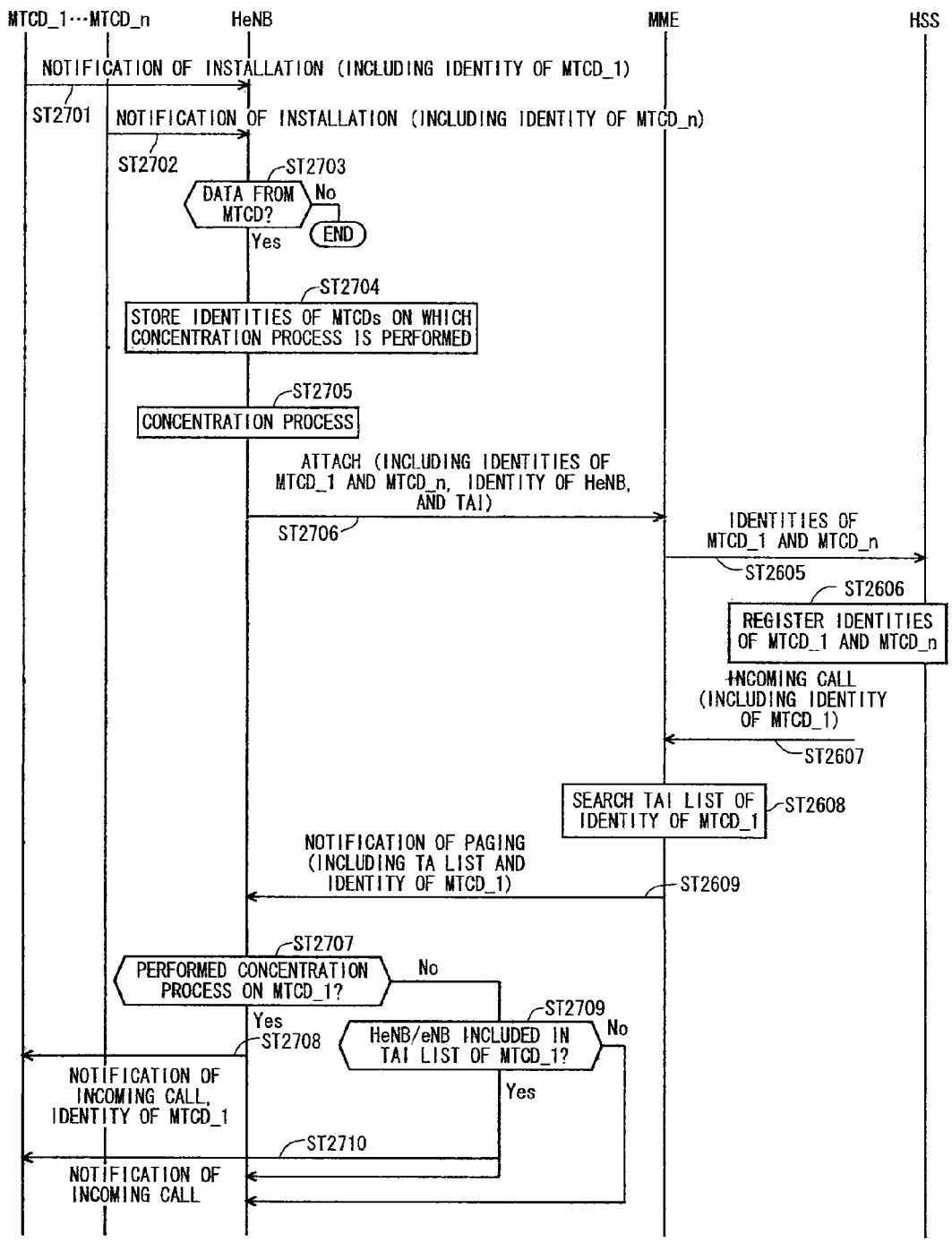
F I G . 2 7

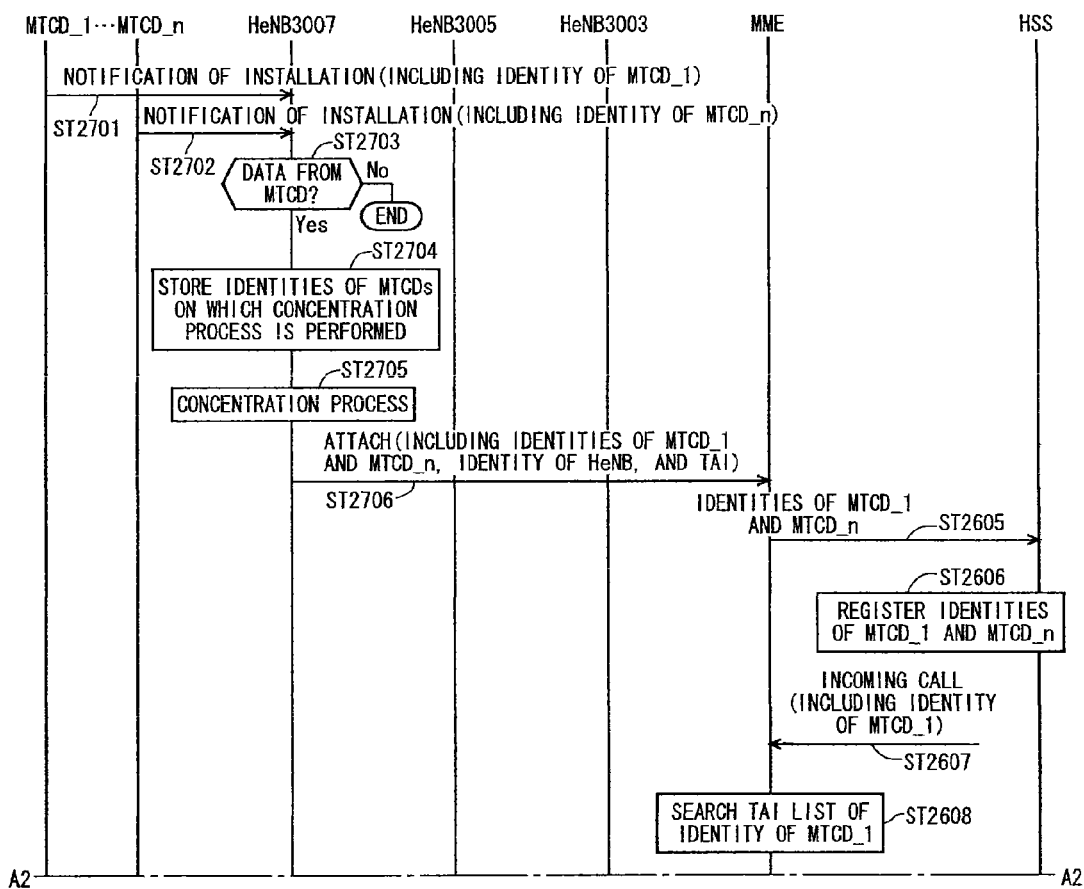
F I G . 3 3

COMMUNICATION SYSTEM

TECHNICAL FIELD

The present invention relates to a communication system in which a base station device performs radio communication with a plurality of communication terminal devices.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 8 version are produced.

Further, 3GPP is studying new communication systems referred to as long term evolution (LTE) regarding radio areas and system architecture evolution (SAE) regarding the overall system configuration including a core network (merely referred to as network as well) as communication systems independent of W-CDMA. This communication system is also referred to as 3.9 generation (3.9 G) system.

In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz per base station. Further, differently from the W-CDMA, circuit switching is not provided but a packet communication system is only provided in the LTE.

The LTE is defined as a radio access network independent of the W-CDMA network because its communication system is configured with a new core network different from a core network (general packet radio service: GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC) or access gateway (aGW), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 (Chapter 4.6.1) describes the current decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in the base station 102.

The base stations 102 perform scheduling and transmission of paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_IDLE and RRC_CONNECTED. In RRC_IDLE, public land mobile network (PLMN) selection, system information (SI) broadcast, paging, cell reselection, mobility and the like are performed. In RRC_CONNECTED, the user equipment has RRC connection, is capable of transmitting/receiving data to/from a network, and performs, for example, handover (HO) and measurement of a neighbor cell.

The current decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is a simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. The MBSFN frame is repeated in allocation periods (radio frame allocation periods). The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod} = \text{radioFrameAllocationOffset} \quad (1)$$

The MBSFN subframe is allocated with six bits. The leftmost bit defines the MBSFN allocation for the second subframe (#1). The second bit, third bit, fourth bit, fifth bit, and sixth-bit define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group cell (CSG cell) as that of a non-CSG cell. Physical channels are described with reference to FIG. 4. FIG. 4 is a diagram illustrating physical channels used in the LTE communication system. With reference to FIG. 4, a physical broadcast channel (PBCH) 401 is a downlink channel transmitted from the base station 102 to the user equipment 101. A BCH transport block is mapped to four subframes within a 40 ms interval. There is no explicit signaling indicating 40 ms timing. A physical control format indicator channel (PCFICH) 402 is transmitted from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a downlink channel transmitted from the base station 102 to the user equipment 101. The PDCCH notifies the resource allocation, hybrid automatic repeat request (HARQ) information related to DL-SCH (downlink shared channel that is one of the transport channels shown in FIG. 5 described below) and the PCH (paging channel that is one of the transport channels shown in FIG. 5). The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a downlink channel transmitted from the base station 102 to the user equipment 101. A DL-SCH (downlink shared channel) that is a transport channel and a PCH that is a transport channel are mapped to the PDSCH. A physical multicast channel (PMCH) 405 is a downlink channel transmitted from the base station 102 to the user equipment 101. A multicast channel (MCH) that is a transport channel is mapped to the PMCH.

A physical uplink control channel (PUCCH) 406 is an uplink channel transmitted from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the user equipment 101 to the base station 102. A UL-SCH (uplink shared channel that is one of the transport channels shown in FIG. 5) is mapped to the PUSCH.

A physical hybrid ARQ indicator channel (PHICH) 408 is a downlink channel transmitted from the base station 102 to the user equipment 101. The PHICH carries Ack/Nack that is a response to uplink transmission. A physical random access channel (PRACH) 409 is an uplink channel transmitted from the user equipment 101 to the base station 102. The PRACH carries a random access preamble.

A downlink reference signal is a known symbol in a mobile communication system. The physical layer measurement objects of a user equipment include reference symbol received power (RSRP).

The transport channel described in Non-Patent Document 1 (Chapter 5) is described with reference to FIG. 5. FIG. 5 is a diagram illustrating transport channels used in the LTE communication system. Part (A) of FIG. 5 shows mapping between a downlink transport channel and a downlink physical channel. Part B of FIG. 5 shows mapping between an uplink transport channel and an uplink physical channel.

A broadcast channel (BCH) is broadcast to the entire coverage of a base station (cell) regarding the downlink transport channel. The BCH is mapped to the physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic or physical resources such as the physical downlink control channel (PDCCH) of the other control channel.

The multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH).

A random access channel (RACH) shown in part (B) of FIG. 5 is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data sequence is transmitted in the first transmission and retransmission, which is the system for improving gains by combining the data sequence of the first transmission and the data sequence of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel described in Non-Patent Document 1 (Chapter 6) is described with reference to FIG. 6. FIG. 6 is a diagram illustrating logical channels used in an LTE communication system. Part (A) of FIG. 6 shows mapping between a downlink logical channel and a downlink transport channel. Part (B) of FIG. 6 shows mapping between an uplink logical channel and an uplink transport channel.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging signals. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is a channel used for transmission of MBMS control information for one or several MTCHs from a network to a user equipment. The MCCH is a channel used only by a user equipment during reception of the MBMS. The MCCH is mapped to the downlink shared channel (DL-SCH) or multicast channel (MCH) that is a transport channel.

A dedicated control channel (DCCH) is a channel that transmits dedicated control information between a user equipment and a network. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the downlink shared channel (DL-SCH) or multicast channel (MCH).

GCI represents a global cell identity. A closed subscriber group cell (CSG cell) is introduced in the LTE and universal mobile telecommunication system (UMTS). The CSG is described below (see Chapter 3.1 of Non-Patent Document 3). The closed subscriber group (CSG) is a cell in which subscribers who are allowed to use are specified by an operator (cell for specific subscribers).

The specified subscribers are allowed to access one or more E-UTRAN cells of a public land mobile network (PLMN). One or more E-UTRAN cells in which the specified subscribers are allowed access are referred to as "CSG cell(s)". Note that access is limited in the PLMN. The CSG cell is part of the PLMN that broadcasts a specific CSG identity (CSG ID; CSG-ID). The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling (calling of user equipments) even in an idle state. An area for tracing locations of user equipments is referred to as a tracking area.

A CSG whitelist is a list stored in a universal subscriber identity module (USIM) in which all CSG IDs of the CSG cells to which the subscribers belong are recorded. The CSG whitelist is also referred to as an allowed CSG ID list in some cases.

A "suitable cell" is described below (see Chapter 4. 3 of Non-Patent Document 3). The "suitable cell" is a cell on which a UE camps to obtain normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):
  (a) the cell is not a barred cell;
  (b) the cell is part of at least one tracking area (TA), not part of the list of "forbidden LAs for roaming", where the cell needs to fulfill (1) above;
  (c) the cell shall fulfill the cell selection criteria; and
  (d) for a cell specified as CSG cell by system information (SI), the CSG-ID is part of a "CSG whitelist" of the UE (contained in the CSG whitelist of the UE).

An "acceptable cell" is described below (see Chapter 4.3 of Non-Patent Document 3). This is the cell on which a UE camps to obtain limited service (emergency calls). Such a cell shall fulfill the all following requirements. That is, the minimum required set for initiating an emergency call in an E-UTRAN network are as follows: (1) the cell is not a barred cell; and (2) the cell fulfills the cell selection criteria.

Camping on a cell represents the state where a UE has completed the cell selection/reselection process and the UE has selected a cell for monitoring the system information and paging information.

3GPP is studying base stations referred to as Home-NodeB (Home-NB; HNB) and Home-eNodeB (Home-eNB; HeNB). HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode (also referred to as hybrid cell) is the cell that supports both the open access mode and the closed access mode.

3GPP is discussing that all physical cell identities (PCIs) are split (referred to as PCI-split) into ones reserved for CSG cells and the others reserved for non-CSG cells (see Non-Patent Document 5). Further, 3GPP is discussing that the PCI split information is broadcast in the system information from the base station to the user equipments being served thereby. The basic operation of a user equipment using PCI split is disclosed. The user equipment that does not have the PCI split information needs to perform cell search using all PCIs (for example, using all 504 codes). On the other hand, the user equipment that has the PCI split information is capable of performing cell search using the PCI split information.

Further, 3GPP is pursuing specifications standard of long term evolution advanced (LTE-A) as Release 10 (see Non-Patent Document 6 and Non-Patent Document 7).

As to the LTE-A system, it is studied that a relay (relay node (RN)) is supported for achieving a high data rate, high cell-edge throughput, new coverage area, and the like. The relay node is wirelessly connected to the radio-access network via a donor cell (Donor eNB; DeNB). The network (NW)-to-relay node link shares the same frequency band with the network-to-UE link within the range of the donor cell. In this case, the UE in Release 8 can also be connected to the donor cell. The link between a donor cell and a relay node is referred to as a backhaul link, and the link between the relay node and the UE is referred to as an access link.

As the method of multiplexing a backhaul link in frequency division duplex (FDD), the transmission from a DeNB to an RN is performed at a downlink (DL) frequency band, and the transmission from an RN to a DeNB is performed at an uplink (UL) frequency band. As the method of dividing resources in a relay, a link from a DeNB to an RN and a link from an RN to a UE are time-division multiplexed at one frequency, and a link from an RN to a DeNB and a link from a UE to an RN are also time-division multiplexed at one frequency band. Accordingly, in a relay, the transmission of the relay is prevented from interfering the reception of the own relay.

3GPP is studying not only a normal eNB (macro cell) but also so-called local nodes such as pico eNB (pico cell), HeNB/HNB/CSG cell, node for hotzone cells, relay node, and remote radio head (RRH).

The local nodes are installed so as to complement a macro cell in response to requests for various services such as high speed and large-capacity communication. It is required to install a large number of HeNBs in shopping malls, apartment buildings, schools, companies and the like. This leads to a case in which a HeNB is installed in a coverage of a macro cell. In a case where the HeNB is installed in the coverage of the macro cell, interference occurs among the macro cell, HeNB, user equipment (UE), and the like. The above-mentioned interference hinders the communication between the user equipment (UE) and the macro cell or HeNB, which reduces a data rate. Further increased interference power disables communication. This requires the method of preventing the interference occurring in a situation in which a macro cell and local nodes are installed to coexist and optimizing the communication quality.

3GPP is pursuing the study of the machine type communication (MTC) technique (see Non-Patent Document 8). A large number of MTC devices (MTCDs) are conceivable. In MTC service, there occurs a situation in which data is communicated from a large number of MTCDs or to a large number of MTCDs at the same time. This causes a problem that a core network is congested.

In order to solve the above-mentioned problem, Non-Patent Document 9 discloses that an eNB holds back and aggregates signaling messages common to MTCDs of the same MTCD group, whereby the signaling messages are compacted.

PRIOR ART DOCUMENTS

Non-Patent Documents

Non-Patent Document 1: 3GPP TS 36.300 V10.0.0 Chapter 4.6.1, Chapter 4.6.2, Chapter 5, Chapter 6, Chapter 10.1.2, Chapter 10.7
Non-Patent Document 2: 3GPP TS 36.331 V9.3.0
Non-Patent Document 3: 3GPP TS 36.304 V9.3.0 Chapter 3.1, Chapter 4.3, Chapter 5.2.4
Non-Patent Document 4: 3GPP S1-083461
Non-Patent Document 5: 3GPP R2-082899
Non-Patent Document 6: 3GPP TR 36.814 V9.0.0
Non-Patent Document 7: 3GPP TR 36.912 V9.0.0
Non-Patent Document 8: 3GPP TS 22.368 V2.0.0
Non-Patent Document 9: 3GPP S2-103186

SUMMARY OF INVENTION

Problem to be Solved by the Invention

As described above, Non-Patent Document 9 discloses that an eNB holds back and aggregates signaling messages common to MTCDs of the same MTCD group, whereby the signaling messages are compacted.

However, in a case where a large number of MTCD groups to be served by an eNB are located, even if the method disclosed in Non-Patent Document 9 is used, the above-mentioned problem that the core network is congested arises again.

An object of the present invention is to provide a communication system capable of mitigating, even if a large number of MTCD groups to be served by an eNB are located, the congested state of a core network in a situation in which the data is required to be communicated from the large number of MTCDs or to the large number of MTCDs at the same time.

Means to Solve the Problem

A communication system according to the present invention includes a base station device connected to a core network and a plurality of terminal device groups including communication terminal devices connected to the base station device so as to perform radio communication, wherein upon reception of data transmitted from the communication terminal devices to the core network, the base station device performs a concentration process of concentrating the received data on the terminal device groups and transmits the data obtained through the concentration process to the core network.

Effects of the Invention

According to the communication system of the present invention, when receiving the data transmitted from the plurality of communication terminal devices to the core network, the base station device performs the concentration process of concentrating the received data on the plurality of terminal device groups and transmits the data obtained through the concentration process to the core network. The concentration process is performed on a plurality of terminal device groups in this manner, so that even in a case where a large number of terminal device groups to be served by a base station device are located, the number of communication times from a base station device to a core network or amount of data can be reduced. Accordingly, even in a case where a large number of terminal device groups to be served by a base station device are located, it is possible to mitigate the congestion of the core network in a situation in which data needs to be communicated with a large number of communication terminal devices included therein.

Further, the data to be transmitted from the communication terminal device to the core network is transmitted to the core network after the concentration process by the base station device. Accordingly, even in a case where the communication terminal device is installed in a poor radio environment, communication with the communication terminal device is allowed, where the base station device serves as an origin. This does not require to separately provide, for example, a device such as a concentrator between the communication terminal device and the base station device, so that the communication system can be prevented from becoming complicated.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a diagram illustrating the configuration of an MBSFN frame.
FIG. 5 is a diagram illustrating transport channels used in the LTE communication system.
FIG. 6 is a diagram illustrating logical channels used in the LTE communication system.
FIG. 10 is a block diagram showing the configuration of an MME (MME unit 73 of FIG. 7) according to the present invention.
FIG. 11 is a block diagram showing the configuration of a HeNBGW 74 shown in FIG. 7 that is a HeNBGW according to the present invention.
FIG. 16 is a flowchart showing a procedure by a HeNB regarding a concentration process in the first embodiment.
FIG. 17 is a diagram showing a sequence of a mobile communication system in the first embodiment.
FIG. 18 is a flowchart showing the procedure by a HeNB regarding a concentration process in a first modification of the first embodiment.
FIG. 27 is a diagram showing a sequence of a mobile communication system in a fourth embodiment.
FIG. 33 is a diagram showing a sequence of the mobile communication system for describing unused radio resources in a case where the fourth embodiment is executed.

EMBODIMENTS FOR CARRYING OUT THE INVENTION

First Embodiment

Figure 1:
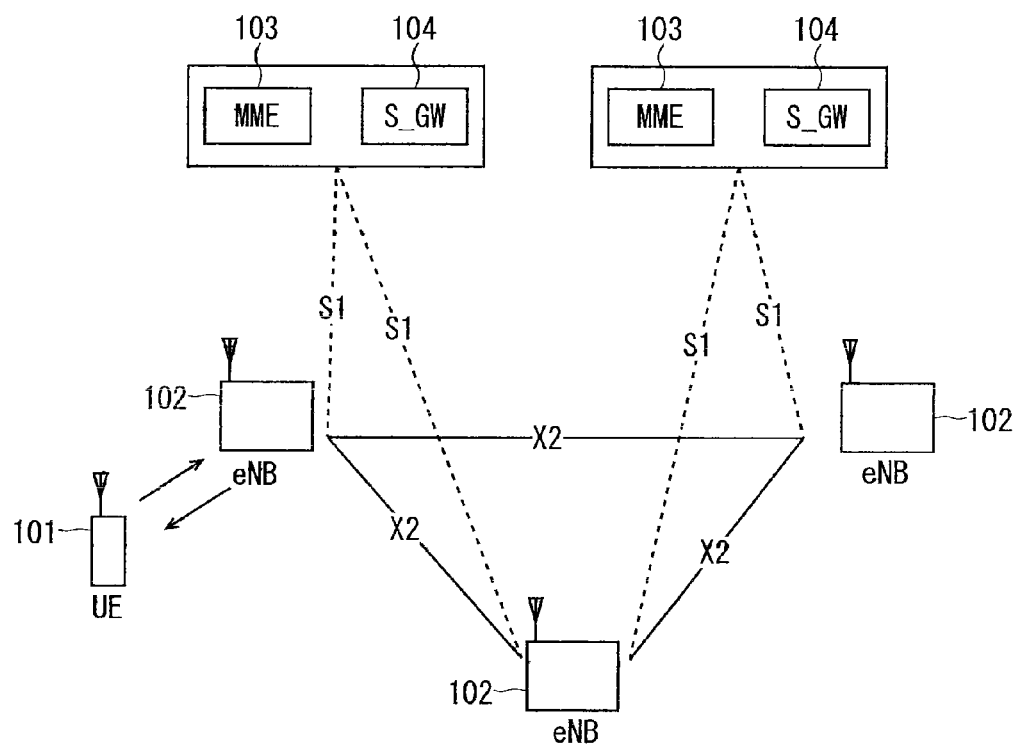
FIG. 1 is a diagram illustrating the configuration of an LTE communication system.
Figure 2:
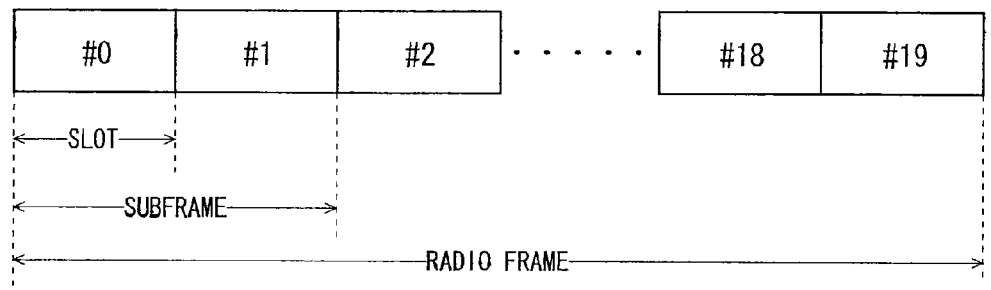
FIG. 2 is a diagram illustrating the configuration of a radio frame used in the LTE communication system.
Figure 4:
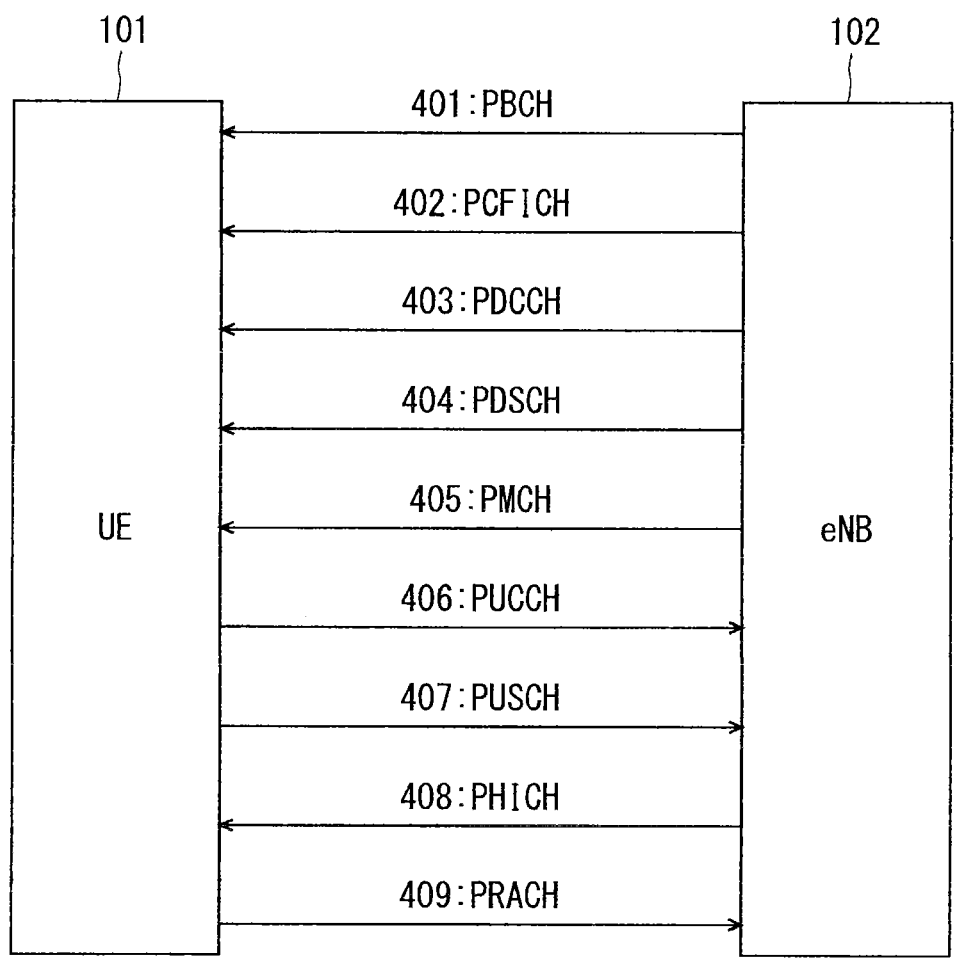
FIG. 4 is a diagram illustrating physical channels used in the LTE communication system.
Figure 7:
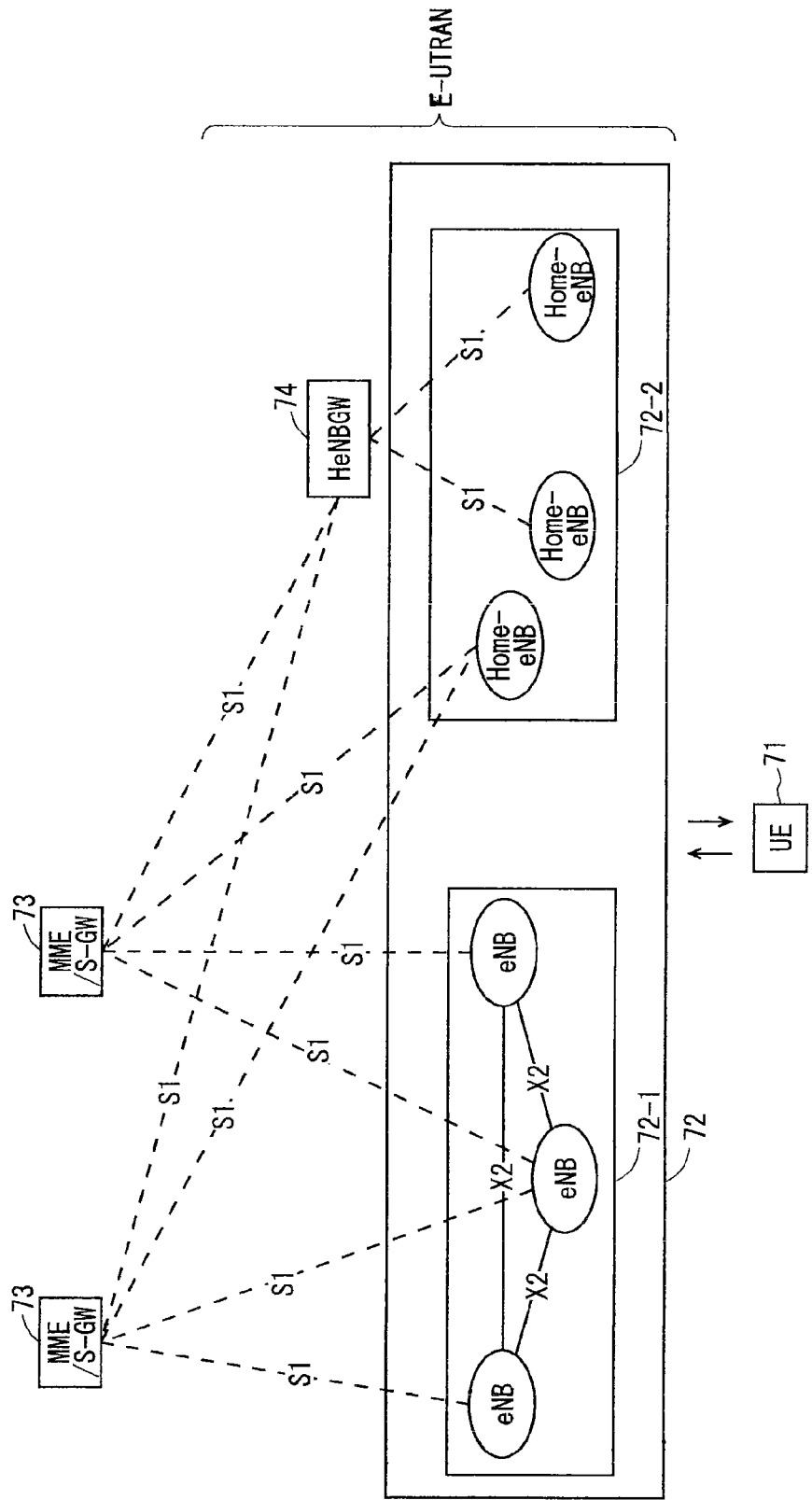
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, is proposing the configuration as shown in FIG. 7 (see Chapter 4.6.1 of Non-Patent Document 1).

FIG. 7 is described. A user terminal device (hereinafter, referred to as "user equipment" or "UE") 71 is capable of performing radio communication with a base station device (hereinafter, referred to as "base station") 72 and transmits/receives signals through radio communication. The user terminal device is equivalent to a communication terminal device. Hereinafter, the user terminal device is refereed to as "communication terminal" in some cases. The base stations 72 are classified into an eNB 72-1 that is a macro cell and a Home-eNB 72-2 that is a local node. The eNB 72-1 is equivalent to a large-scale base station device and has a relatively large-scale coverage as the coverage in a range in which communication is allowed with the user equipment UE 71. The Home-eNB 72-2 is equivalent to a small-scale base station device and has a relatively small-scale coverage as the coverage.

The eNB 72-1 is connected to an MME/S-GW unit (hereinafter, referred to as an "MME unit" in some cases) 73 including an MME, S-GW or MME and S-GW through an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Also, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

Further, 3GPP is currently studying the configuration below. The X2 interface between the Home-eNBs 72-2 is not supported. The HeNBGW 74 appears to the MME unit 73 as the eNB 72-1. The HeNBGW 74 appears to the Home-eNB 72-2 as the MME unit 73. The interfaces between the Home-eNBs 72-2 and the MME units 73 are the same, which are the S1 interfaces, irrespective of whether or not the Home-eNB 72-2 is connected to the MME unit 73 through the HeNBGW 74. The mobility to the Home-eNB 72-2 or the mobility from the Home-eNB 72-2 that spans the plurality of MME units 73 is not supported. The Home-eNB 72-2 supports a single cell.

Figure 8:
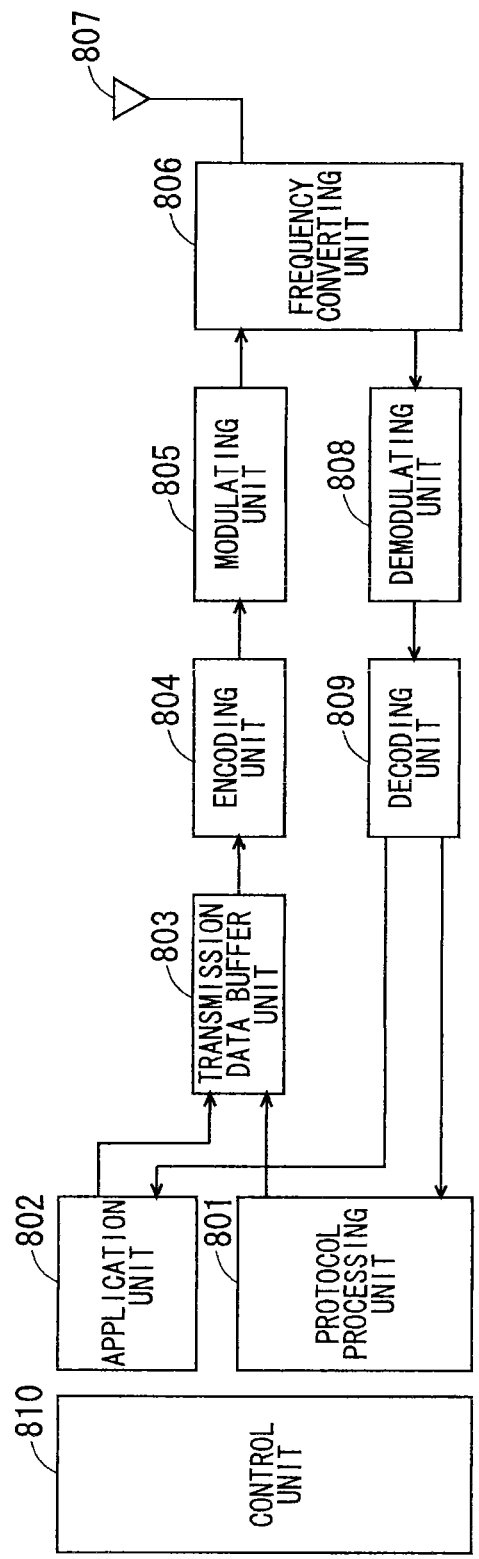
FIG. 8 is a block diagram showing the configuration of a user equipment (user equipment 71 of FIG. 7) according to the present invention.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency to a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

Figure 9:
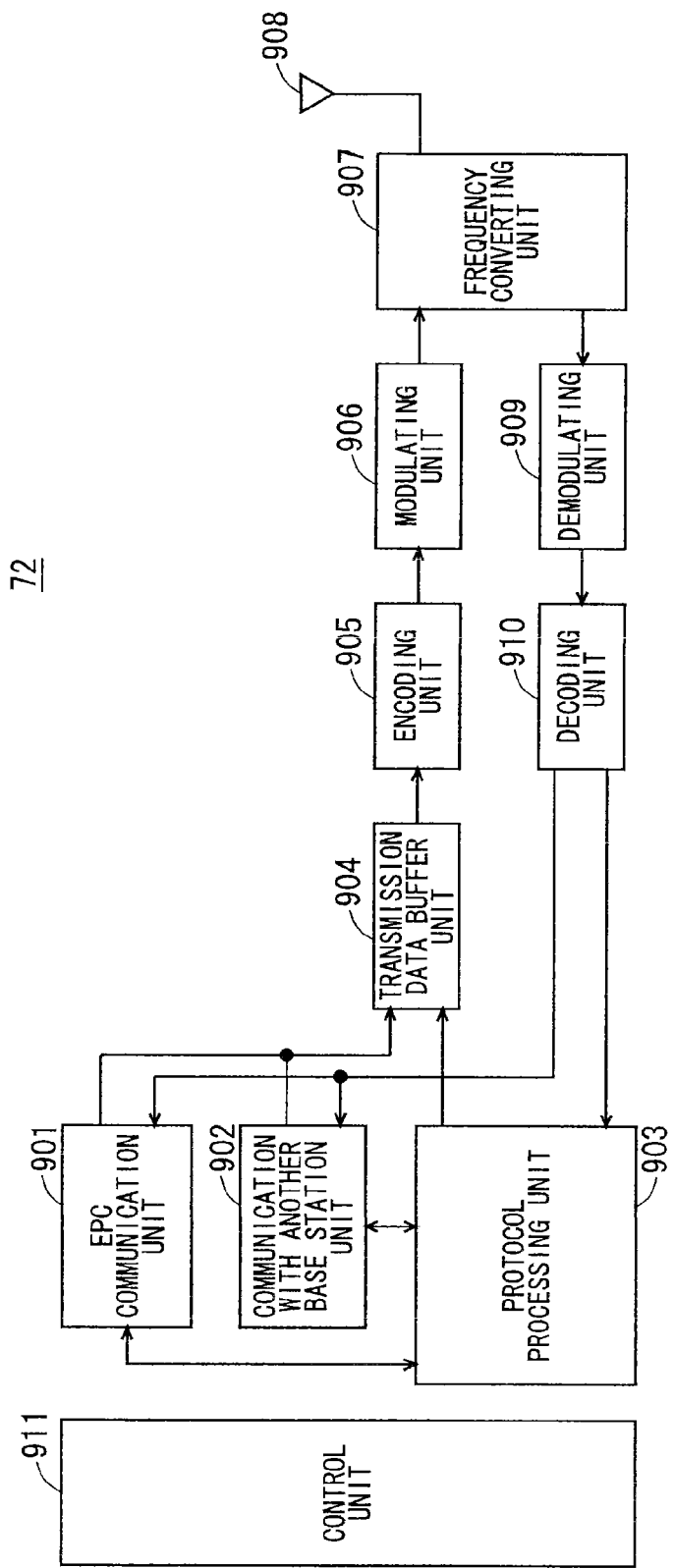
FIG. 9 is a block diagram showing the configuration of a base station (base station 72 of FIG. 7) according to the present invention.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). A communication with another base station unit 902 performs data transmission/reception to/from another base station. The X2 interface between the Home-eNBs 72-2 is not intended to be supported, and accordingly, it is conceivable that the communication with another base station unit 902 may not exist in the Home-eNB 72-2. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

While, the reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by a control unit 911. This means that, though not shown in FIG. 9, the control unit 911 is connected to the respective units 901 to 910.

The functions of the Home-eNB 72-2 currently under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission/reception between the MME 73a and a PDN GW. A base station communication unit 1002 performs data transmission/reception between the MME 73a and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME 73a and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes an NAS security unit 1005-1, an SAE bearer control unit 1005-2, and an idle state mobility managing unit 1005-3, and performs overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signal in an idle state, addition, deletion, update, and search of a tracking area (TA) of one or a plurality of user equipments 71 being served thereby, and tracking area list (TA list) management.

The MME 73a begins a paging protocol by transmitting a paging message to the cell belonging to a tracking area (TA) in which the UE is registered. The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (added, deleted, updated or searched). For example, it may be the relationship between one or a plurality of user equipments whose user access registration has been performed with a CSG-ID and the CSG cells belonging to this CSG-ID. In the whitelist management, the relationship between the user equipment and the CSG-ID is managed (added, deleted, updated, or searched). For example, one or a plurality of CSG-IDs with which user registration has been performed by a user equipment may be stored in the whitelist. The above-mentioned management related to the CSG may be performed by another part of the MME 73*a*. A series of processes by the MME 73*a* is controlled by a control unit 1006. This means that, though not shown in FIG. 10, the control unit 1006 is connected to the respective units 1001 to 1005.

The function of the MME 73*a* currently under discussion of 3GPP is described below (see Chapter 4.6.2 of Non-Patent Document 1). The MME 73*a* performs access control for one or a plurality of user equipments being members of closed subscriber groups (CSGs). The MME 73*a* recognizes the execution of paging optimization as an option.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME 73*a* by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73*a* through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP is described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME 73*a*. When the HeNBGW 74 is deployed, the procedure that is not associated with the user equipment 71 is communicated between the Home-eNB 72-2 and the HeNBGW 74 and between the HeNBGW 74 and the MME 73*a*. The X2 interface is not set between the HeNBGW 74 and another node. The HeNBGW 74 recognizes the execution of paging optimization as an option.

Figure 12:
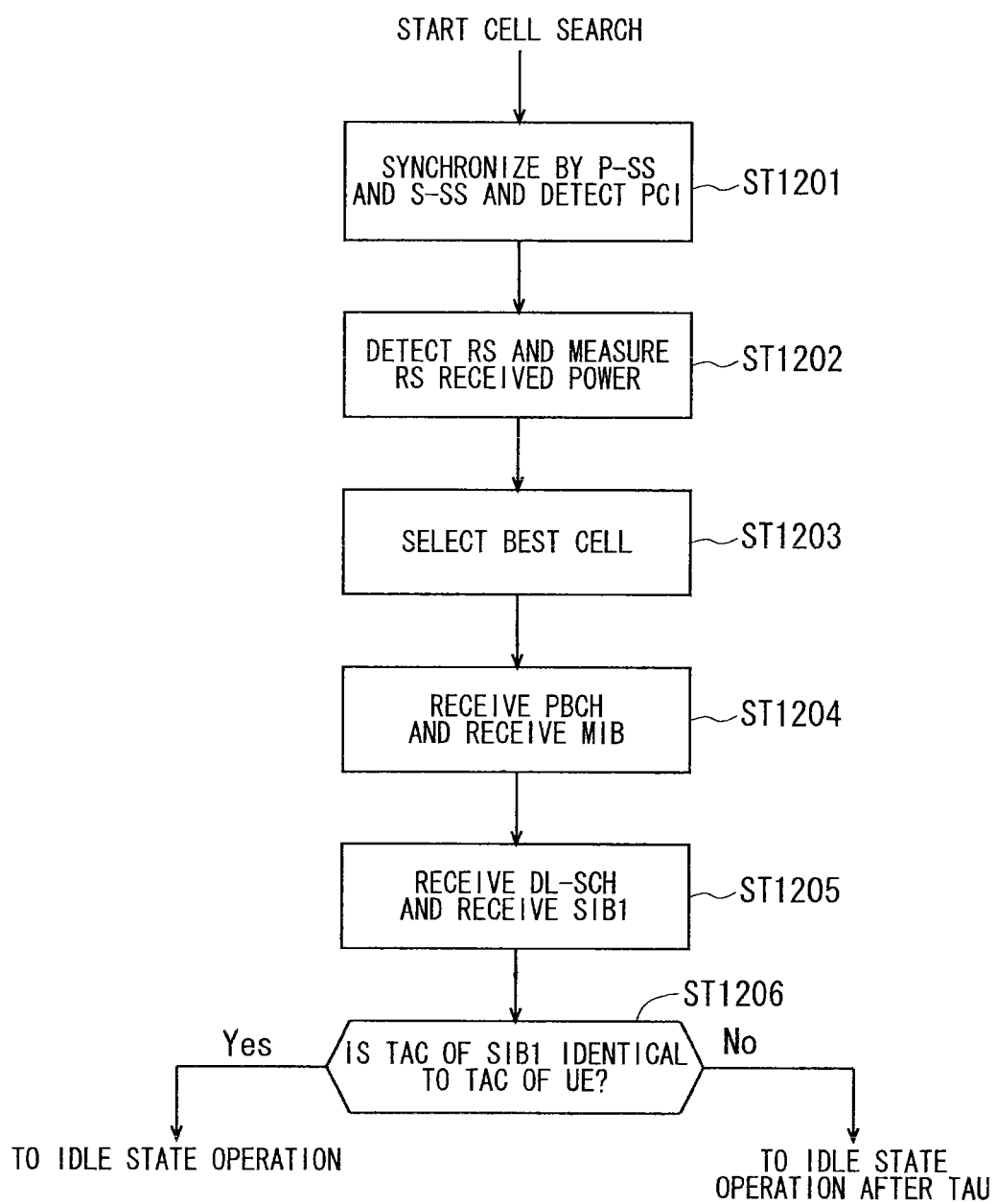
FIG. 12 is a flowchart showing an outline from a cell search to an idle state operation performed by a user equipment (UE) in the LTE communication system.

Next, an example of a typical cell search method in a mobile communication system is described. FIG. 12 is a flowchart showing an outline from cell search to idle state operation performed by a user equipment (UE) in the LTE communication system. When starting cell search, in Step ST1201, the user equipment synchronizes the slot timing and frame timing by a primary synchronization signal (P-SS) and a secondary synchronization signal (S-SS) transmitted from a neighbour base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (specified).

Next, in Step ST1202, the user equipment detects a reference signal RS (cell-specific reference signal (CRS)) transmitted from the base station per cell and measures the received power (also referred to as RSRP). The code corresponding to the PCI one by one is used for the reference signal RS, and separation from another cell is enabled by correlation using the code. The code for RS of the cell is derived from the PCI specified in Step ST1201, which makes it possible to detect the RS and measure the RS received power.

Next, in Step ST1203, the user equipment selects the cell having the best RS reception quality (for example, cell having the highest RS received power, that is, best cell) from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information related to the access to the cell, information related to cell selection, and scheduling information of other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC in the tracking area (TA) list that has been already possessed by the user equipment. In a case where the TAC received in Step ST1205 is identical to the TAC included in the TA list as a result of the comparison, the user equipment enters an idle state operation in the cell. In a case where the TAC received in Step ST1205 is not included in the TA list as a result of the comparison, the user equipment requires a core network (EPC) (including MME and the like) to change a TA through the cell for performing tracking area update (TAU). The core network updates the TA list based on an identification number (such as a UE-ID) of the user equipment transmitted from the user equipment together with a TAU request signal. The core network transmits the updated TA list to the user equipment. The user equipment rewrites (updates) the TAC list of the user equipment with the received TA list. After that, the user equipment enters the idle state operation in the cell.

In the LTE and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. Note that one CSG may contain a plurality of CSG cells. After being registered with any one of the CSG cells, the user equipment can access another CSG cell of the CSG to which the registered CSG cell belongs.

Alternatively, the Home-eNB in the LTE or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID and TAC are associated with global cell identity (GCI).

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

3GPP is discussing that all physical cell identities (PCIs) are split (referred to as PCI-split) into ones reserved for CSG cells and the others reserved for non-CSG cells (see Non-Patent Document 5). Further, 3GPP is discussing that the PCI split information is broadcast in the system information from the base station to the user equipments being served thereby. Non-Patent Document 5 discloses the basic operation of a user equipment by PCI split. The user equipment that does not have the PCI split information needs to perform cell search using all PCIs (for example, using all 504 codes). On the other hand, the user equipment that has the PCI split information is capable of performing cell search using the PCI split information.

Further, 3GPP has determined that the PCIs for hybrid cells are not contained in the PCI range for CSG cells (see Chapter 10.7 of Non-Patent Document 1).

In 3GPP, there are two modes in the method of selecting or reselecting a CSG cell by a user equipment. One is an automatic mode. The feature of the automatic mode is described below. The user equipment performs selection or reselection with the use of an allowed CSG list (allowed CSG ID list) in the user equipment. After the completion of PLMN selection, the user equipment camps on one cell in the selected PLMN only in a case of a non-CSG cell or a CSG cell with a CSG ID present in the allowed CSG list. The user equipment disables an autonomous search function of the CSG cell if the allowed CSG list of the user equipment is empty (see Chapter 5.2.4.8.1 of Non-Patent Document 3).

The second is a manual mode. The feature of the manual mode is described below. The user equipment shows a list of available CSGs in the currently selected PLMN to a user. The list of CSGs provided to the user by the user equipment is not limited to the CSGs included in the allowed CSG list stored in the user equipment. The user selects the CSG based on the list of CSGs, and then the user equipment camps on the cell with the selected CSG ID, to thereby attempt registration (see Chapter 5.2.4.8.1 of Non-Patent Document 3).

The HeNB and HNB are required to support various services. For example, an operator causes the predetermined HeNB and HNB to register user equipments therein and permits only the registered user equipments to access the cells of the HeNB and HNB, which increases radio resources available for the user equipments and enables high-speed communication. In such a service, the operator correspondingly sets a higher accounting fee compared with a normal service.

In order to achieve the above-mentioned service, the closed subscriber group cell (CSG cell) accessible only to the registered (subscribed or member) user equipments is introduced. It is required to install a large number of closed subscriber group cells (CSG cells) in shopping malls, apartment buildings, schools, companies and the like. For example, the following manner of use is required; the CSG cells are installed for each store in shopping malls, for each room in apartment buildings, for each classroom in schools, for each section in companies such that only the users who have registered with the respective CSG cells are permitted to use those CSG cells. The HeNB/HNB is required not only to complement the communication outside the coverage of the macro cell but also to support various services as described above. This also leads to a case where the HeNB/HNB is installed within the coverage of the macro cell.

3GPP is pursuing the study of the MTC technique (see Non-Patent Document 8). The MTC is machine to machine (M2M) communication, which differs from the conventional human to human (H2H) communication. In other words, the MTC does not require human interaction, that is, interaction between humans. Examples of applications of the service using the MTC technique (hereinafter, referred to as "MTC service") include metering of gas, power and water, and fleet management and order management (tracking and tracing). The MTC service is characterized by a large number of devices for MTC (MTC devices: MTCDs). As one example, 30,000 or more MTCDs are assumed to be served by one cell.

Figure 13:
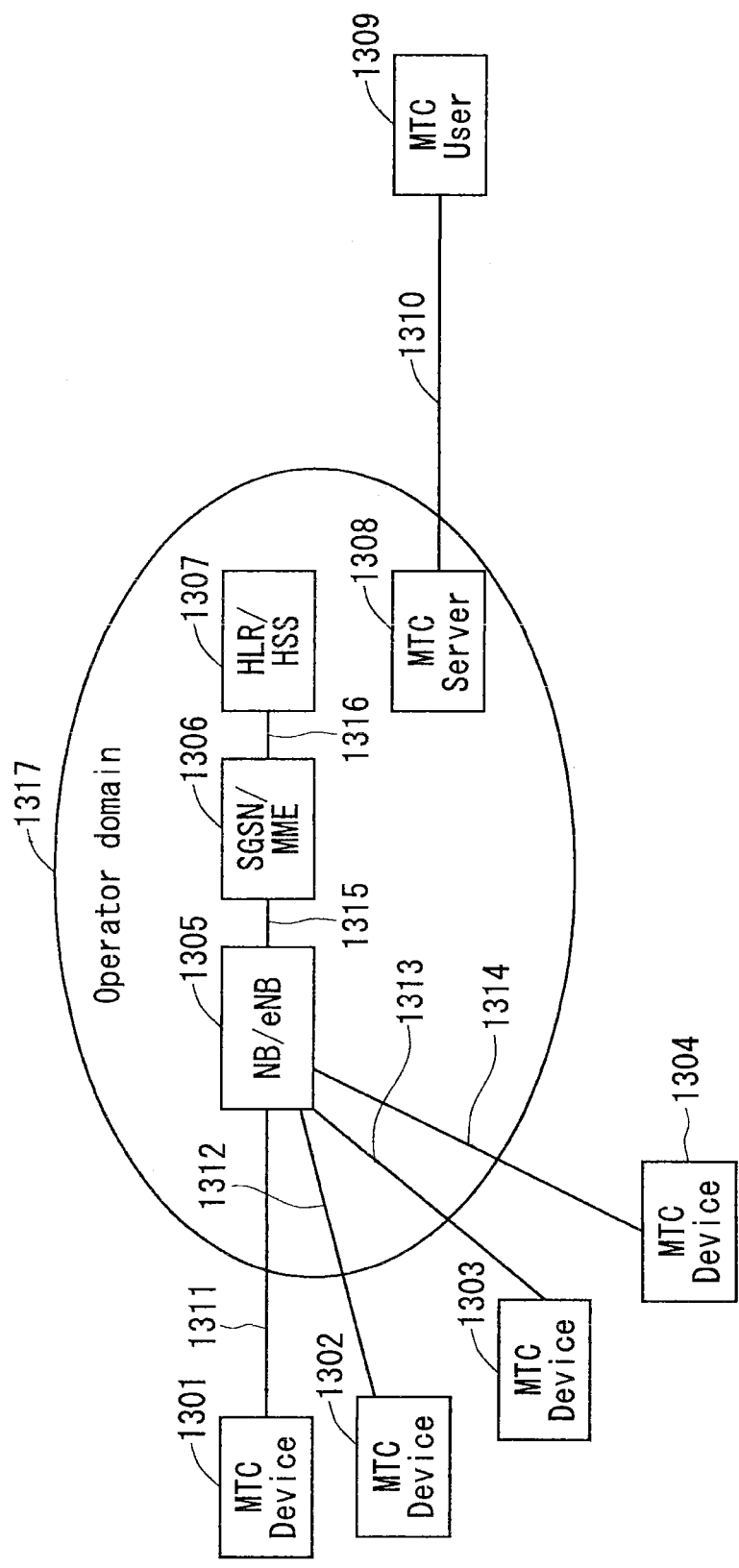
FIG. 13 is a diagram illustrating an example of an MTC architecture under discussion of 3GPP.

3GPP is studying the architecture of the MTC (see 3GPP R3-100315 (hereinafter, referred to as "Non-Patent Document 10")). FIG. 13 is a diagram illustrating an example of the architecture of the MTC, which is studied by 3GPP. The support of MTC service is studied not only in the LTE communication system but also in the WCDMA communication system.

With reference to FIG. 13, MTCDs 1301 to 1304 and an NB/eNB 1305 are connected by means of interfaces Uu 1311 to 1314, respectively. A serving GPRS support node/mobility management entity (SGSN/MME) 1306 is connected to the NB/eNB 1305 by means of an IuPS/S1 interface 1315. Though not shown here, a radio network controller (RNC) is located between the NB and the SGSN. The NB and the RNC are connected by means of an Iub interface, and the RNC is connected to the SGSN by means of an IuPS interface.

A home location register/home subscriber server (HLR/HSS) 1307 is connected to the SGSN/MME 1306 by means of a Gr/S6a interface 1316. A communication operator domain 1317 includes the NB/eNB 1305, SGSN/MME 1306, HLR/HSS 1307, and the like.

An MTC server 1308 is included in the communication operator domain 1317. An MTC user 1309 that performs MTC service is connected to the MTC server 1308 by means of an application program interface (API) 1310. 3GPP is currently studying a node in the communication operator domain 1317, to which the MTC server 1308 is connected.

The information for MTC service is notified by the MTC user 1309 from the MTC server 1308 to the MTCDs 1301 to 1304 with the use of the NB/eNB 1305, SGSN/MME 1306, and HLR/HSS 1307 that are nodes in the communication operator domain 1317. In contrast, the information from the MTCDs 1301 to 1304 is notified to the MTC server 1308 with the use of the NB/eNB 1305, SGSN/MME 1306, and HLR/HSS 1307 that are nodes in the communication operator domain 1317, and the MTC user 1309 uses the information.

In the MTC service, there occurs a situation in which data is communicated from a large number of MTCDs or to a large number of MTCDs at the same time. The situation described above occurs in a case where, for example, metering data is transmitted from the MTCD to the MTC server at one o'clock in the morning once a day or in a case where the MTC server requests the MTCD to transmit the metering data. Another example is the case where, for example, data for upgrading software is transmitted to the all MTCDs simultaneously.

The conventional communication system is optimized for H2H communication, and thus, no measure is taken against a situation in which a large number of MTCDs communicate data at the same time. A situation in which data is communicated from a large number of MTCDs or to a large number of MTCDs at the same time causes a problem that a radio network and a core network become congested. In other words, a problem that those networks are overloaded arises.

For example, in a case where an MTC server requests a large number of MTCDs to transmit metering data simultaneously, the MTCDs 1301 to 1304 transmit many pieces of data to the MTC server 1308 with the use of the NB/eNB 1305, SGSN/MME 1306, and HLR/HSS 1307 that are nodes in the communication operator domain 1317. In such a situation, an overloaded state is caused in the communication between the NB/eNB 1305 and the SGSN/MME 1306. This causes a problem of a shortage of communication resources or an occurrence of an overloaded state in the processes by the NB/eNB 1305 and the SGSN/MME 1306.

Non-Patent Document 9 mentioned above discloses the following solution to the problem of the congested state occurring in the core network. An eNB holds back and aggregates signaling messages common to MTCDs of the same group, so that the signaling messages are compacted. Specifically, Non-Patent Document 9 describes the method in which an eNB holds back the NAS signaling messages from MTCDs for a pre-defined timeout or till a number of non-access stratum (NAS) signaling messages arrive. However, Non-Patent Document 9 does not suggest a problem in a case where a large number of MTCD groups to be served by an eNB are located, and does not disclose a solution to the problem as well. In addition, Non-Patent Document 9 does not disclose the method in which an eNB holds back and aggregates signaling messages from MTCDs, and then transmits those to a core network side.

S2-101008 (hereinafter, referred to as "Non-Patent Document 11") by 3GPP discloses the following solution to a problem of the congested state occurring in the core network. It is described that MTCDs in the same MTCD group share one network resource allocated to a UE that is not an MTCD. However, Non-Patent Document 11 does not suggest a problem in a case where a large number of MTCD groups to be served by an eNB are located and does not disclose a solution as well. Further, Non-Patent Document 11 discloses that an international mobile subscriber identity (IMSI), an MTCD number, and a cell number as source addresses are mapped to a message from an MTCD to an MTC server. However, Non-Patent Document 11 does not disclose the method of sharing one network resource among MTCDs of the same MTCD group.

R2-103269 (hereinafter, referred to as "Non-Patent Document 12") by 3GPP describes a problem that in a case where, for example, the MTCDs are installed in the basement, the channel quality between individual MTCD and eNB is too low such that the direct communication therebetween is not practical. In order to tackle such a problem, Non-Patent Document 12 discloses to install a concentrator between an eNB and an MTCD, separately from the eNB. However, Non-Patent Document 12 does not disclose the transmission method from a concentrator to an eNB.

A problem to be solved in the first embodiment is described below. In a case where a large number of MTCD groups to be served by an eNB are located, signaling messages cannot be reduced by the above-mentioned method disclosed in Non-Patent Document 9, that is, the method in which an eNB holds back and aggregates signaling messages common to MTCDs of the same MTCD group. The first embodiment discloses a communication system capable of mitigating, even if a large number of MTCD groups to be served by an eNB are located, the congestion of a core network in a situation in which the pieces of data from a large number of MTCDs need to be communicated. The communication system of the present embodiment is a mobile communication system. The MTCD group is equivalent to a terminal device group.

A solution in the first embodiment is described below. A HeNB performs a concentration process of concentrating the data from MTCDs being served thereby to an MME, SGSN, or MTC server being a core network. The HeNB does not transmit, relay, or transmit therethrough the data from MTCDs being served thereby to the MME, SGSN, or MTC server being a core network per se but concentrates the data. This enables the concentration process even in a case where a large number of MTCDs belonging to different MTCD groups to be served by a HeNB are located. Accordingly, it is possible to mitigate congestion in a core network even in a situation in which a large number of MTCDs belonging to different MTCD groups to be served by a HeNB are located.

In a case where a HeNB operates in a closed access mode or hybrid access mode, the data from MTCDs belonging to the same CSG to a core network may be concentrated. This allows a HeNB to process only the data from the MTCDs registered with the same CSG to that of the own HeNB among MTCDs being served thereby, which enables a process according to the closed access mode such that the HeNB operates as a cell that can be accessed by only the CSG members.

In a case where a HeNB operates in a hybrid access mode, user equipments other than MTCDs may use the open access mode and MTCDs may use the closed access mode. The MTCDs may be allowed to access only the HeNBs of the same CSG. In this case, a HeNB may concentrate the data from communication terminals that make access in the closed access mode to a core network.

The same effects can be achieved if an eNB performs the process performed by a HeNB. The following description is mainly given of a HeNB for the sake of convenience.

The following two (1) and (2) are disclosed as specific examples of the communication method between a HeNB and an MTCD; (1) communication method in a mobile communication system standardized by 3GPP, and (2) communication method in a system other than the mobile communication system standardized by 3GPP.

The following five (1) to (5) are disclosed as specific examples of the communication method in a system other than the mobile communication system standardized by 3GPP; (1) infrared communication, (2) coaxial cable communication, (3) optical fiber communication, (4) Bluetooth (registered trademark) communication, and (5) ZigBee (registered trademark) communication.

Specific examples of the data from an MTCD to a core network, which is a target of the concentration process by a HeNB, are disclosed below. First, the following two (1) and (2) are disclosed as specific examples of the contents of the data which is a target of the concentration process; (1) control data, and (2) user data. Next, the following two (1) and (2) are disclosed as specific examples of the signaling which is a target of the concentration process; (1) NAS signaling or NAS message, and (2) RRC signaling or RRC message.

The following three (1) to (3) are disclosed as specific examples of the method in which a HeNB distinguishes whether a user equipment (UE) being served thereby is an MTCD or not an MTCD. A user equipment (UE) that is not an MTCD is also referred to as "normal UE" in the following description.

(1) Identities of different systems are used in an MTCD and a normal UE. For example, an MTCD-ID is newly provided separately from the current UE-ID. The current UE-ID may be an identity for normal UE and an MTCD-ID may be an identity for MTCD.

(2) An indicator for distinguishing whether or not a UE is an MTCD (hereinafter, also referred to as "MTCD indicator") is newly provided. The following seven (a) to (g) are disclosed as specific examples of the MTCD indicator; (a) indicator indicating whether a UE is an MTCD or normal UE, (b) indicator indicating whether or not a UE is an MTCD, where if the indicator indicating that a UE is not an MTCD is included, a HeNB judges the UE as a normal UE, (c) indicator indicating whether or not a UE is a normal UE, where if the indicator indicating that a UE is not a normal UE is included, a HeNB judges the UE as an MTCD, (d) indicator indicating that a UE is an MTCD, where if the indicator indicating that a UE is an MTCD is not included, a HeNB judges the UE as a normal UE, (e) indicator indicating that a UE is not an MTCD, where if the indicator indicating that a UE is not an MTCD is not included, a HeNB judges the UE as an MTCD, (f) indicator indicating that a UE is a normal UE, where if the indicator indicating that a UE is a normal UE is not included, a HeNB judges the UE as an MTCD, and (g) indicator indicating that a UE is not a normal UE, where if the indicator indicating that a UE is not a normal UE is included, a HeNB judges the UE as a normal TIE.

(3) A HeNB makes judgment based on whether or not access has been made by a communication method in a system other than the mobile communication system standardized by 3GPP. The user equipment that has made access by the communication method in a system other than the mobile communication system standardized by 3GPP is judged as an MTCD.

Among the above-mentioned specific examples of the method in which a HeNB distinguishes whether a user equipment (UE) being served thereby is an MTCD or not an MTCD, in the specific example (1), specific example (2)-(d), specific example (2)-(g), and specific example (3), a parameter or process is not required to be newly added if the current UE is a normal UE. Therefore, the use of the specific example (1), specific example (2)-(d), specific example (2)-(g), or specific example (3) enables to solve the problem without changing the current specifications of the UE.

The following two (1) and (2) are disclosed as specific examples of the method of notifying a HeNB of the distinction whether a UE is an MTCD or not an MTCD. (1) A HeNB is notified of the distinction whether the UE is an MTCD or not an MTCD with the use of an RRC message or RRC signaling. An identity in the different system is used for the RRC message or RRC signaling. Alternatively, an MTCD indicator is mapped to the RRC message or RRC signaling. Specific examples of the RRC signaling include "RRC Connection Request" (see Non-Patent Document 2). Contrary to the specific example (2) below, in the specific example (1), a HeNB can judge whether or not a UE is an MTCD before receiving the data to a core network, which is a target of the concentration process. This enables to prevent a control delay in the concentration process by a HeNB.

(2) A HeNB is notified of the distinction whether the UE is an MTCD or not an MTCD with the use of the data to the core network, on which the concentration process is performed. An identity in the different system is used for the data to the core network. An MTCD indicator is mapped to the data to the core network. The identity in the different system may be used for a header/footer of the data to the core network. Alternatively, an MTCD indicator may be mapped to a header/footer of the data to the core network. If distinction can be made whether the UE is an MTCD or not an MTCD with the use of the header/footer of the data to the core network, a HeNB does not need to always interpret the contents of the message from the MTCD to the core network. Therefore, the processing load of the HeNB can be reduced.

The following four (1) to (4) are disclosed as specific examples of the concentration process. (1) The NAS signaling or NAS message is terminated, and an MME is notified of this separately. On this occasion, an MME may be notified of the above from which unnecessary data is reduced. This reduces the traffic from the HeNB to the core network, and thus the congestion of the core network can be mitigated. (2) The NAS signaling or NAS message is interpreted, and an MME is notified of this separately. On this occasion, an MME may be notified of the above from which unnecessary data is reduced. This reduces the traffic from the HeNB to the core network, and thus the congestion of the core network can be mitigated. (3) An MME is collectively notified of the pieces of data from one or a plurality of MTCDs to a core network. This reduces the number of communication times from a HeNB to a core network, and the congestion of the core network can be mitigated. (4) The combination of (1) to (3) above.

Figure 14:
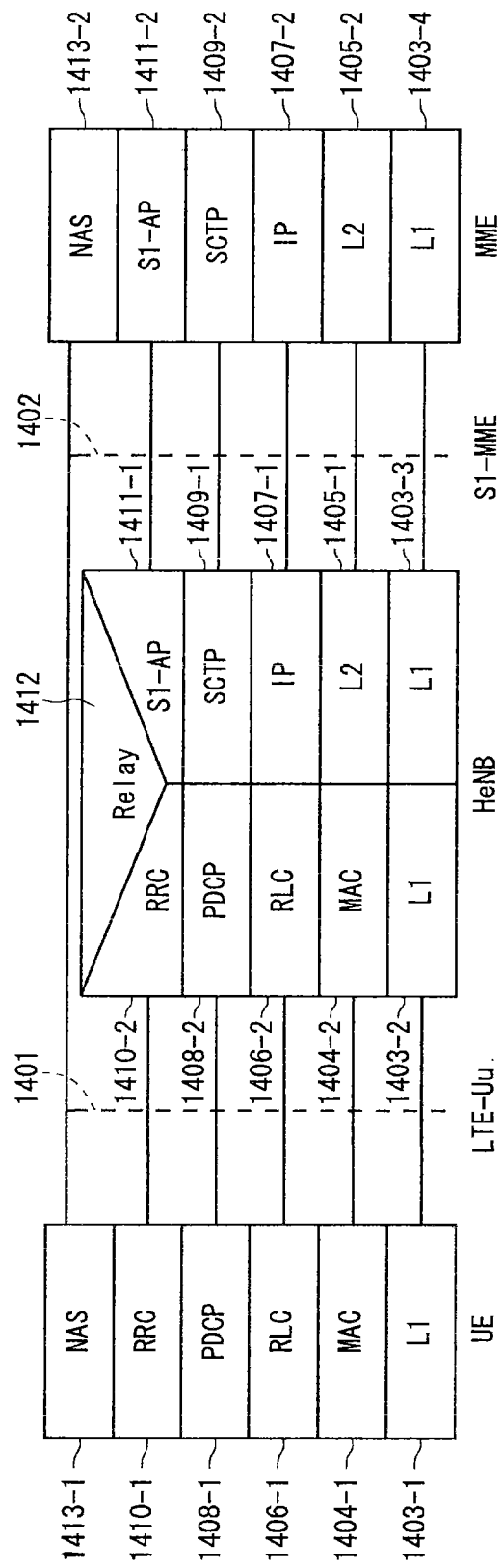
FIG. 14 is a diagram showing a protocol stack of control data between a UE and an MME in a conventional technique.
Figure 15:
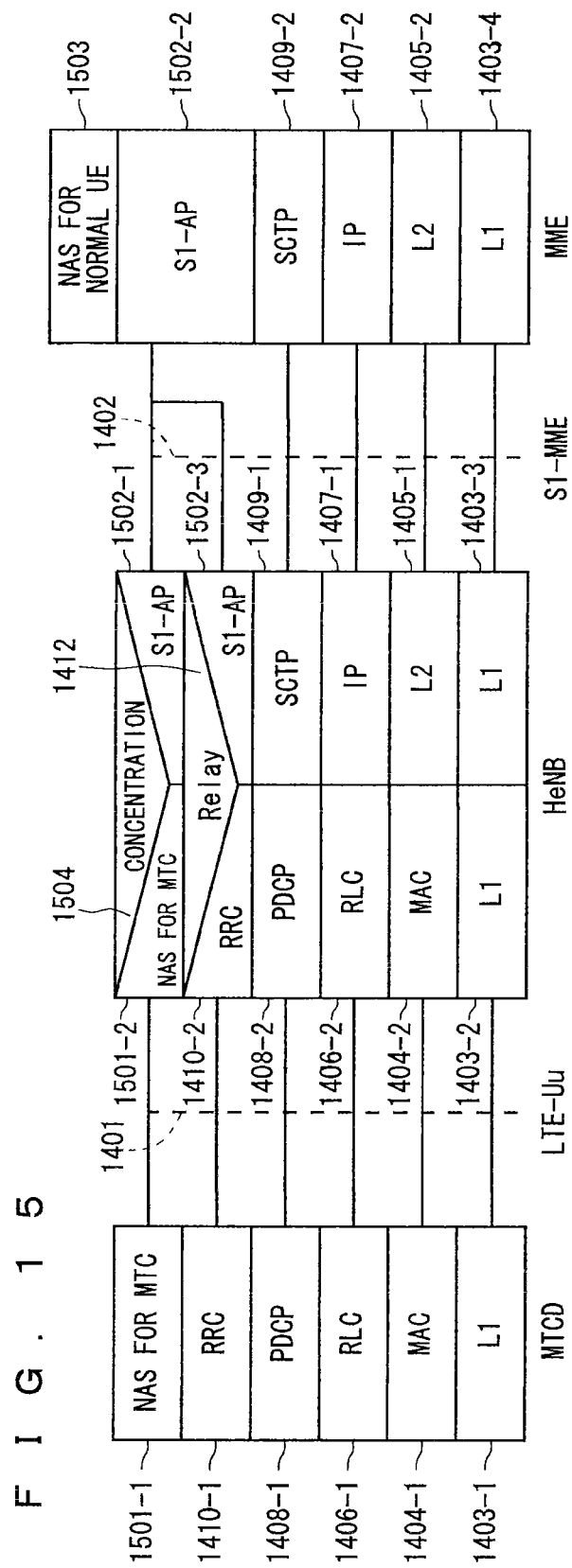
FIG. 15 is a diagram showing a protocol stack of control data between an MTCD and an MME in a first embodiment.

The concept that a HeNB terminates NAS signaling is described with reference to FIG. 14 and FIG. 15. First, a protocol stack of control data between a UE and an MME in a conventional technique is described with reference to FIG. 14. FIG. 14 is a diagram showing a protocol stack of control data between a UE and an MME in a conventional technique. The interface between the UE and HeNB is defined as LTE-Uu 1401 (see Non-Patent Document 1 and TS23.401 V10.0.0 (hereinafter, referred to as "Non-Patent Document 13") by 3GPP). The interface between the HeNB and MME is defined as S1-MME 1402 (see Non-Patent Document 13).

The UE, HeNB, and MME have layer 1 (L1) protocols 1403-1, 1403-2 and 1403-3, and 1403-4, respectively. The UE and HeNB have medium access control (MAC) protocols 1404-1 and 1404-2, respectively. The HeNB and MME have layer 2 (L2) protocols 1405-1 and 1405-2, respectively. The UE and HeNB have radio link control (RLC) protocols 1406-1 and 1406-2, respectively. The HeNB and MME have internet protocols (IPs) 1407-1 and 1407-2, respectively. The UE and HeNB have packet data convergence protocols (PDCPs) 1408-1 and 1408-2, respectively. The HeNB and MME have stream control transport protocols for the control plane (SCTPs) 1409-1 and 1409-2, respectively. The UE and HeNB have radio resource control (RRC) protocols 1410-1 and 1410-2, respectively. The HeNB and MME have S1 application protocols (S1-APs) 1411-1 and 1411-2, respectively.

A relay 1412 is performed in each protocol layer within the HeNB. The UE and MME have non-access stratum (NAS) protocols 1413-1 and 1413-2, respectively. The NAS protocol supports mobility management functionality and user plane bearer activation, modification, and deactivation.

Next, a protocol stack of control data between an MTCD and an MME in the first embodiment is described with reference to FIG. 15. FIG. 15 is a diagram showing the protocol stack of control data between the MTCD and MME in the first embodiment. The portions of FIG. 15 corresponding to the protocol layers shown in FIG. 14 are denoted by the same reference symbols, and the common description is not given here.

The interface between the MTCD and HeNB is defined as LTE-Uu 1401. The MTCD has the layer 1 (L1) protocol 1403-1, MAC protocol 1404-1, RLC protocol 1406-1, PDCP 1408-1 and RRC protocol 1410-1, and an NAS protocol for MTC 1501-1. Herein, though the NAS protocol for MTC does not reach the MME, the term "NAS" is used for the sake of convenience.

The HeNB has the layer 1 (L1) protocol 1403-2, MAC protocol 1404-2, RLC protocol 1406-2, PDCP 1408-2 and RRC protocol 1410-2, and an NAS protocol for MTC 1501-2. Due to the existence of the NAS protocol for MTC 1501-2 in the HeNB, the HeNB can perform concentration 1504 described above. The relay 1412 is performed in each protocol layer within the HeNB. The HeNB and MME have S1-AP 1502-1, 1502-2 and 1502-3, respectively. While FIG. 15 shows the S1-APs in the HeNB through separation into the S1-AP 1502-1 and S1-AP 1502-3, one S1-AP may be provided in the HeNB. The MME has an NAS protocol for normal UE 1503.

The protocol stack of control data between the normal UE and MME in the first embodiment is similar to that of the conventional technique, which is not described here (see FIG. 14). Note that the MME has the NAS protocol for normal UE 1503 (see FIG. 15).

Next, a specific operation example using the first embodiment is described with reference to FIG. 16 and FIG. 17. In this operation example, a case of NAS signaling is disclosed as a specific example of the data from an MTCD to a core network, which is a target of the concentration process by a HeNB. Further, a case in which an MTCD indicator is mapped to the RRC message "RRC Connection Request" is disclosed as a specific example of the method in which a HeNB distinguishes whether a user equipment (UE) being served thereby is an MTCD or not an MTCD. Further, a case in which an MME is collectively notified of pieces of data from one or a plurality of MTCDs to a core network is disclosed as a specific example of the concentration process.

First, a specific example of the concentration process by a HeNB in the first embodiment is described with reference to FIG. 16. FIG. 16 is a flowchart showing the procedure by a HeNB regarding the concentration process in the first embodiment.

In Step ST1601, the HeNB judges whether or not to have received the RRC message "RRC Connection Request" from a UE. In a case of judging to have received the RRC message from the UE, the HeNB moves to Step ST1602. In a case of judging to not have received the RRC message from the UE, the HeNB repeats the judgment process of Step ST1601.

In Step ST1602, the HeNB checks an MTCD indicator to be mapped to the RRC message received in Step ST1601 and moves to Step ST1603.

In Step ST1603, the HeNB judges whether or not to have received the RRC message from the MTCD, that is, whether or not the UE that has transmitted the RRC message received in Step ST1601 is an MTCD, based on the MTCD indicator checked in Step ST1602. In a case of judging to have received the RRC message from the MTCD, that is, judging that the UE that has transmitted the RRC message is an MTCD, the HeNB moves to Step ST1604. In a case of judging to not have received the RRC message from the MTCD, that is, judging that the UE that has transmitted the RRC message is not an MTCD, the HeNB moves to Step ST1605.

In Step ST1604, the HeNB perform the concentrate process on the data from the MTCD to the core network. After ending the process of Step ST1604, the HeNB ends the all procedure. In Step ST1605, the HeNB does not perform the concentrate process on the data from the UE to the core network. In other words, the data is transmitted from the UE to the core network via the HeNB. After ending the process of Step ST1605, the HeNB ends the all procedure.

Next, a specific example of a sequence of the mobile communication system in the first embodiment is described with reference to FIG. 17. FIG. 17 is a diagram showing the sequence of the mobile communication system in the first embodiment. The HeNB has m normal UEs and n MTCDs being served thereby. Here, each of m and n each represents a natural number. Normal UE_1 to normal UE_m represent m normal UEs, and MTCD_1 to MTCD_n represent n MTCDs.

In Step ST1701, the normal UE_1 transmits "RRC Connection Request" being an RRC message, which contains an MTCD indicator, to the HeNB. In Step ST1702, the normal UE_m transmits "RRC Connection Request" being an RRC message, which contains an MTCD indicator, to the HeNB. As described above, in the present embodiment, the normal UE_1 and normal UE_m among the normal UE_1 to normal UE_m transmit "RRC Connection Request" being an RRC message containing an MTCD indicator to the HeNB assuming that the transmission data to the core network has occurred.

In Step ST1703, the MTCD_1 transmits "RRC Connection Request" being an RRC message, which contains an MTCD indicator, to the HeNB. In Step ST1704, the MTCD_n transmits "RRC Connection Request" being an RRC message, which contains an MTCD indicator, to the HeNB. As described above, in the present embodiment, the MTCD_1 and MTCD_n among the MTCD_1 to MTCD_n transmit "RRC Connection Request" being an RRC message, which contains an MTCD indicator, to the HeNB assuming that the transmission data to the core network has occurred.

In Step ST1705, the HeNB checks the MTCD indicator contained in "RRC Connection Request" and judges whether or not the RRC message is the data from the MTCD. In a case of judging that the RRC message is the data from the MTCD, the HeNB moves to Step ST1707. In a case of judging that the RRC message is not the data from the MTCD, the HeNB moves to Step ST1706.

In this operation example, Step ST1701 is the process of transmitting the RRC message from the normal UE_1, and thus, the HeNB judges that the RRC message is not the data from the MTCD in Step ST1705 and moves to Step ST1706. Step ST1702 is the process of transmitting the RRC message from the normal UE_m, and the HeNB judges that the RRC message is not the data from the MTCD in Step ST1705 and moves to Step ST1706. Step ST1703 is the process of transmitting the RRC message from the MTCD_1, and accordingly, the HeNB judges that the RRC message is the data from the MTCD in Step ST1705 and moves to Step ST1707. Step ST1704 is the process of transmitting the RRC message from the MTCD_n, and accordingly, the HeNB judges that the RRC message is the data from the MTCD in Step ST1705 and moves to Step ST1707.

In Step ST1706, the HeNB is configured not to perform the concentration process on the data from the normal UE being a user equipment (UE) other than the MTCD being served thereby to the core network. In this operation example, as to the UE other than the MTCD being served thereby, the HeNB is configured not to perform the concentration process on NAS signaling from a UE, specifically, is configured not to perform concentration process on NAS signaling from a normal UE to a core network.

The HeNB is configured to perform the concentration process on the data from an MTCD being served thereby to the core network In Step ST1707. In this operation example, the HeNB is configured to, as to an MTCD among UEs being served thereby, perform the concentration process on the NAS signaling from the UE, specifically, is configured to perform the concentration process on the NAS signaling from the MTCD to the core network.

In Step ST1708, the normal UE_1 transmits, to the MME via the HeNB, NAS signaling being the data to the core network. The HeNB is configured not to perform the concentration process on NAS signaling from the normal UE_1 in Step ST1706, and thus, the MME is notified of the NAS signaling transmitted from the normal UE_1 per se via the HeNB.

In Step ST1709, the normal UE_m transmits, to the MME via the HeNB, NAS signaling being the data to the core network. The HeNB is configured not to perform the concentration process on NAS signaling from the normal UE_m in Step ST1706, and thus, the MME is notified of the NAS signaling transmitted from the normal UE_m per se via the HeNB. Similarly, in a case where NAS signaling is transmitted from another normal UE to the MME via the HeNB, the MME is notified of the NAS signaling transmitted from the another normal UE per se via the HeNB.

In Step ST1710, the MTCD_1 transmits, to the MME, NAS signaling being the data to the core network. The HeNB is configured to perform the concentration process on the NAS signaling from the MTCD_1 in Step ST1707, and thus, the concentration process is performed on the NAS signaling transmitted from the MTCD_1 in Step ST1712. Alternatively, the normal process in a case where the HeNB receives "RRC Connection Request" (see Non-Patent Document 2) may be omitted in Step ST1712 or Step ST1707. Alternatively, in Step ST1712, the HeNB may notify the MTCD that has transmitted "RRC Connection Request" of "RRC Connection reject". The information indicating that the data from the MTCD to the core network has been received may be mapped to "RRC Connection reject". The information for requesting the retransmission of the data from the MTCD to the core network may be mapped to "RRC Connection reject".

In Step ST1711, the MTCD_n transmits, to the MME, the NAS signaling being the data to the core network. The HeNB is configured to perform the concentration process on the NAS signaling from the MTCD_n in Step ST1707, and thus, in Step ST1712, the concentration process is performed on the NAS signaling transmitted from the MTCD_n. Similarly, in a case where NAS signaling is transmitted from another MTCD to the MME, in Step ST1712, the concentration process is performed on the NAS signaling transmitted from the another MTCD.

In Step ST1712, the HeNB performs the concentration process on the NAS signaling being the data from an MTCD being served thereby to the core network. In Step ST1713, the HeNB collects pieces of data to the MME being pieces of data from the MTCD_1 and MTCD_n to the core network, and notifies the MME of the collected pieces of data.

The first embodiment can achieve the following effects. According to the first embodiment, the HeNB performs the concentration process of concentrating pieces of data from MTCDs being served thereby to the core network. In this case, the HeNB performs the concentration process over the MTCD group. In other words, the HeNB performs the concentration process regardless of an MTCD group, and thus, the number of communication times from a HeNB to a core network or an amount of data can be reduced even in a case where a large number of MTCD groups to be served by the HeNB are located. Accordingly, even in a case where a large number of MTCD groups to be served by a HeNB are located and a situation in which the large number of MTCDs need to communicate data occurs, a mobile communication system capable of mitigating the congestion in a core network can be obtained.

Also in a case where an MTCD is set in a poor radio environment for a mobile communication system standardized by 3GPP, an entity does not need to be provided separately as a concentrator described in Non-Patent Document 12, which enables communication with an MTC user and an MTC server with the use of a 3GPP network starting from a HeNB. This is advantageous in that a mobile communication system can be prevented from becoming complicated because it is not required to separately provide an entity.

First Modification of First Embodiment

In a case where the first embodiment described above is used, the following problem occurs. Contrary to the case in which the concentration process is not performed, a delay occurs in data transmission from an MTCD to a core network due to the concentration process performed. A specific example in which a delay occurs is described with reference to FIG. 17 described above.

The MME is notified of the NAS signaling from the normal UE_1 to the core network, on which the concentration process is not performed, per se via the HeNB in Step ST1708. Meanwhile, the concentration process is performed on the NAS signaling from the MTCD_1 to the core network, on which the concentration process is performed, in the HeNB in Step ST1712, and then, the HeNB separately notifies the MME of the NAS signaling in Step ST1713. As described above, a control delay occurs in the HeNB when the concentration process is performed.

Although it is typically considered that MTCDs are tolerant of delays in many cases, MTCDs sensitive to delay occurrence are conceivable as well. Specific examples thereof include an MTCD equipped with a function of detecting an occurrence of an earthquake. The occurrence of delay in the above-mentioned MTCD sensitive to delay occurrence with the use of the first embodiment above poses a problem in MTCD service.

A solution in a first modification of the first embodiment is described below. A portion different from the solution in the first embodiment is mainly described. The portion that is not described here is as in the first embodiment.

A HeNB concentrates data from an MTCD tolerant of delays among MTCDs being served thereby to an MME, SGSN, MTC server, or the like being a core network. The HeNB does not concentrate data from an MTCD sensitive to delays among MTCDs being served thereby to an MME, SGSN, MTC server, or the like being a core network.

The HeNB concentrates data from an MTCD having a low priority (low priority MTCD) among MTCDs being served thereby to an MME, SGSN, MTC server, or the like being a core network. The HeNB does not concentrate data from an MTCD having a high priority (high priority MTCD) among MTCDs being served thereby to an MME, SGSN, MTC server, or the like being a core network.

Disclosed below is a specific example of the method in which a HeNB distinguishes whether or not a user equipment (UE) being served thereby is a low priority MTCD. An indicator indicating a priority (hereinafter, also referred to as "priority indicator") is newly provided.

The following seven (a) to (g) are disclosed as specific examples of the priority indicator.

(a) An indicator indicating whether a priority is high or low.

(b) An indicator indicating whether or not a priority is low. If an indicator indicating that the priority is not low, the HeNB judges that the MTCD has a high priority.

(c) An indicator indicating whether or not a priority is high. If an indicator indicating that the priority is not high, the HeNB judges that the MTCD has a low priority.

(d) An indicator indicating that an MTCD is a low priority MTCD. If an indicator indicating that a low priority MTC is not included, the HeNB judges that the MTCD is a high priority MTCD.

(e) An indicator indicating that an MTCD is not a low priority MTCD. If an indicator indicating that an MTCD is not a low priority MTCD is not included, the HeNB judges that the MTCD is a low priority MTCD.

(f) An indicator indicating that an MTCD is a high priority MTCD. If an indicator indicating that a high priority MTCD is not included, the HeNB judges that the MTCD is a low priority MTCD.

(g) An indicator indicating that an MTCD is not a high priority MTCD. If an indicator indicating that an MTCD is not a high priority MTCD is not included, the HeNB judges that the MTCD is a high priority MTCD.

While the priority is described to be "low" or "high" here, the priority indicator does not need to be binary. There may be provided a plurality of priorities. The priority indicators may be represented as, for example, integers. As a specific example, the priority indicators are represented as "0", "1", "2", and "3", where the priority becomes higher as the number becomes larger. In the case of this specific example, an MTCD having a priority indicator of "0" or "1" is tolerant of control delays due to the concentration process, and the HeNB concentrates the data from this MTCD to a core network. Meanwhile, an MTCD having a priority indicator of "2" or "3" is sensitive to control delays due to the concentration process, and the HeNB does not concentrate the data from this MTCD to a core network.

The following two (1) and (2) are disclosed as specific examples of the method of notifying a HeNB of the distinction whether or not an MTCD is a low priority MTCD.

(1) The HeNB is notified of the distinction whether an MTCD is a low priority MTCD or a high priority MTCD, with the use of the RRC message or RRC signaling. Alternatively, the priority indicator is mapped to the RRC message or RRC signaling. Specific examples of the RRC signaling include "RRC Connection Request" (see Non-Patent Document 2). Contrary to the specific example (2) described below, in the specific example (1), a HeNB can distinguish whether or not a UE is an MTCD before receiving the data to the core network, which is a target of the concentration process. Accordingly, a control delay in the concentration process by a HeNB can be prevented.

(2) The HeNB is notified of the distinction whether an MTCD is a low priority MTCD or a high priority MTCD, with the use of the data to the core network, on which the concentration process is performed. Further, a priority indicator is mapped to the data to the core network (hereinafter, referred to as "core network data" in some cases). Further, a priority indicator may be mapped to a header or footer of the core network data. If it is possible to distinguish whether a UE is an MTCD or not an MTCD with the use of the header or footer of the core network data, the HeNB is not required to always interpret the contents of the message from the MTCD to the core network. This reduces the processing load of the HeNB.

Next, a specific operation example using the first modification of the first embodiment is described with reference to FIG. 18. FIG. 18 is a flowchart showing the procedure by a HeNB regarding the concentration process in the first modification of the first embodiment. The steps of FIG. 18 corresponding to the steps shown in FIG. 16 are denoted by the same reference symbols, and the common description is not given here.

This operation example discloses the case of NAS signaling as a specific example of the data from an MTCD to a core network, which is a target of the concentration process by the HeNB. The case in which an MTCD indicator is mapped to the RRC message "RRC Connection Request" is disclosed as a specific example of the method in which a HeNB distinguishes whether a user equipment (UE) being served thereby is an MTCD or not an MTCD. The case in which a priority indicator is mapped to the RRC message "RRC Connection Request" is disclosed as a specific example of the method in which a HeNB distinguishes whether an MTCD being served thereby is a low priority MTCD or a high priority MTCD.

The HeNB sequentially performs the processes of Step ST1601 to Step ST1603 described above. In the present modification, the HeNB moves to Step ST1801 in a case of judging that a UE is an MTCD in Step ST1603 or moves to Step ST1605 in a case of judging that a UE is not an MTCD.

In Step ST1801, the HeNB checks a priority indicator mapped to the RRC message and then moves to Step ST1802.

In Step ST1802, the HeNB judges whether or not to have received the RRC message from a low priority MTCD, that is, whether or not the MTCD that has transmitted the RRC message received in Step ST1601 is a low priority MTCD, based on the priority indicator checked in Step ST1801. In a case of judging to have received the RRC message from a low priority MTCD, that is, judging that the MTCD is a low priority MTCD, the HeNB moves to Step ST1604 and then performs the process described above. In a case of judging to not have received the RRC message from a low priority MTCD, that is, judging that the MTCD is not a low priority MTCD, the HeNB moves to Step ST1605 and performs the process described above.

A specific example of the sequence of the mobile communication system in the first modification of the first embodiment is similar to the sequence of the mobile communication system in the first embodiment shown in FIG. 17 except for that Step ST1801 and Step ST1802 shown in FIG. 18 are provided between Step ST1705 and Step ST1706 shown in FIG. 17, which is not shown and described here.

The first modification of the first embodiment can achieve the following effects in addition to the effects of the first embodiment. As to an MTCD tolerant of delays, the congestion in a core network can be mitigated as in the first embodiment by executing a process similar to that of the first embodiment. Moreover, as to an MTCD sensitive to an delay occurrence, the concentration process by the HeNB can be avoided, which enables to avoid an effect due to a control delay through the concentration process.

Second Modification of First Embodiment

A second modification of the first embodiment discloses a start time and an end time of the first embodiment described above.

A solution in the second modification of the first embodiment is described below. A portion different from the solution in the first embodiment is mainly described. The portion that is not described here is as in the first embodiment.

The execution of the process in the first embodiment is started upon instruction from an MME, SGSN, or the like being a core network. The execution of the process in the first embodiment is stopped upon instruction from the MME, SGSN, or the like being a core network.

The following three (1) to (3) are disclosed as specific examples of a trigger for the MME, SGSN, or the like being a core network to instruct a HeNB to start the process (hereinafter, also referred to as "concentration ON") in the first embodiment (hereinafter, also referred to as "concentration process"). (1) Case where an entity such as an MME or SGSN being a core network, that is, component is overloaded. (2) Case where the processing load of the MME, SGSN, or the like being a core network becomes equal to or larger than a threshold. This may be a case where the MTCD-related processing load of the MME, SGSN, or the like being a core network becomes equal to or larger than a threshold. (3) Case where the traffic becomes equal to or larger than a threshold. This may be a case where the MTCD-related traffic becomes equal to or larger than a threshold. This traffic may be the traffic between the MME, and HeNB or may be the traffic between the SGSN and HeNB.

The following three (1) to (3) are disclosed as specific examples of a trigger for a core network to instruct to stop the concentration process (hereinafter, also referred to as "concentration OFF"). (1) Case where an entity such as an MME or SGSN being a core network is no longer overloaded. (2) Case where the processing load of an MME, SGSN, or the like being a core network falls below a threshold. This may be a case where the MTCD-related processing load of the MME, SGSN, or the like being a core network falls below a threshold. (3) Case where the traffic falls below a threshold. This may be a case where the MTCD-related traffic falls below a threshold. This traffic may be the traffic between the MME and HeNB or may be the traffic between the SGSN and HeNB.

Specific examples of the protocol that is used when an MME, SGSN, or the like being a core network instructs a HeNB about concentration ON or concentration OFF include S1-AP.

The following four (1) to (4) are disclosed as specific examples of the signaling for an MME, SGSN, or the like being a core network to instruct a HeNB about concentration ON. (1) Signaling that indicates concentration ON, initiation, or start is newly provided. (2) Signaling that indicates termination ON, initiation, or start of an NAS message is newly provided. (3) Signaling that indicates interpretation ON, initiation, or start of an NAS message is newly provided. (4) "Overload Start" being the existing S1-AP signaling is used (see TS36.413 V9.3.0 (hereinafter, referred to as "Non-Patent Document 14") by 3GPP).

In the current specifications, an eNB that has received "Overload Start" from an MME performs the process of, for example, rejecting RRC connection from a user equipment being served thereby. Meanwhile, in the second modification of the first embodiment, an eNB that has received "Overload Start" from an MME performs the concentration process on an MTCD being served thereby.

The specific example (4) is more advantageous than the specific examples (1) to (3) in that new signaling is not required to be provided, which prevents a mobile communication system from becoming complicated. In the current "Overload Start" specifications, access per se from a user equipment being served by an eNB is rejected. Meanwhile, in the specific example (4), the number of communication times is reduced or the traffic is reduced by performing the concentration process on the data from an MTCD being a UE other than a normal UE, to thereby mitigate an overloaded state of the core network. The data from a normal UE may be transmitted to a core network as usual. This enables to prevent a rejection of access per se from a user equipment being served by an eNB. Therefore, a user-friendly mobile communication system can be constructed.

The following four (1) to (4) are disclosed as specific examples of signaling for an MME, SGSN, or the like being a core network to instruct a HeNB about concentration OFF. (1) Signaling that indicates concentration OFF, suspension, or stop is newly provided. (2) Signaling that indicates termination OFF, suspension, or stop of an NAS message is newly provided. (3) Signaling that indicates interpretation OFF, suspension, or stop of an NAS message is newly provided. (4) "Overload stop" being the existing S1-AP signaling is used (see Non-Patent Document 14).

In the current specifications, an eNB that has received "Overload stop" from an MME starts a normal operation on the MME. Meanwhile, in the second modification of the first embodiment, an eNB that has received "Overload stop" from an MME stops the concentration process on an MTCD being served thereby.

The specific example (4) is more advantageous than the specific examples (1) to (3) in that new signaling is not required to be provided, which prevents a mobile communication system from becoming complicated. In addition, in a case where the overloaded state of the MME is solved, the concentration process that may cause a delay can be stopped for the data from an MTCD being a UE other than a normal UE. Therefore, a user-friendly mobile communication system can be constructed.

Figure 19:
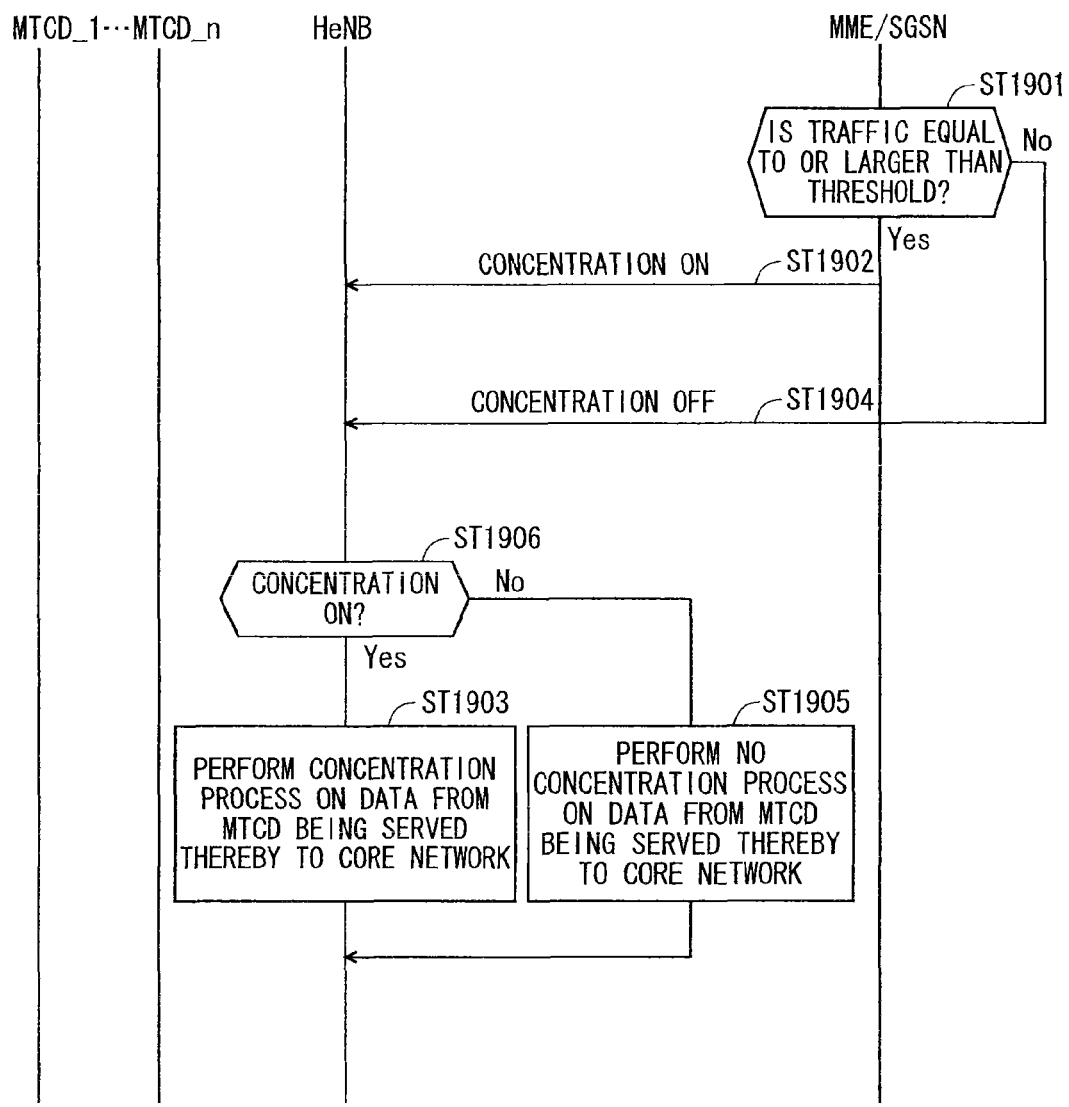
FIG. 19 is a diagram showing a sequence of a mobile communication system in a second modification of the first embodiment.

Next, a specific operation example using the second modification of the first embodiment is described with reference to FIG. 19. FIG. 19 is a diagram showing a sequence of a mobile communication system in the second modification of the first embodiment. The MTCD_1 to MTCD_n to be served by a HeNB are located.

This operation example discloses a case in which the traffic becomes equal to or larger than a threshold as a specific example in which an MME, SGSN, or the like being a core network instructs a HeNB to start the concentration process. In addition, this operation example discloses a case in which the traffic falls below a threshold as a specific example of a trigger for an MME, SGSN, or the like being a core network to instruct a HeNB to stop the concentration process. This operation example discloses a case in which signaling that indicates concentration ON is newly provided as a specific example of the signaling for an MME, SGSN, or the like being a core network to instruct a HeNB about concentration ON. In addition, this operation example discloses a case in which signaling that indicates concentration OFF is newly provided as a specific example of the signaling for an MME, SGSN, or the like being a core network to instruct a HeNB about concentration OFF.

In Step ST1901, the MME judges whether or not the traffic between the MME and HeNB becomes equal to or larger than a threshold. In a case of judging that the traffic becomes equal to or larger than the threshold, the MME moves to Step ST1902. In a case of judging that the traffic does not become equal to or larger than the threshold, that is, falls below the threshold, the MME moves to Step ST1904.

In Step ST1902, the MME notifies the HeNB of signaling that indicates concentration ON.

In Step ST1904, the MME notifies the HeNB of signaling that indicates concentration OFF.

In Step ST1906, the HeNB judges whether or not to have received the signaling that indicates concentration ON. In a case of judging to have received the signaling that indicates concentration ON, the HeNB moves to Step ST1903. In a case of judging to not have received the signaling that indicates concentration ON, the HeNB moves to Step ST1905. Though not shown, the HeNB may judge whether or not to have received the signaling that indicates concentration OFF after judging to not have received the signaling that indicates concentration ON in Step ST1906. In a case of judging to have received the signaling that indicates concentration OFF, the HeNB may move to Step ST1905. In a case of judging to not have received the signaling that indicates concentration OFF, the HeNB may perform a normal process.

In Step ST1903, the HeNB executes the concentration process on the data from an MTCD being served thereby to a core network. In Step ST1903, the HeNB may omit a normal process in a case of receiving "RRC Connection Request" (see Non-Patent Document 2). In Step ST1903, the HeNB may notify the MTCD that has transmitted "RRC Connection Request" of "RRC Connection reject". The information indicating that the data from the MTCD to the core network has been received may be mapped to "RRC Connection reject". The information for requesting the retransmission of data from the MTCD to the core network may be mapped to "RRC Connection reject".

In Step ST1905, the HeNB does not execute the concentration process on the data from the MTCD being served thereby to the core network.

While the present modification has mainly described an example in combination with the first embodiment, the present modification can be used also in combination with the first modification of the first embodiment.

The second modification of the first embodiment can achieve the following effects in addition to the effects of the first embodiment. With the use of the second modification of the first embodiment, in a case where the core network becomes congested or the entity of the core network becomes overloaded, the concentration process by the HeNB can be started by the decision of the core network. Upon initiation of the concentration process, it is possible to mitigate the congestion in the core network while keeping the service for a user equipment.

Further, in a case where the congestion of the core network is mitigated or the overloaded state of the entity of the core network is solved, the concentration process by the HeNB can be stopped by the decision of the core network. Contrary to the first embodiment regarding the method of concentrating the data from MTCDs being served by a HeNB to a core network, a control delay of MTCD service, which occurs in the concentration process, is solved because the concentration process is stopped, and a user-friendly mobile communication system can be constructed.

Third Modification of First Embodiment

In a case where the second modification of the first embodiment described above is used, the following problem arises. Considered here is a case in which a HeNB with the capability of performing a concentration process and a HeNB without the capability of performing a concentration process are located. It is useless to execute the process of the second modification of the first embodiment on a HeNB without the capability of performing a concentration process by an MME, SGSN, or the like being a core network to notify the instruction to start or stop the concentration process. Specifically, unused communication resources from the core network to the HeNB and unnecessary process by the core network are generated.

A solution in a third modification of the first embodiment is described below. A portion different from the solutions in the first embodiment and the second modification of the first embodiment is mainly described. The portion that is not described here is as in the first embodiment and the second modification of the first embodiment.

The HeNB informs an MME, SGSN, or the like being a core network of the capability information regarding the concentration process for the data from the MTCD. The core network executes the process of the second modification of the first embodiment described above on a HeNB with the capability of performing a concentration process for the data from the MTCD.

The following three (1) to (3) are disclosed as specific examples of the capability information regarding the concentration process notified the core network by the HeNB; (1) information indicating whether or not the data from an MTCD can be concentrated, information indicating that the data from an MTCD can be concentrated, or information indicating that the data from an MTCD cannot be concentrated, (2) information indicating whether or not NAS signaling can be interpreted, information indicating that NAS signaling can be interpreted, or information indicating that NAS signaling cannot be interpreted, and (3) information indicating whether or not NAS signaling can be terminated, information indicating that NAS signaling can be terminated, or information indicating that NAS signaling cannot be terminated.

Among the specific examples of the capability information regarding the concentration process, the use of the (1) information indicating that the data from an MTCD can be concentrated, (2) information indicating that NAS signaling can be interpreted, and (3) information indicating that NAS signaling can be terminated is effective in that a HeNB without the capability of performing a concentration process does not need to notify the core network of the capability information regarding the concentration process.

The following three (1) to (3) are disclosed as specific examples of the timing at which a HeNB notifies a core network of the capability information regarding a concentration process. (1) Time when a HeNB is installed. In a case where the capability of a HeNB to perform a concentration process remains unchanged, such an effect that the generation of unused communication resources is prevented can be achieved. (2) Periodically. This is effective in a case where the capability of a HeNB to perform a concentration process is changed. In addition, the capability information is notified periodically, leading to an effect of high resistance to communication error. (3) Time when the capability of a HeNB changes. This is effective in a case in which the capability of a HeNB to perform a concentration process changes. Contrary to the specific example (2), notification is made only when the capability changes, whereby an effect that the generation of unused communication resources is prevented can be achieved.

The following three (1) to (3) are disclosed as specific examples of signaling when a HeNB notifies a core network of the capability information regarding a concentration process.

(1) S1 signaling or S1 message is newly provided. S1 signaling for control may be provided. Alternatively, S1 signaling that does not require a response message from an MME, SGSN, or the like being a receiver may be provided. S1 signaling that does not require a response message is also referred to as "Class 2" (see Non-Patent Document 14). S1 signaling that is not associated with a user equipment may be provided. S1 signaling that is not associated with a user equipment is also referred to as "non UE associated signaling" (see Non-Patent Document 14). Examples of the parameter mapped to the newly provided S1 signaling include the "capability information regarding the concentration process of notifying a core network by a HeNB" described above.

(2) S1 signaling or S1 message is newly provided. S1 signaling for control may be provided. Alternatively, S1 signaling that requires a response message from an MME, SGSN, or the like being a receiver may be provided. S1 signaling that requires a response message is also referred to as "class 1" (see Non-Patent Document 14). Alternatively, S1 signaling that is not associated with a user equipment may be provided. Examples of the parameter mapped to a newly provided S1 signaling include "capability information regarding the concentration process notified a core network by a HeNB" described above.

(3) The existing S1 signaling is used. The existing S1 signaling for control may be used. Alternatively, the existing S1 signaling that is not associated with a user equipment may be used. Examples of the parameter that needs to be added to the existing S1 signaling include "capability information regarding the concentration process notified a core network by a HeNB" described above. This is more advantageous than the specific examples (1) and (2) in that new signaling is not required to be provided, which prevents a mobile communication system from becoming complicated.

Next, the following two (a) and (b) are disclosed as specific examples of the existing S1 signaling.

(a) "S1 SETUP REQUEST" (see Non-Patent Document 14). The purpose of "S1 SETUP REQUEST" is to exchange application level data needed for the eNB and MME to interoperate correctly on the S1 interface. The contained parameter is the information specific to an eNB, such as a CSG-ID, global cell identity, and TAC of an eNB. Similarly, the capability information regarding the concentration process of the HeNB is the information specific to a HeNB. Therefore, with the use of "S1 SETUP REQUEST" for notifying a core network of the capability information regarding the concentration process by a HeNB, an MME that receives "S1 SETUP REQUEST" can obtain the information specific to a HeNB at once. This leads to effects that the processing load of an MME is reduced and a control delay as a mobile communication system is prevented.

(b) "eNB Configuration Update" (see Non-Patent Document 14). The purpose of "eNB Configuration Update" is to update application level data needed for the eNB and MME to interoperate correctly on the S1 interface. The already contained parameter is the information specific to an eNB such as a CSG-ID and TAC of an eNB. Similarly, the capability information regarding the concentration process by a HeNB is the information specific to a HeNB. Therefore, with the use of "eNB Configuration Update" for notifying a core network of the capability information regarding the concentration process by a HeNB, an MME that receives "eNB Configuration Update" can obtain the information specific to a HeNB at once. This leads to effects that the processing load of an MME is reduced and a control delay as a mobile communication system is prevented.

Figure 20:
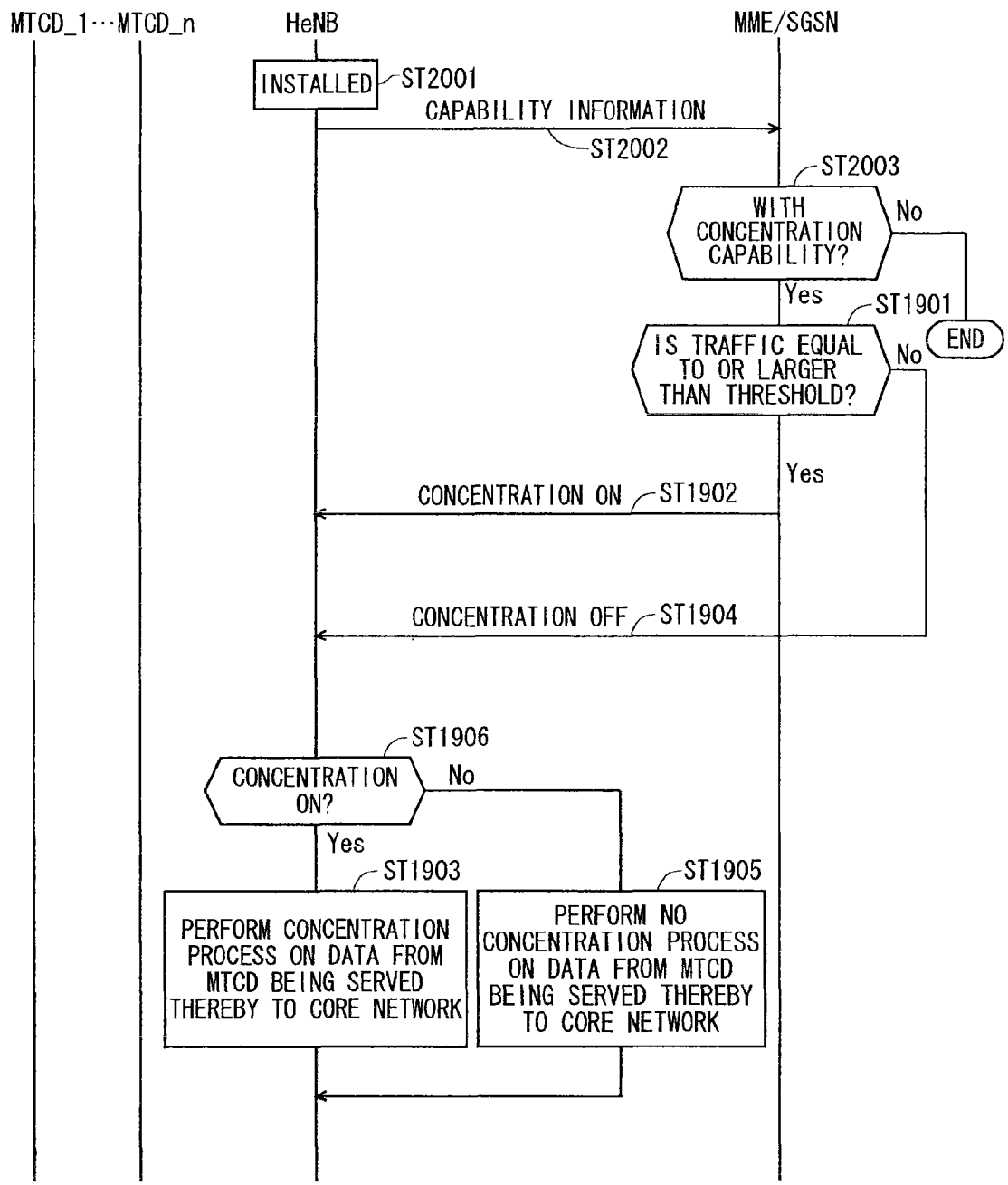
FIG. 20 is a diagram showing a sequence of a mobile communication system in a third modification of the first embodiment.

Next, a specific operation example using the third modification of the first embodiment is described with reference to FIG. 20. FIG. 20 is a diagram showing a sequence of a mobile communication system in the third modification of the first embodiment. The steps of FIG. 20 corresponding to the steps shown in FIG. 19 are denoted by the same reference symbols, and the common description is not given here.

This operation example discloses a time when a HeNB is installed as a specific example of the timing at which a HeNB notifies a core network of the capability information regarding a concentration process.

In Step ST2001, a HeNB is installed. In Step ST2002, the HeNB notifies an MME of the capability information regarding the concentration process by the HeNB. The MME that has received the capability information regarding the concentration process stores and manages this information.

In Step ST2003, the MME judges whether or not the HeNB has the capability of performing a concentration process based on the capability information regarding the concentration process which has been received in Step ST2002. In a case of judging that the HeNB has the capability of performing a concentration process, the MME moves to Step ST1901.

In a case of judging that the HeNB does not have the capability of performing a concentration process, the MME ends the process, which is not essential in the present embodiment and thus is not described here.

After it is judged that the HeNB has the capability of performing a concentration process in Step ST2003, the MME and HeNB perform the processes of Step ST1901 to Step ST1906 as in FIG. 19 described above. As shown in FIG. 20, the process of Step ST1901 is performed after the process of Step ST2003 in the present modification. Alternatively, the process of Step ST2003 and the process of Step ST1901 may be performed in an arbitrary order, or the process of Step ST2003 may be performed after the process of Step ST1901.

While the present modification has mainly described an example in combination with the first embodiment and the second modification of the first embodiment, the present modification can be used also in combination with the first modification of the first embodiment.

The third modification of the first embodiment can achieve the following effects in addition to the effects of the first embodiment and the second modification of the first embodiment. It is possible to prevent a core network from notifying a HeNB without the capability of performing a concentration process of the instruction to start and stop the concentration process. Accordingly, communication resources from a core network to a HeNB can be used effectively and the processing load of the core network can be reduced.

Fourth Modification of First Embodiment

The fourth modification of the first embodiment discloses another solution to the same problem as that of the third modification of the first embodiment. The solution in the fourth modification of the first embodiment is described below. A portion different from the solutions in the first embodiment and the second modification of the first embodiment is mainly described. A portion that is not described here is as in the first embodiment and the second modification of the first embodiment.

In the fourth modification of the first embodiment, the MME, SGSN, or the like being a core network executes the process of the second modification of the first embodiment on a HeNB with the capability of performing a concentration process as well as a HeNB without the capability of performing a concentration process. The operation is varied depending on whether or not a HeNB has the capability of performing a concentration process among the HeNBs that have received the instruction to start or stop the concentration process.

The first embodiment, the first modification of the first embodiment, and the second modification of the first embodiment are specific examples of the operation of a HeNB with the capability of performing a concentration process.

Specific examples of the operation of a HeNB without the capability of performing a concentration process are disclosed below. First, the following four (1) to (4) are disclosed as specific examples of the operation of the HeNB that has received an instruction to start the concentration process from the MME, SGSN, or the like being a core network.

(1) The HeNB stops or rejects the transmission/reception of the data to/from the MME, SGSN, or the like being a core network by a user equipment being served thereby. Specific examples of the data to the MME include NAS message and NAS signaling.

(2) The HeNB rejects signaling related to RRC connection from a user equipment being served thereby. Specific examples of the signaling related to RRC connection include "RRC CONNECTION REQUEST" and "RRC CONNECTION Reestablishment Request" (see Non-Patent Document 2).

(3) The HeNB performs the operation when receiving "Overload Start" from the current MME (see Non-Patent Document 14). Specifically, the HeNB rejects the establishment of RRC connection other than one for an emergency call.

(4) Combination of (1) to (3) above.

The execution of a normal operation is a specific example of the operation by a HeNB that has received the instruction to stop a concentration process from an MME, SGSN, or the like being a core network.

Figure 21:
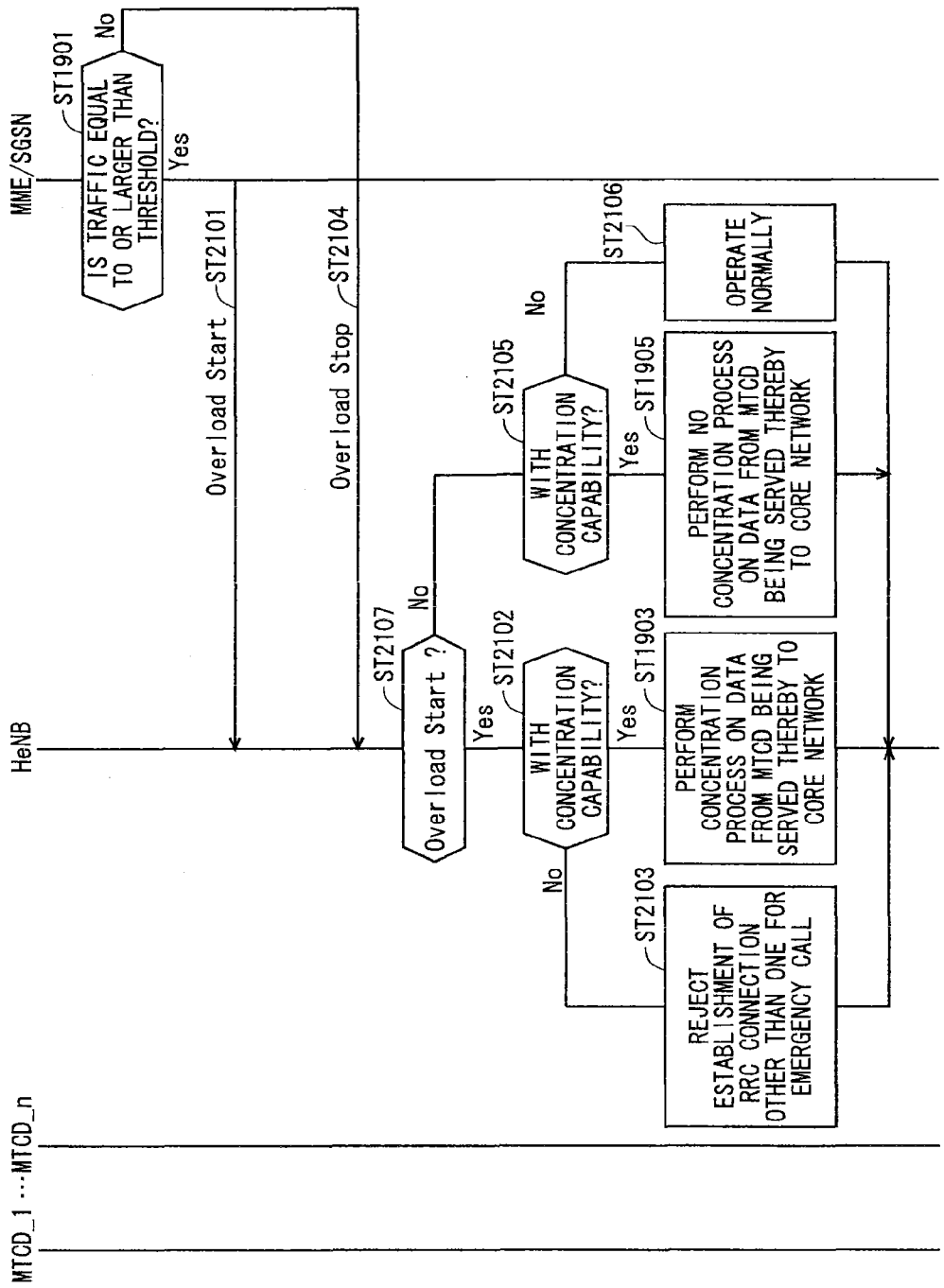
FIG. 21 is a diagram showing a sequence of a mobile communication system in a fourth modification of the first embodiment.

Next, a specific operation example using the fourth modification of the first embodiment is described with reference to FIG. 21. FIG. 21 is a diagram showing a sequence of a mobile communication system in the fourth modification of the first embodiment. The steps of FIG. 21 corresponding to the steps shown in FIG. 19 are denoted by the same reference symbols, and the common description is not given here.

This operation example discloses a case in which "Overload Start" being the current S1-AP signaling is used as a specific example of the signaling for a core network to instruct a HeNB about concentration ON. In addition, this operation example discloses a case in which "Overload stop" being the current S1-AP signaling is used as a specific example of the signaling for a core network to instruct a HeNB about concentration OFF. Further, this operation example discloses a case in which the operation when the current "Overload Start" is received is performed as an operation example in a case where a HeNB without the capability of performing a concentration process receives an instruction to start the concentration process from a core network.

In Step ST1901, the MME judges whether or not the traffic between the MME and HeNB becomes equal to or larger than a threshold. In a case of judging that the traffic becomes equal to or larger than the threshold, the MME moves to Step ST2101. In a case of judging that the traffic does not become equal to or larger than the threshold, that is, falls below the threshold, the MME moves to Step ST2104.

In Step ST2101, the MME notifies the HeNB of "Overload Start". In Step ST2104, the MME notifies the HeNB of "Overload Stop".

In Step ST2107, the HeNB judges whether or not to have received "Overload Start". In a case of judging to have received "Overload Start", the HeNB moves to Step ST2102. In a case of judging to not have received "Overload Start", the HeNB moves to Step ST2105. Though not shown, the HeNB may judge whether or not to have received "Overload Stop" after judging to not have received "Overload Start" in Step ST2107. Then, the HeNB may move to Step ST2105 in a case of judging to have received "Overload Stop" or move to Step ST2106 in a case of judging to not have received "Overload Stop".

In Step ST2102, the HeNB judges whether or not the own cell has the capability of performing a concentration process. In a case of judging to have the capability of performing a concentration process, the HeNB moves to Step ST1903. In a case of judging to not have the capability of performing a concentration process, the HeNB moves to Step ST2103.

In Step ST1903, the HeNB executes the concentration process on the data from an MTCD being served thereby to a core network, and ends the process. In Step ST2103, the HeNB rejects the establishment of RRC connection other than one for an emergency call from a user equipment being served thereby and ends the process.

In Step ST2105, the HeNB judges whether or not the own cell has the capability of performing a concentration process. In a case of judging to have the capability of performing a concentration process, the HeNB moves to Step ST1905. In a case of judging to not have the capability of performing a concentration process, the HeNB moves to Step ST2106.

In Step ST1905, the HeNB does not execute the concentration process on the data from an MTCD being served thereby to the core network. In Step ST2106, the HeNB operates normally.

The judgment process of Step ST2105 may be omitted such that the HeNB that has received "Overload Stop" from the MME in Step ST2104 moves to Step ST2106 and performs a normal operation irrespective of the presence or absence of the capability of performing a concentration process.

While the present modification has mainly described the example in combination with the first embodiment and the second modification of the first embodiment, the present modification can be used also in combination with the first modification of the first embodiment.

The fourth modification of the first embodiment can achieve the following effects in addition to the effects in the first embodiment and the second modification of the first embodiment. Contrary to the third modification of the first embodiment, the HeNB does not need to notify the core network of the capability information of the own cell regarding the concentration process, and the communication resources between the HeNB and core network can be used effectively.

Further, the core network does not need to store the presence or absence of the capability of a HeNB being served thereby to perform a concentration process and vary the operation depending on the presence or absence of the capability regarding the concentration process (see Step ST2003 in FIG. 20), which reduces the processing load of the core network.

In a case where the core network becomes congested and the core network notifies the HeNB of the signaling for instructing concentration ON, the communication between the HeNB and core network or the operation leading to a reduction of the processing load of the core network is started irrespective of whether or not the HeNB has the capability of performing a concentration process (see Step ST2103 and Step ST1903 in FIG. 21). Therefore, it is possible to avoid the congestion in the core network irrespective of whether or not the HeNB has the capability of performing a concentration process.

Second Embodiment

A second embodiment discloses a specific method of transmitting data from a HeNB to an MME, SGSN, or the like being a core network after the HeNB performs a concentration process using the first embodiment.

A solution in the second embodiment is described below. A HeNB serves as a trigger or origin, and transmits data from an MTCD being served thereby to an MME, SGSN, MTC server, or the like being a core network.

The following two (1) and (2) are disclosed as specific examples of the condition that a HeNB serves as a trigger of the data transmission to an MME, SGSN, MTC server, or the like being a core network from an MTCD being served thereby.

(1) A HeNB transmits the data from an MTCD being served thereby to a core network irrespective of the reception of the uplink data from the MTCD being served thereby. This transmission may be performed over the resources for MTCD. Specific examples of the resources for MTCD include a time at which the communication for MTCD is allowed, a period in which the communication for MTCD is allowed, and a resource in which the communication for MTCD is allowed. The time or period when the communication for MTCD is allowed is equivalent to an allowed period. The resource in which the communication for MTCD is allowed is equivalent to an allowed resource. The resources for MTCD may be configured or updated by the MME, SGSN, MTC server, or the like being a core network for the HeNB or may be determined in a static manner, that is, determined in advance.

According to Non-Patent Document 9 described above, a message is held for a determined time period from the point in time when the eNB receives the message from the MTCD. Meanwhile, in this specific example, a message is transmitted to the core network at the time when, for example, the communication for MTCD is allowed irrespective of the point in time when a HeNB receives the message from an MTCD. Therefore, in this specific example, the core network is capable of grasping the time at which the transmission for MTCD may be performed from a HeNB. According to Non-Patent Document 9, the core network cannot grasp the point in time when an eNB receives a message from an MTCD, and thus cannot grasp the time at which an eNB may perform the transmission for MTCD based on the point in time of receiving the message from an MTCD. Therefore, in this specific example, the core network can adjust the load due to an MTCD more easily compared with Non-Patent Document 9.

TR 23.888 V0.5.1 (hereinafter, referred to as "Non-Patent Document 15") by 3GPP discloses that a network operator allows MTCDs to access a network during only a pre-defined period. Meanwhile, in this specific example, it is not required to set a period during which MTCDs are allowed to access a network. Accordingly, it is not required to notify a large number of MTCDs of the allowed period or set the allowed period by a core network, whereby radio resources can be used effectively. Moreover, it is not required to manage the time of each MTCD in a core network or achieve synchronization between the core network and MTCD in this specific example, which prevents a communication system from becoming complicated.

(2) A HeNB transmits the data from an MTCD being served thereby to an MME, SGSN, MTC server, or the like being a core network upon reception of the uplink data from the MTCD being served thereby.

The following two (a) and (b) are disclosed as specific examples of the uplink data from an MTCD.

(a) Reception of RRC message or RRC signaling. Non-Patent Document 9 discloses that an eNB transmits data from an MTCD to a core network upon reception of NAS signaling. In this specific example, the data from an MTCD to a core network is transmitted upon reception of RRC signaling. This enables to prepare the concentration process at an earlier stage compared with Non-Patent Document 9. The HeNB may transmit the data from an MTCD being served thereby to a core network after a lapse of a pre-determined time period or after a lapse of a time period set by a core network from the point in time when receiving the RRC message. Alternatively, in a case of receiving RRC messages from MTCDs being served thereby a pre-determined number of times, the HeNB may transmit the data from the MTCDs being served thereby to a core network.

(b) Reception of the uplink data transmitted in a communication system other than the mobile communication system standardized by 3GPP. According to this specific example, even in a case where an MTCD is installed in a poor radio environment for a mobile communication system standardized by 3GPP, the HeNB is capable of transmitting the data from the MTCD being served thereby to a core network upon reception of the uplink data from the MTCD being served thereby, as described in the specific example (2) above.

The HeNB may transmit the data from an MTCD being served thereby to a core network after a lapse of a pre-determined time period or after a lapse of a time period set by the core network from the point in time of receiving the uplink data transmitted in a communication system other than the mobile communication system standardized by 3GPP. Alternatively, in a case of receiving the uplink data transmitted from MTCDs being served thereby a pre-determined number of times in a communication system other than the mobile communication system standardized by 3GPP, the HeNB may transmit the data from MTCDs being served thereby to a core network.

Disclosed below is a specific example of signaling when a HeNB transmits the data from an MTCD being served thereby to an MME, SGSN, MTC server, or the like being a core network via the S-GW. The data is transmitted by means of a user datagram protocol (UDP) (see Non-Patent Document 13). The data may be user data.

Disclosed below is a specific example of signaling when a HeNB transmits the data from an MTCD being served thereby to an MME, SGSN, MTC server, or the like being a core network via the MME. The S1 interface (also referred to as "S1-MME" or "S1-U") is used. The data may be control data.

Another specific example when a HeNB transmits data from an MTCD being served thereby to a core network by means of an S1 interface is disclosed below. S1 signaling or S1 message is newly provided. S1 signaling for control may be provided. Alternatively, S1 signaling that does not require a response message from an MME, SGSN, or the like being a receiver may be provided. The S1 signaling that does not require a response message is also referred to as "Class 2" (see Non-Patent Document 14). Still alternatively, S1 signaling that is not associated with a user equipment may be provided. The S1 signaling that is not associated with a user equipment is also referred to as "non UE associated Signaling" (see Non-Patent Document 14).

The following eight (1) to (8) are disclosed as specific examples of parameters to be mapped to S1 signaling to be newly provided. (1) HeNB identity. The receiver is capable of identifying via which HeNB the data has been transmitted, and thus, the identity may be physical cell identity (PCI), cell global identity (CGI), or the like. (2) MTCD identity. The receiver is capable of identifying from which MTCD the data has been transmitted, and thus, the identity may be an IMSI or a production number of an MTCD. This parameter may be provided for the number of MTCDs on which the concentration process is performed, that is, for the same number as the number of MTCDs on which the concentration process is performed. (3) Protocol data unit (PDU) for MTC. The PDU is an aggregation of pieces of data meaningful between peer layers. This enables to map data from an MTCD to a core network on S1 signaling to be newly provided. This parameter may be provided for the number of MTCDs on which the concentration process is performed, that is, for the same number as the number of MTCDs on which the concentration process is performed. (4) Service data unit (SDU) for MTC. The SDU is an aggregation of pieces of data requested to be transferred from upper layers. This enables to map, to the core network on S1 signaling to be newly provided, the data from the MTCD. This parameter may be provided for the number of MTCDs on which the concentration process is performed, that is, for the same number as the number of MTCDs on which the concentration process is performed. (5) Service type or service identity. This enables to support a case in which the transmission destination of data differs among services. Further, even if one MTCD supports a plurality of services, it is possible to support, for example, a case in which the transmission destination of data differs among services. (6) Information indicating to which MTC server the data is directed or to which MTC user the data is directed. Specific examples thereof include an MTC server identity and an MTC user identity. This enables to appropriately change the transmission destination. (7) Identity or index indicating the combination of (5) and (6) above. (8) Combination of (1) to (7) above.

Figure 22:
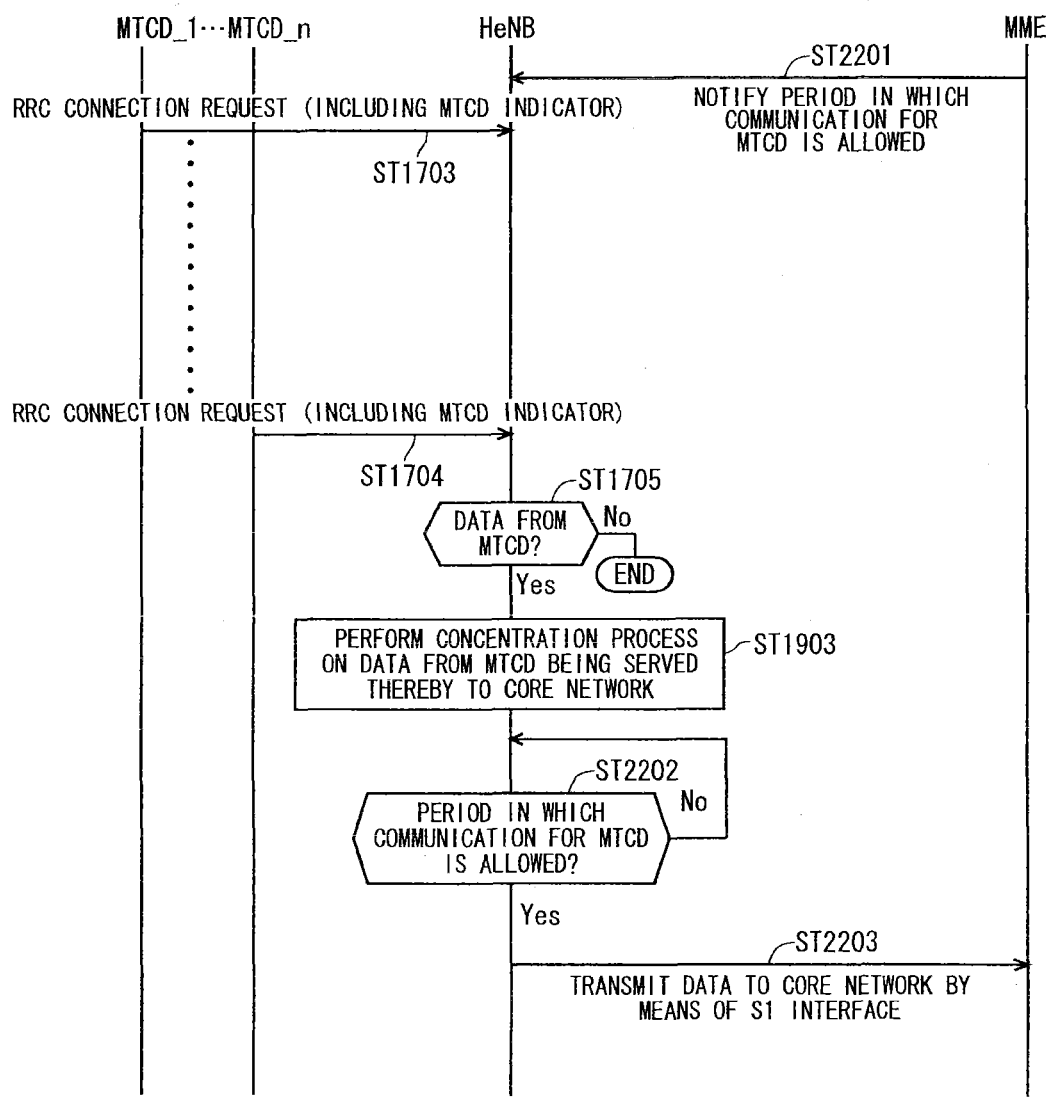
FIG. 22 is a diagram showing a sequence of a mobile communication system in a second embodiment.

Next, a specific operation example using the second embodiment is described with reference to FIG. 22. FIG. 22 is a diagram showing a sequence of a mobile communication system in the second embodiment. The steps of FIG. 22 corresponding to the steps shown in FIG. 17 and FIG. 19 are denoted by the same reference symbols, and the common description is not given here.

This operation example discloses, as a specific example of the condition in which a HeNB serves as a trigger of the data transmission from an MTCD being served thereby to a core network, a case in which the HeNB transmits the data from an MTCD being served thereby to a core network irrespective of the reception of the uplink data from the MTCD being served thereby. In addition, this operation example discloses a case in which the transmission to the core network is performed during a period in which the communication for MTCD is allowed.

In Step ST2201, the MME notifies the HeNB of the period information indicating the period in which the HeNB is allowed to transmit the data from MTCDs being served thereby to a core network. In other words, the MME notifies the HeNB of the period information indicating a period in which the communication for MTCD is allowed.

Then, the MTCD_1 performs the process of Step ST1703 described above, and the MTCD_n performs the process of Step ST1704 described above. The HeNB that has received "RRC Connection Requests" transmitted from the MTCD_1 and MTCD_n performs the processes of Step ST1705 and Step ST1903 described above. After ending the process of Step ST1903, the HeNB moves to Step ST2202.

In Step ST2202, the HeNB judges whether or not the period is one in which communication for MTCD is allowed, based on the period information received in Step ST2201. In a case of judging that the period is one in which the communication for MTCD is allowed, the HeNB moves to Step ST2203. In a case of judging that the period is not one in which the communication for MTCD is allowed, the HeNB repeats the judgment process of Step ST2202.

In Step ST2203, the HeNB transmits the data from MTCDs being served thereby to a core network by means of the S1 interface. In actuality, the processes corresponding to those of Step ST1705, Step ST1903, and Step ST2202 are performed after the process of Step ST1703 in this operation example, which are not shown and described for easy understanding.

In a case of judging that the data is not from the MTCD in Step ST1705, the HeNB ends the process, which is not essential in the present embodiment and thus is not described here. Alternatively, in a case of judging that the data is not from an MTCD in Step ST1705, the HeNB may perform a process similar to that of Step ST2202 and show that there is no data from an MTCD during a period in which the communication for MTCD is allowed. For example, "empty" may be notified.

This causes the MME to receive any data during a period in which the communication for MTCD is allowed, leading to a reduction of communication errors between the HeNB and MME.

It is conceivable that the HeNB may receive an RRC message from an MTCD being served thereby and perform the processes corresponding to those of Step ST1705, Step ST1903, and Step ST2202 while repeating the judgment process of Step ST2202, which is not described here for easy understanding.

Figure 23:
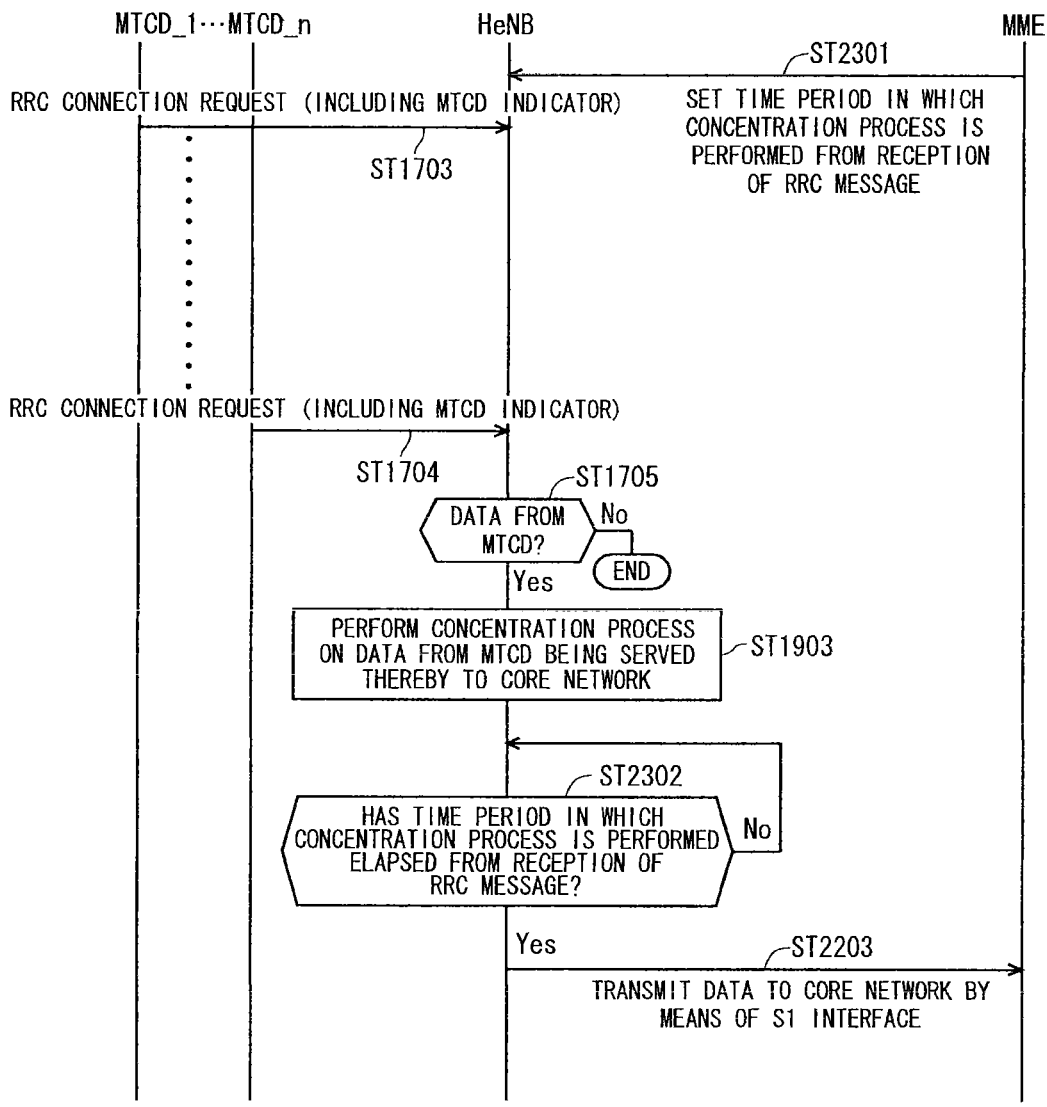
FIG. 23 is another diagram showing the sequence of the mobile communication system in the second embodiment.

Next, a specific operation example using the second embodiment is described with reference to FIG. 23. FIG. 23 is a diagram showing a sequence of the mobile communication system in the second embodiment. The steps of FIG. 23 corresponding to the steps shown in FIG. 17 and FIG. 22 are denoted by the same reference symbols, and the common description is not given here.

This operation example discloses, as a specific example of the condition in which a HeNB serves as a trigger of the transmission of data from an MTCD being served thereby to a core network, a case in which the HeNB transmits the data from the MTCD being served thereby to the core network upon reception of the uplink data from the MTCD being served thereby. In addition, this operation example discloses a case of RRC signaling as a specific example of uplink data.

In Step ST2301, the MME sets, for the HeNB, the time period from the reception of the RRC message to the transmission of the data from the MTCD to the core network. In other words, the MME sets, for the HeNB, the concentration process time period being a time period from the reception of the RRC message to the concentration process.

Then, in Step ST1703, the MTCD_1 performs the process of transmitting "RRC Connection Request" to the HeNB and, in Step ST1704, the MTCD_n performs the process of transmitting "RRC Connection Request" to the HeNB. The HeNB that has received "RRC Connection Requests" transmitted from the MTCD_1 and MTCD_n performs the processes of Step ST1705 and Step ST1903 described above. The HeNB moves to Step ST2302 after ending the process of Step ST1903.

In Step ST2302, the HeNB judges whether or not the concentration process time period set in Step ST2301 has elapsed from the reception of the RRC message. In the case of judging that the concentration process time period has elapsed, the HeNB moves to Step ST2203. In the case of judging that the concentration process time period has not elapsed, the HeNB repeats the judgment process of Step ST2302. In this operation example, the HeNB performs the process of judging whether or not the concentration process time period has elapsed in Step ST2302. Alternatively, the HeNB may perform the process of judging whether or not the concentration process time period has elapsed from the reception of the RRC message first received after the last transmission of the data from the MTCD being served thereby to the core network.

In actuality, the processes corresponding to those of Step ST1705, Step ST1903, and Step ST2302 are performed after the process of Step ST1703 in this operation example, which are not described here for easy understanding.

In a case of judging that the data is not from the MTCD in Step ST1705, the HeNB ends the process, which is not essential in the present embodiment and thus is not described here. Alternatively, in a case of judging that the data is not from the MTCD in Step ST1705, the HeNB may perform a process similar to that of Step ST2202 to show that there is no data from the MTCD during a period in which the communication for MTCD is allowed. For example, "empty" may be notified.

This causes the MME to receive any data during the period in which the communication for MTCD is allowed, leading to a reduction of communication errors between the HeNB and MME.

It is also conceivable that the HeNB may separately receive the RRC message from an MTCD being served thereby and perform the processes corresponding to those of Step ST1705, Step ST1903, and Step ST2302 while repeating the judgment process of Step ST2302, which is not described here for easy understanding.

While the present embodiment has mainly described the example in combination with the first embodiment, the present embodiment can be used also in combination with the first modification of the first embodiment, the second modification of the first embodiment, the third modification of the first embodiment, and the fourth modification of the first embodiment.

The present embodiment can also be used when an eNB holds back and aggregates the signaling messages common to the MTCD group, which is disclosed in Non-Patent Document 9.

The second embodiment can achieve the following effects. It is possible to establish the method in which a HeNB performs the concentration process on the data from an MTCD being served thereby to the core network, and then the HeNB transmits the data to the core network.

First Modification of Second Embodiment

A first modification of the second embodiment discloses another specific example of the second embodiment when the HeNB transmits the data from an MTCD being served thereby to the MME, SGSN, MTC server, or the like being a core network via the MME by means of the S1 interface.

S1 signaling or S1 message is newly provided. S1 signaling for control may be provided. Alternatively, S1 signaling that requires a response message from an MME, SGSN, or the like being a receiver may be provided. The S1 signaling that requires a response message is also referred to as "Class1" (see Non-Patent Document 14).

In a case of receiving a message indicating success, for example, "Successful message" or "Ack message" in the response message from the MME, the HeNB may transmit the next data. In a case of receiving a message indicating failure, for example, "Unsuccessful message", "failure message", or "Nack message" in the response message from the MME, the HeNB may perform retransmission. Alternatively, S1 signaling that is not associated with a user equipment may be provided. The S1 signaling that is not associated with a user equipment is also referred to as "non UE associated Signaling" (see Non-Patent Document 14).

Specific examples of parameters mapped to the S1 signaling to be newly provided are similar to those of the second embodiment above, which are not described here.

Figure 24:
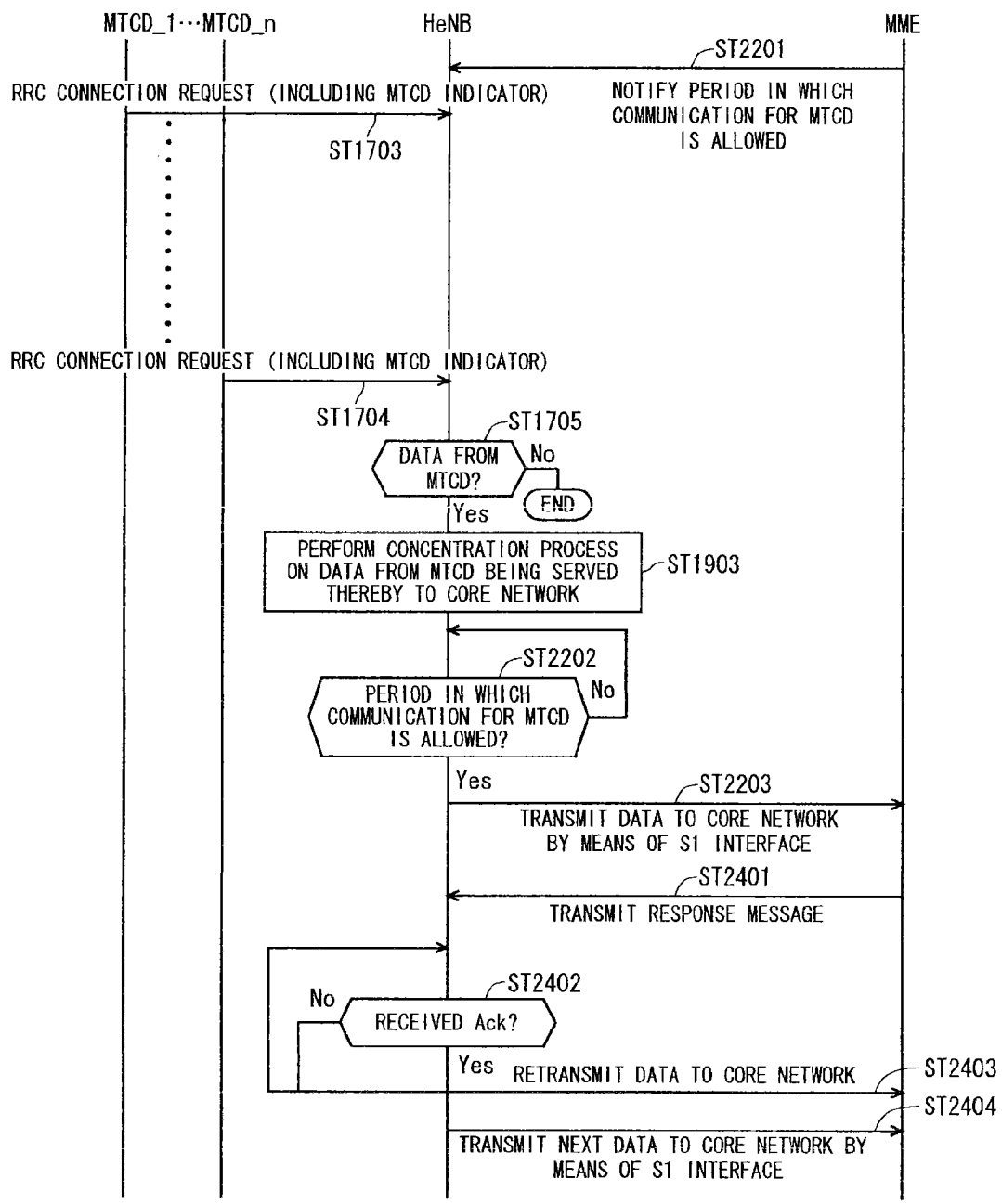
FIG. 24 is a diagram showing a sequence of a mobile communication system in a first modification of the second embodiment.

Next, a specific operation example using the first modification of the second embodiment is described with reference to FIG. 24. FIG. 24 is a diagram showing a sequence of a mobile communication system in the first modification of the second embodiment. The steps of FIG. 24 corresponding to the steps shown in FIG. 17 and FIG. 22 are denoted by the same reference symbols, and the common description is not given here.

This operation example discloses, as a specific example of the condition in which a HeNB serves as a trigger for the transmission from an MTCD being served thereby to a core network, a case in which a HeNB transmits the data from the MTCD being served thereby to the core network irrespective of the reception of uplink data from the MTCD being served thereby. In addition, this operation example discloses a case in which the transmission to the core network is performed during a period in which the communication for MTCD is allowed.

The MME performs the process of Step ST2201 described above. Then, in Step ST1703, the MTCD_1 performs the process of transmitting "RRC Connection Request" to the HeNB and, in Step ST1704, the MTCD_n performs the process of transmitting "RRC Connection Request" to the HeNB. The HeNB that has received "RRC Connection Requests" transmitted from the MTCD_1 and MTCD_n performs the processes of Step ST1705 and Step ST1903 described above. The HeNB performs the processes of Step ST2202 and Step ST2203 described above after ending the process of Step ST1903.

Then, in Step ST2401, the MME, which has received the data from the MTCD being served thereby to the core network through signaling by means of the S1 interface of class 1 from the HeNB in Step ST2203, transmits a response message in response to the message of the received data to the HeNB.

Then, in Step ST2402, the HeNB judges whether or not to have received a message indicating success, for example, Ack message. Specifically, the HeNB judges whether or not the response message received in Step ST2401 is a message indicating success, for example, Ack message. In a case of judging that the response message is a message indicating success, for example, Ack message, the HeNB moves to Step ST2404. In a case of judging that the response message is not a message indicating success, that is, the response message is a message indicating failure, for example, Nack message, the HeNB moves to Step ST2403.

In Step ST2403, the HeNB retransmits the data from the MTCD being served thereby to the core network, which has been transmitted in Step ST2203, and then returns to Step ST2402 to repeat the judgment process.

In Step ST2404, the HeNB transmits, to the MME, the next data from the MTCD being served thereby to the core network by means of the S1 interface.

While the present modification has mainly described the example in combination with the first embodiment, the present modification can be used also in combination with the first modification of the first embodiment, the second modification of the first embodiment, the third modification of the first embodiment, and the fourth modification of the first embodiment.

The present modification can also be used when an eNB holds back and aggregates the signaling messages common to the MTCD group, which is disclosed in Non-Patent Document 9.

The first modification of the second embodiment can achieve the following effects. It is possible to establish the method in which a HeNB performs the concentration process on the data from an MTCD being served thereby to a core network, and then, the HeNB transmits the data to the core network.

Second Modification of Second Embodiment

A second modification of the second embodiment discloses another specific example of the second embodiment when the HeNB transmits the data from an MTCD being served thereby to an MME, SGSN, MTC server, or the like being a core network via the MME by means of the S1 interface. The existing S1 signaling or S1 message is used.

The existing S1 signaling for control may be used. Alternatively, the existing S1 signaling that is not associated with a user equipment may be used.

The following five (1) to (5) are disclosed as specific examples of the parameters required for the existing S1 signaling when a HeNB transmits the data from an MTCD being served thereby to an MME, SGSN, MTC server, or the like being a core network via the MME by means of the S1 interface; (1) HeNB identity, (2) MTCD identity, which may be provided for the number of MTCDs on which the concentration process is performed, that is, for the same number as the number of MTCDs on which the concentration process is performed, (3) PDU or SDU for MTC, which may be provided for the number of MTCDs on which the concentration process is performed, that is, for the same number as the number of MTCDs on which the concentration process is performed, (4) service type or service identity, and (5) information indicating to which MTC server the data is directed or to which MTC user the data is directed.

Next, the following two (a) and (b) are disclosed as specific examples of the existing S1 signaling.

(a) "S1 SETUP REQUEST" (see Non-Patent Document 14). The parameters mapped to "S1 SETUP REQUEST" contain "Global eNB ID" being a HeNB identity of the specific example (1) of the parameters required for the existing S1 signaling. Therefore, parameters required to be newly added to "S1 SETUP REQUEST" are the MTCD identity of the specific example (2), the PDU or SDU for MTC of the specific example (3), the service type or service identity of the specific example (4), and the information indicating to which MTC server the data is directed or to which MTC user the data is directed of the specific example (5). The MTCD identity may be provided for the number of MTCDs on which the concentration process is performed, that is, for the same number as the number of MTCDs on which the concentration process is performed. The PDU or SDU for MTC may be provided for the number of MTCDs on which the concentration process is performed, that is, for the same number as the number of MTCDs on which the concentration process is performed.

A parameter indicating that the data from an MTCD has been correctly received may be added to "S1 SETUP RESPONSE" being a response message indicating success, which is transmitted from the MME in response to "S1 SETUP REQUEST". The HeNB that has received "S1 SETUP RESPONSE" including the parameter indicating that the data has been correctly received may transmit the next data from the MTCD. Alternatively, the HeNB that has received "S1 SETUP RESPONSE" may transmit the next data from the MTCD, without newly providing the parameter indicating that the data has been correctly received. A parameter indicating that the data from the MTCD has not been correctly received may be added to "S1 SETUP FAILURE" being a response message indicating failure, which is transmitted from the MME in response to "S1 SETUP REQUEST". The HeNB that has received "S1 SETUP FAILURE" including the parameter indicating that the data has not been correctly received may retransmit the same data from the MTCD. Alternatively, the HeNB that has received "S1 SETUP FAILURE" may retransmit the same data from the MTCD, without newly providing the parameter indicating that the data has not been correctly received.

(b) "eNB Configuration Update" (see Non-Patent Document 14). The parameters mapped to "eNB Configuration Update" include "eNB Name" being a HeNB identity of the specific example (1), which is the parameter required for the existing S1 signaling described above. Therefore, parameters required to be newly added to "S1 SETUP REQUEST" are the MTCD identity of the specific example (2), the PDU or SDU for MTC of the specific example (3), the service type or service identity of the specific example (4), and the information indicating to which MTC server the data is directed or to which MTC user the data is directed of the specific example (5). The MTCD identity may be provided for the number of MTCDs on which the concentration process is performed, that is, for the same number as the number of MTCDs on which the concentration process is performed. The PDU or SDU for MTC may be provided for the number of MTCDs on which the concentration process is performed, that is, for the same number as the number of MTCDs on which the concentration process is performed.

A parameter indicating that the data from an MTCD has been correctly received may be added to "eNB Configuration Update Acknowledge" being a response message indicating success, which is transmitted from the MME in response to "eNB Configuration Update". The HeNB that has received "eNB Configuration Update Acknowledge" including the parameter indicating that the data has been correctly received may transmit the next data from the MTCD. Alternatively, the HeNB that has received "eNB Configuration Update Acknowledge" may transmit the next data from the MTCD, without newly providing the parameter indicating that the data has been correctly received. A parameter indicating that the data from the MTCD has not been correctly received may be added to "eNB Configuration Update FAILURE" being a response message indicating failure, which is transmitted from the MME in response to "eNB Configuration Update". The HeNB that has received "eNB Configuration Update FAILURE" including the parameter indicating that the data has not been correctly received may retransmit the same data from the MTCD. Alternatively, the HeNB that has received "eNB Configuration Update FAILURE" may retransmit the same data from the MTCD, without newly providing the parameter indicating that the data has not been correctly received.

While the present modification has mainly described the example in combination with the first embodiment, the present modification can be used also in combination with the first modification of the first embodiment, the second modification of the first embodiment, the third modification of the first embodiment, and the fourth modification of the first embodiment.

The present modification can also be used when an eNB holds back and aggregates the signaling messages common to the MTCD group, which is disclosed in Non-Patent Document 9.

The second modification of the second embodiment can achieve the following effects in addition to the effects in the second embodiment. The present modification is more advantageous than the second embodiment and the first modification of the second embodiment in that signaling does not need to be newly provided, which prevents a mobile communication system from becoming complicated.

Third Modification of Second Embodiment

A third modification of the second embodiment discloses another specific example of the second embodiment when the HeNB transmits the data from an MTCD being served thereby to an MME, SGSN, MTC server, or the like being a core network via the MME by means of the S1 interface. The existing S1 signaling or S1 message is used. The existing S1 signaling for control may be used. Alternatively, the existing S1 signaling associated with a user equipment may be used.

The existing S1 signaling associated with a user equipment is also referred to as "UE associated Signalling" (see Non-Patent Document 14).

The following nine (1) to (9) are disclosed as specific examples of the parameters required for the existing S1 signaling when a HeNB transmits the data from an MTCD being served thereby to an MME, SGSN, MTC server, or the like being a core network via the MME by means of the S1 interface.

(1) HeNB identity. This may be a physical cell identity (PCI), cell global identity (CGI), or the like for allowing a receiver to identify via which HeNB the data has been transmitted.

(2) MTCD identity. This may be an IMSI or a production number of an MTCD for allowing a receiver to identify from which MTCD the data has been transmitted. This parameter may be provided for the number of MTCDs on which the concentration process is performed, that is, for the same number as the number of MTCDs on which the concentration process is performed.

(3) PDU for MTC. The PDU is an aggregation of pieces of data meaningful between peer layers. The use of PDU enables to map, to S1 signaling to be newly provided, data from an MTCD to a core network. This parameter may be provided for the number of MTCDs on which the concentration process is performed, that is, for the same number as the number of MTCDs on which the concentration process is performed.

(4) SDU for MTC. The SDU is an aggregation of pieces of data requested to be transferred from upper layers. The use of SDU enables to map, to S1 signaling to be newly provided, the data from the MTCD to the core network. This parameter may be provided for the number of MTCDs on which the concentration process is performed, that is, for the same number as the number of MTCDs on which the concentration process is performed.

(5) Indicator indicating that S1 signaling is for MTC or indicator indicating that S1 signaling is not associated with a normal UE. The existence of this parameter allows a HeNB to judge whether or not S1 signaling is used for the data transmission from an MTCD being served thereby to a core network. This eliminates the need to include the parameter regarding a normal UE during S1 signaling or enables the operation such as indicating that a parameter regarding a normal UE is meaningless information when the data is transmitted from an MTCD to a core network.

(6) Service type or service identity. This enables to support a case in which the transmission destination of data differs among services. Further, even in a case of supporting a plurality of services by one MTCD, it is possible to support, for example, a case in which the transmission destination of data differs among services.

(7) Information indicating to which MTC server the data is directed or to which MTC user the data is directed. Specific examples thereof include an MTC server identity and an MTC user identity. This enables to appropriately change the transmission destination.

(8) Identity or index indicating the combination of (6) and (7) above.

(9) Combination of (1) to (8) above.

Next, the following two (a) and (b) are disclosed as specific examples of the existing S1 signaling.

(a) "Initial UE Message" (see Non-Patent Document 14). In the current specifications, when receiving an uplink NAS message, an eNB transmits the message to an MME with the use of "Initial UE Message" including the PDU of NAS. Therefore, the transmission of, by a HeNB, the data from an MTCD being served thereby to a core network to an MME using "Initial UE Message" means that S1 signaling similar to the current specifications can be used for a similar purpose. This enables to prevent a mobile communication system from becoming complicated. Note that the present modification can be used also in a case where a HeNB does not receive an uplink NAS message.

Next, parameters required to be added to and changed in "Initial UE Message" are described. The parameters mapped to "Initial UE Message" contain "CGI" being (1) HeNB identity. Therefore, specific examples of the parameters required to be newly added to "Initial UE Message" are (2) to (8) below. (2) MTCD identity. (3) PDU for MTC. (4) SDU for MTC. "Initial UE Message" contains NAS-PDU. For example, if S1 signaling is for MTC, the NAS-PDU may be a PDU for MTC. (5) Indicator indicating that S1 signaling is for MTC. (6) Service type or service identity. (7) Information indicating to which MTC server the data is directed or to which MTC user the data is directed. (8) Identity or index indicating the combination of (6) and (7) above.

The parameter required to be changed in the parameter included in "Initial UE Message" is "eNB UE S1AP ID". In the current specifications, an eNB allocates unique "eNB UE S1AP ID" to be used for a user equipment and maps "eNB UE S1AP ID" to "Initial UE Message". "eNB UE S1AP ID" is a unique identity associated with a user equipment on an S1 interface. In a case where a HeNB performs the concentration process and then the HeNB transmits the data to a core network, the data to be transmitted includes the data from a plurality of MTCDs in some cases. That is, the S1 interface is not used uniquely to a user equipment. This leads to a situation in which a HeNB cannot allocate "eNB UE S1AP ID". In the current specifications, "eNB UE S1AP ID" needs to be always mapped to "Initial UE Message". That is, in a case where the data from a plurality of MTCDs is transmitted through one "Initial UE Message" in the concentration process, a problem that unity is lost as a mobile communication system arises in handling "eNB UE S1AP ID". If unity is not achieved as a mobile communication system, a problem that, for example, a stable communication network cannot be provided occurs. Therefore, for example, even if "eNB UE S1AP ID" is mapped, parameters ineffective in a receiver or mapping in a transmitter is not necessarily required but optionally required as long as S1 signaling is for MTC. This clarifies the process by a HeNB and enables to construct a unified mobile communication network, and hence, a stable communication network can be provided.

(b) "Uplink NAS Transport" (see Non-Patent Document 14). In the current specifications, when receiving an NAS message to be transmitted to the MME to which a connection associated with a user equipment via S1 interface exists, an eNB transmits this message to the MME with the use of "Uplink NAS Transport" including the PDU of NAS. Therefore, the transmission of, by a HeNB, the data from an MTCD being served thereby to a core network to an MME using "Uplink NAS Transport" means that S1 signaling similar to the current specifications can be used for a similar purpose. This enables to prevent a mobile communication system from becoming complicated. Note that the present modification can be used also in a case where a HeNB does not receive an uplink NAS message. Further, the present modification can be used also in a case where there is no connection by means of the S1 interface.

Next, parameters required to be added to and changed in "Uplink NAS Transport" are described. The parameters mapped to "Uplink NAS Transport" contain "CGI" being (1) HeNB identity. Therefore, specific examples of the parameters required to be newly added to "Uplink NAS Transport"

are (2) to (8) below. (2) MTCD identity. (3) PDU for MTC. (4) SDU for MTC. "Uplink NAS Transport" contains NAS-PDU. For example, if S1 signaling is for MTC, the NAS-PDU may be a PDU for MTC. (5) Indicator indicating that S1 signaling is for MTC. (6) Service type or service identity. (7) Information indicating to which MTC server the data is directed or to which MTC user the data is directed. (8) Identity or index indicating the combination of (6) and (7) above.

The following two (b1) and (b2) are disclosed as the parameters that need to be changed in the parameters included in "Uplink NAS Transport".

(b1) "eNB UE S1AP ID". In the current specifications, an eNB allocates unique "eNB UE S1AP ID" to be used for a user equipment and maps "eNB UE S1AP ID" to "Uplink NAS Transport". "eNB UE S1 AP ID" is a unique identity associated with the user equipment on an S1 interface. In a case where a HeNB performs the concentration process and then the HeNB transmits the data to a core network, the data to be transmitted includes the data from a plurality of MTCDs in some cases. That is, the S1 interface is not used uniquely to a user equipment. This leads to a situation in which a HeNB cannot allocate "eNB UE S1AP ID".

In the current specifications, "eNB UE S1AP ID" is necessarily required to be mapped to "Uplink NAS Transport". That is, in a case where the data from a plurality of MTCDs is transmitted through one "Uplink NAS Transport" in the concentration process, a problem that unity is lost as a mobile communication system occurs in handling "eNB UE S1AP ID". If unity is not achieved as a mobile communication system, a problem that, for example, a stable communication network cannot be provided occurs. Therefore, for example, even if "eNB UE S1 AP ID" is mapped, parameters ineffective in a receiver or mapping in a transmitter is not necessarily required but optionally required as long as S1 signaling is for MTC. This clarifies the process by a HeNB and enables to construct a unified mobile communication network, and hence, a stable communication network can be provided.

(b2) "MME UE S1AP ID". "MME UE S1AP ID" is a unique identity associated with a user equipment on an S1 interface. In a case where a HeNB performs the concentration process and then the HeNB transmits the data to a core network, the data to be transmitted includes the data from a plurality of MTCDs in some cases. That is, the S1 interface is not used uniquely to a user equipment. This leads to a situation in which a HeNB cannot allocate "MME UE S1AP ID".

In the current specifications, "MME UE S1AP ID" is necessarily required to be mapped to "Uplink NAS Transport". That is, in a case where the data from a plurality of MTCDs is transmitted through one "Uplink NAS Transport" in the concentration process, a problem that unity is lost as a mobile communication system occurs in handling "MME UE S1AP ID". If unity is not achieved as a mobile communication system, a problem that, for example, a stable communication network cannot be provided occurs. Therefore, for example, even if "MME UE S1AP ID" is mapped, parameters ineffective in a receiver or mapping in a transmitter is not necessarily required but optionally required as long as S1 signaling is for MTC. This clarifies the process by a HeNB and enables to construct a unified mobile communication network, and hence, a stable communication network can be provided.

While the present modification has mainly described the example in combination with the first embodiment, the present modification can be used also in combination with the first modification of the first embodiment, the second modification of the first embodiment, the third modification of the first embodiment, and the fourth modification of the first embodiment.

The present modification can also be used when an eNB holds back and aggregates the signaling messages common to the MTCD group, which is disclosed in Non-Patent Document 9.

The third modification of the second embodiment can achieve the following effects in addition to the effects of the second embodiment. The present modification is more advantageous than the second embodiment and the first modification of the second embodiment in that signaling does not need to be newly provided, which prevents a mobile communication system from becoming complicated.

Fourth Modification of Second Embodiment

In a case where the second embodiment above is used, the following problem occurs. Considered here is the case in which a HeNB with the capability of performing a concentration process and a HeNB without the capability of performing a concentration process are located. It is useless to execute the process of the second embodiment on a HeNB without the capability of performing a concentration process by an MME, SGSN, or the like being a core network to notify a time, a period, or resources in which communication for MTCD is allowed by means of an S1 interface. Specifically, unused communication resources from the core network to the HeNB and the unnecessary process by the core network are generated.

A solution in the fourth modification of the second embodiment is described below. A portion different from the solutions of the first embodiment and the second embodiment is mainly described. A portion that is not described here is as in the first embodiment and the second embodiment.

A HeNB notifies an MME, SGSN, or the like being a core network of the capability information regarding the concentration process for the data from an MTCD. The core network executes the second embodiment on a HeNB with the capability of performing a concentration process for the data from the MTCD, to thereby notify the HeNB of the resources for MTCD.

The core network may execute the second embodiment on only the HeNB on which the concentration process is performed, to thereby notify the HeNB of the resources for MTCD.

In a case of executing the second modification of the first embodiment, a core network may notify the resources for MTCD when instructing a HeNB to start the concentration process. In that case, the core network may notify the resources for MTCD together with the instruction for concentration ON. The resources for MTCD may be added to parameters as a specific example of the signaling for a core network to instruct a HeNB about concentration ON, which has been disclosed in the second modification of the first embodiment.

A specific example of the capability information regarding the concentration process notified a core network by a HeNB is similar to that of the third modification of the first embodiment, which is not described here.

The following five (1) to (5) are disclosed as specific examples of the timing at which a HeNB notifies a core network of the capability information regarding the concentration process.

(1) Time when a HeNB is installed. In a case where the capability of a HeNB to perform a concentration process remains unchanged, such an effect that the generation of unused communication resources is prevented can be achieved.

(2) Periodically. This is effective in a case where the capability of a HeNB to perform a concentration process changes. In addition, the capability information is notified periodically, leading to an effect of high resistance to communication error.

(3) Time when the capability of a HeNB changes. This is effective in a case in which the capability of a HeNB to perform a concentration process changes. Contrary to the specific example (2), notification is made only when the capability changes in the specific example (3), whereby an effect that the generation of unused communication resources is prevented can be achieved.

(4) Time when a HeNB starts a concentration process or before HeNB starts the a concentration process. It may be notified that the concentration process is started as the capability information regarding the concentration process. If even a HeNB with the capability of performing a concentration process has no MTCD being served thereby, the notification of the resources for MTCD by a core network is unnecessary. Contrary to the specific examples (1) to (3), in the specific example (4), a core network is capable of notifying only a HeNB that actually needs the resources for MTCD of the resources for MTCD. Accordingly, in the specific example (4), the communication resources from a core network to a HeNB can be used effectively, and the processing load of the core network can be reduced.

(5) At the end of the concentration process. It may be notified that the concentration process is ended as the capability information regarding the concentration process. The specific example (4) and the specific example (5) may be used in combination.

A specific example of signaling when a HeNB notifies a core network of the capability information regarding the concentration process is similar to that of the third modification of the first embodiment, which is not described here. On that occasion, in a case where S1 signaling that requires a response message is provided with the use of the specific example (2), the resources for MTCD may be mapped to the response message. This enables to omit the communication procedure and reduce the processing loads of a HeNB and a core network. Besides, the communication resources can be used effectively.

In a case where the existing S1 signaling that needs the existing response message is provided with the use of the specific example (3), the resources for MTCD may be mapped to the response message. This enables to omit the communication procedure and reduce the processing loads of a HeNB and a core network. Besides, the communication resources can be used effectively. Specific examples of the response message include "S1 SETUP RESPONSE", "S1 SETUP FAILURE", "eNB CONFIGURATION UPDATE ACKNOWLEDGE", and "eNB Configuration Update FAILURE".

The following three (1) to (3) are disclosed as specific examples of the method of releasing the resources for MTCD. (1) An effective period is predetermined as to the resources for MTCD. In a case where the effective period has elapsed, a core network releases the resources for MTCD. (2) In a case of notifying a HeNB of the resources for MTCD, a core network also notifies the effective period as to the resources. In a case where the effective period has elapsed, a core network releases the resources for MTCD. (3) In a case of using the above-mentioned specific example (5) of the timing at which a HeNB notifies a core network of the capability information regarding a concentration process, the core network that has received the notification releases the resources for MTCD.

It is not required to secure unused resources by releasing the resources for MTCD with the use of the specific examples (1) to (3). Further, the released communication resources can be used for other communication, for example, communication for normal UEs. This enables to effectively use communication resources.

As to the specific examples (1) and (2), such a case is conceivable that the effective period may elapse also while a HeNB is performing the concentration process and the resources for MTCD may be released by a core network. Accordingly, a HeNB may be configured to request the resources for MTCD. The specific example of signaling when a HeNB notifies a core network of the capability information regarding a concentration process, which has been disclosed in the third modification of the first embodiment, can be used as a specific example of signaling when a HeNB notifies a core network of the information for requesting the resources for MTCD, which is not described here.

Figure 25:
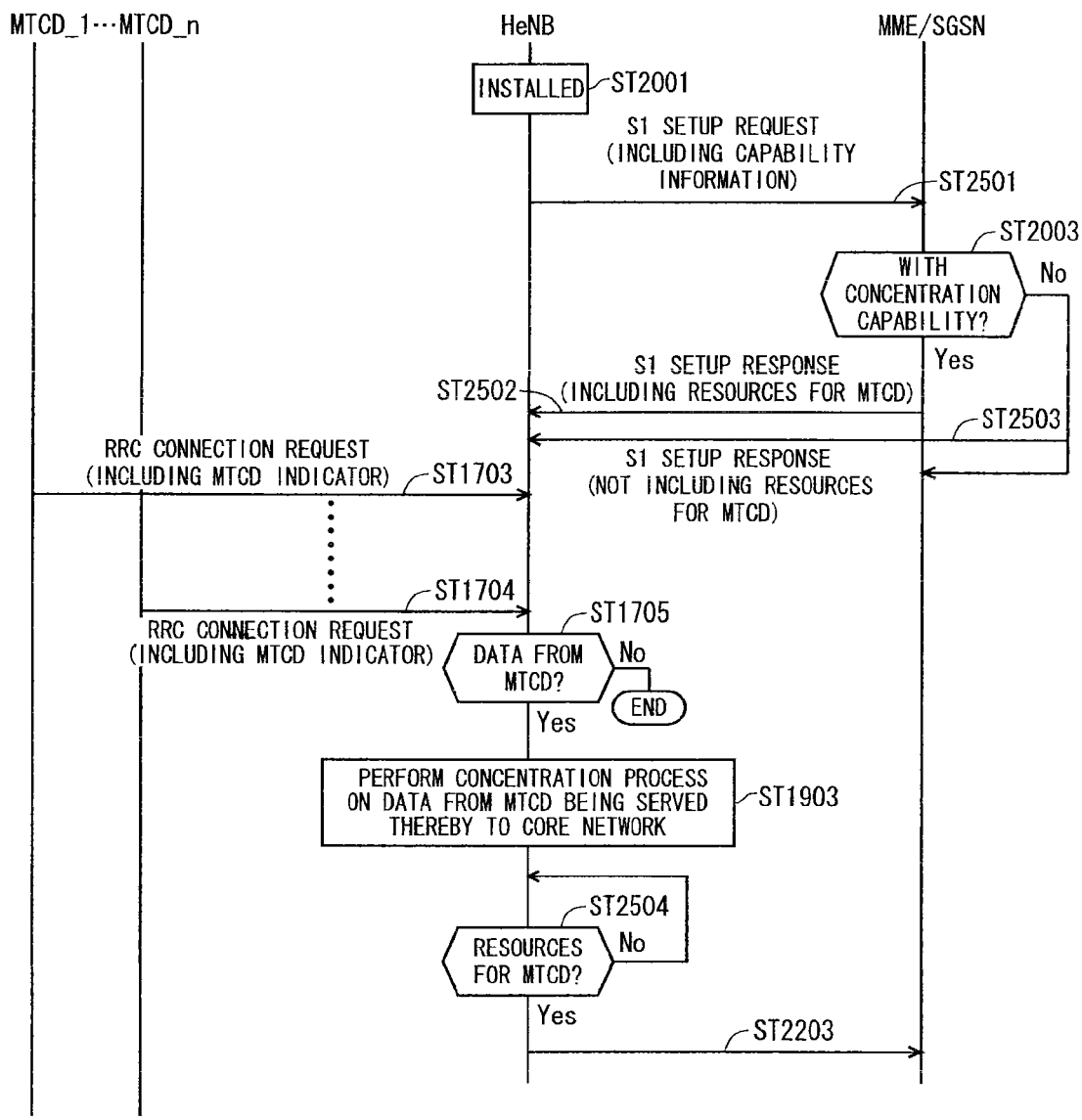
FIG. 25 is a diagram showing a sequence of a mobile communication system in a fourth modification of the second embodiment.

A specific operation example using the fourth modification of the second embodiment is described with reference to FIG. 25. FIG. 25 is a diagram showing a sequence of a mobile communication system in the fourth modification of the second embodiment. The steps of FIG. 25 corresponding to the steps shown in FIG. 17, FIG. 20, and FIG. 22 are denoted by the same reference symbols, and the common description is not given here.

This operation example discloses a time when a HeNB is installed, as a specific example of the timing at which a HeNB notifies a core network of the capability information regarding a concentration process. The HeNB has the concentration processing capability. The case in which "S1 SETUP REQUEST" being the existing S1 signaling is used is disclosed as a specific example of signaling when a HeNB notifies a core network of the capability information regarding the concentration process. Also disclosed here is the case in which the resources for MTCD are notified through "S1 SETUP RESPONSE" being a response message in response to "S1 SETUP REQUEST" assuming that the "S1 SETUP" procedure has succeeded.

In Step ST2001, a HeNB is installed. In Step ST2501, the HeNB notifies an MME of the capability information regarding the concentration process of the HeNB. "S1 SETUP REQUEST" is used in this notification. The capability information regarding the concentration process is mapped as a parameter of "S1 SETUP REQUEST".

In Step ST2003, the MME judges whether or not a HeNB has the capability of performing a concentration process based on the capability information regarding a concentration process that has been received in Step ST2501. In a case of judging that the HeNB has the capability of performing a concentration process, the MME moves to Step ST2502. In a case of judging that the HeNB does not have the capability of performing a concentration process, the MME moves to Step ST2503. The HeNB has the concentration processing capability in this operation example, and thus, the HeNB is judged to have the capability of performing a concentration process, and the MME moves to Step ST2502.

In Step ST2502, the MME notifies the HeNB of the resources for MTCD. "51 SETUP RESPONSE" is used in this notification. The resources for MTCD are mapped as parameters of "S1 SETUP RESPONSE".

In Step ST2503, the MME notifies the HeNB of "S1 SETUP RESPONSE". The resources for MTCD are not mapped as parameters of "S1 SETUP RESPONSE". That is, "S1 SETUP RESPONSE" notified the HeNB in Step ST2503 does not include the resources for MTCD.

Then, in Step ST1703, the MTCD_1 performs the process of transmitting "RRC Connection Request" to the HeNB and, in Step ST1704, the MTCD_n performs the process of transmitting "RRC Connection Request" to the HeNB. The HeNB that has received "RRC Connection Requests" transmitted from the MTCD_1 and MTCD_n performs the processes of Step ST1705 and Step ST1903 described above. After ending the process of Step ST1903, the HeNB moves to Step ST2504.

In Step ST2504, the HeNB judges whether or not the resources are the resources ones for MTCD received in Step ST2502. In a case of judging that the resources are ones for MTCD, the HeNB moves to Step ST2203 and the HeNB transmits, to the MME, the data from an MTCD being served thereby to a core network by means of an S1 interface. In a case of judging that the resources are not ones for MTCD, the HeNB repeats the judgment process of Step ST2504.

While the present modification has mainly described the example in combination with the first embodiment and the second embodiment, the present modification can be used also in combination with the first modification of the first embodiment, the second modification of the first embodiment, the third modification of the first embodiment, the fourth modification of the first embodiment, the first modification of the second embodiment, the second modification of the second embodiment, and the third modification of the second embodiment.

The present modification can also be used when an eNB holds back and aggregates the signaling messages common to the MTCD group, which is disclosed in Non-Patent Document 10.

The fourth modification of the second embodiment can achieve the following effects in addition to the effects of the second embodiment. It is possible to prevent a core network from notifying a HeNB without the capability of performing a concentration process of the resources for MTCD. This enables to effectively use the communication resources from a core network to a HeNB and reduce the processing load of the core network.

Third Embodiment

A third embodiment discloses the paging method in a case of executing the first embodiment. The third embodiment discloses a case in which a mobile communication system standardized by 3GPP is used as the communication method between the HeNB and MTCD.

Figure 26:
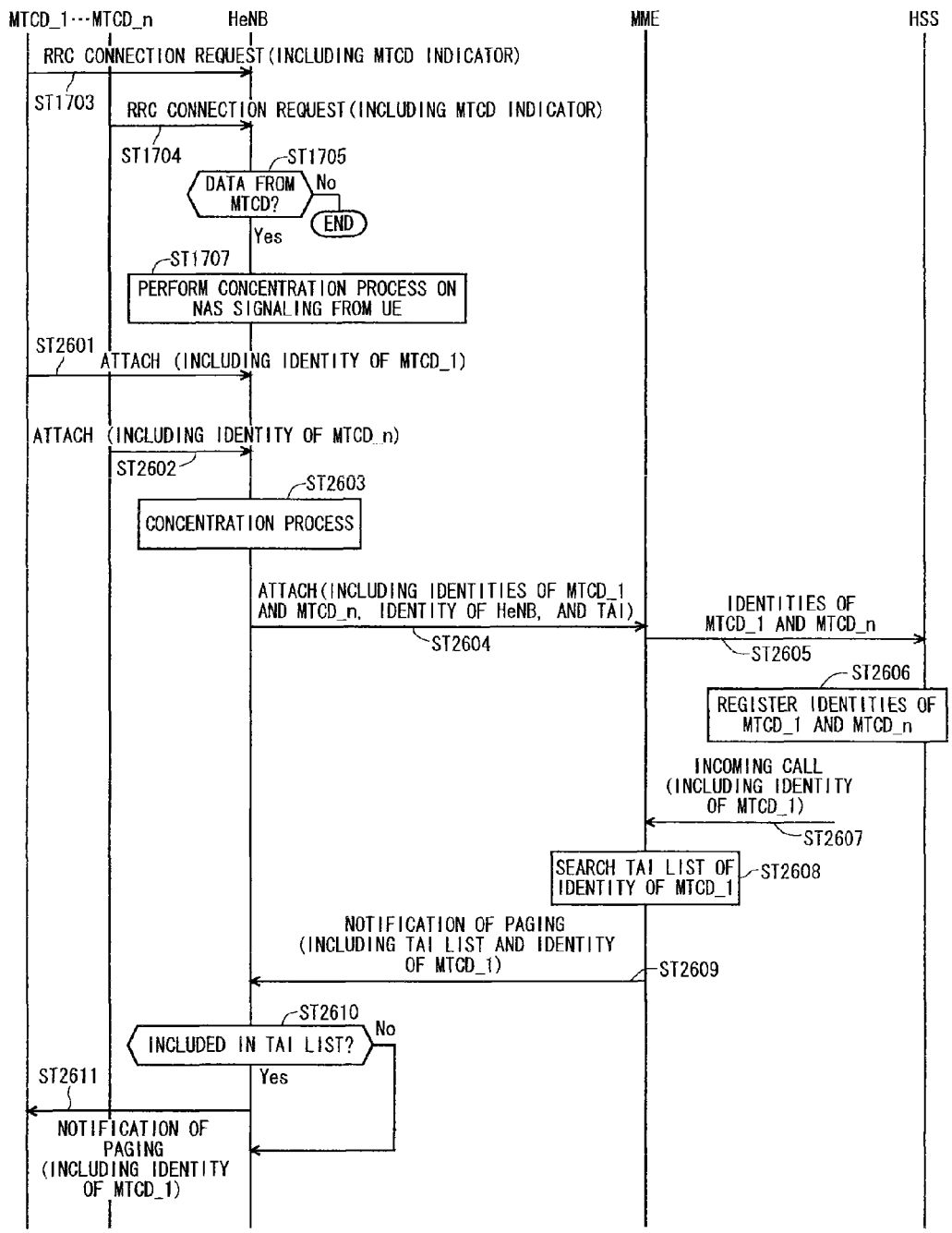
FIG. 26 is a diagram showing a sequence of a mobile communication system in a third embodiment.

A specific operation example using the third embodiment is described with reference to FIG. 26. FIG. 26 is a diagram showing a sequence of a mobile communication system in the third embodiment. The steps of FIG. 26 corresponding to the steps shown in FIG. 17 are denoted by the same reference symbols, and the common description is not given here.

This operation example discloses a case of NAS signaling as a specific example of the data from an MTCD, on which a HeNB performs a concentration process, to a core network. A case where an MTCD indicator is mapped to the RRC message "RRC Connection Request" is disclosed as a specific example of the method in which a HeNB distinguishes whether a user equipment (UE) being served thereby is an MTCD or not an MTCD.

First, in Step ST1703, the MTCD_1 performs the process of transmitting "RRC Connection Request" to the HeNB and, in Step ST1704, the MTCD_n performs the process of transmitting "RRC Connection Request" to the HeNB. The HeNB that has received "RRC Connection Requests" transmitted from the MTCD_1 and MTCD_n performs the processes of Step ST1705 and Step ST1707 described above. The HeNB moves to Step ST2601 after ending the process of Step ST1707.

The processes corresponding to those of Step ST1705, Step ST1707, and Step ST2202 are performed after the process of Step ST1703 in this operation example, which are not described here for easy understanding.

In a case of judging that the data is not from the MTCD in Step ST1705, the HeNB ends the process, which is not essential in the present embodiment and thus is not described here.

In Step ST2601, the MTCD_1 transmits an attach message containing the identity of the MTCD_1 to the HeNB. Non-Patent Document 13 discloses a detailed attaching method. In Step ST2602, the MTCD_n transmits an attach message containing the identity of the MTCD_n to the HeNB.

In Step ST2603, the HeNB performs the concentration process on the attach message from the MTCD_1, which has been received in Step ST2601, and the attach message from the MTCD_n, which has been received in Step ST2602. In this operation example, as the concentration process, the HeNB collectively notifies the MME of the attach messages being the data from a plurality of MTCDs to a core network.

In Step ST2604, the HeNB notifies the MME of the attach messages concentrated through the concentration process in Step ST2603. The attach message contains the identity of the MTCD_1 and the identity of the MTCD_n, which are identities of the MTCDs being targets of the concentration process, the identity of the HeNB, and the TAI. The second embodiment, the first modification of the second embodiment, the second modification of the second embodiment, and the third modification of the second embodiment can be used as the method of notifying an attach message.

In Step ST2605, the MME notifies a home subscriber server (HSS) of the identity of the MTCD_1 and the identity of the MTCD_n being identities of the MTCDs, which have been received as attach messages. The HSS is a subscriber information database in a 3GPP mobile communication network, which is an entity that manages the authentication information and the user location information.

In Step ST2606, the HSS registers and manages the identity of the MTCD_1 and the identity of the MTCD_n being identities of the MTCDs, which have been attached.

In Step ST2607, the MME receives an incoming call directed to the MTCD_1. Non-Patent Document 13 and Non-Patent Document 14 disclose the detailed method regarding an incoming call. The incoming call includes the identity of the MTCD_1. This allows an incoming call directed to the MTCD_1 alone.

In Step ST2608, the MME searches a tracking area list (also referred to as "TAI list") of the MTCD_1.

In Step ST2609, the MME notifies the HeNB of paging directed to the MTCD_1. Paging includes the tracking area list of the MTCD_1 and the identity of the MTCD_1. An incoming call can be directed to the MTCD_1 alone because paging includes the identity of the MTCD_1.

In Step ST2610, the HeNB judges whether or not the tracking area included in the tracking area list (TAI list) of the MTCD_1, which is contained in the paging received in Step ST2609, includes the own HeNB. In a case of judging that the own HeNB is included, the HeNB moves to Step ST2611. In a case of judging that the own HeNB is not included, the HeNB does not perform the process of Step ST2611.

In Step ST2611, the HeNB notifies the paging directed to the MTCD_1. The paging is notified in the mobile communication system standardized by 3GPP. Specifically, the paging message is mapped to the PCCH being a logical channel, the PCCH is mapped to the PCH being a transport channel, and the PCH is mapped to the PDSCH being a physical channel. The paging indicator common to all user equipments is transmitted over the PDCCH. The resources of the PDSCH to which the paging message has been mapped is allocated over the PDCCH over which the paging indicator has been transmitted. Non-Patent Document 1, Non-Patent Document 2, and Non-Patent Document 16 disclose a detailed paging notification method.

While the present modification has mainly described the example in combination with the first embodiment, the second embodiment, the first modification of the second embodiment, the second modification of the second embodiment, and the third modification of the second embodiment, the present modification can be used also in combination with the first modification of the first embodiment, the second modification of the first embodiment, the third modification of the first embodiment, and the fourth modification of the second embodiment.

The third embodiment has disclosed the paging method in which the first embodiment is executed and a mobile communication system standardized by 3GPP is used as the communication method between the HeNB and MTCD. The execution of the third embodiment enables to realize paging in a case where a mobile communication system standardized by 3GPP is used.

Fourth Embodiment

A fourth embodiment discloses the paging method in a case where the first embodiment is executed. The fourth embodiment discloses the case in which a communication system other than the mobile communication system standardized by 3GPP is used as the communication method between the HeNB and MTCD.

A solution in the fourth embodiment is described below. A portion different from the first embodiment is mainly described. A portion that is not described here is as in the first embodiment.

The HeNB performs the concentration process on the data from an MTCD that has made access in a communication system other than the mobile communication system standardized by 3GPP, and notifies an MME, SGSN, MTC server, or the like being a core network by means of the protocol of the mobile communication system standardized by 3GPP. The HeNB stores the identity of the MTCD on which the concentration process has been performed, and when receiving a paging message containing the identity of the MTCD on which the concentration process has been performed from the MME, notifies an MTCD being served thereby of an incoming call.

The following three (1) to (3) are disclosed as specific examples of the concentration process. (1) The protocol of the mobile communication system standardized by 3GPP is applied to access in a communication system other than the mobile communication system standardized by 3GPP. In a case where access has been made in a communication system other than the mobile communication system standardized by 3GPP, the HeNB interprets access contents. Then, the HeNB selects the protocol in the mobile communication system standardized by 3GPP, which corresponds to the access contents, and notifies the MME, SGSN, MTC server, or the like being a core network of parameters required for the protocol are notified. (2) The HeNB collectively notifies the MME of pieces of data from one or a plurality of MTCDs to a core network. This enables to reduce the number of communication times from the HeNB to the core network, and thus, the congestion of the core network can be mitigated. (3) Combination of (1) and (2).

The following eight (a) to (h) are disclosed as specific examples of the combination of the access contents in a communication system other than the mobile communication system standardized by 3GPP and the protocol of the mobile communication system standardized by 3GPP corresponding to the access contents in a case where the specific example (1) described above is selected as a specific example of the concentration process. In the following description, a communication system other than the mobile communication system standardized by 3GPP is referred to as "outside 3GPP" and the mobile communication system standardized by 3GPP is referred to as "within 3GPP" in some cases.

(a) In a case where power ON of an MTCD is notified outside 3GPP, "Attach procedure" is selected within 3GPP. Non-Patent Document 13 discloses the details of "Attach procedure". (b) In a case where the installation of an MTCD is notified outside 3GPP, "Attach procedure" is selected within 3GPP. (c) In a case where the registration of the location of an MTCD is notified outside 3GPP, "Attach procedure" is selected within 3GPP. (d) In a case where the movement of an MTCD is notified outside 3GPP, "Tracking Area Update procedure" is selected within 3GPP. Non-Patent Document 13 discloses the details of "Tracking Area Update procedure". (e) In a case where a communication request, calling request, or incoming call response of an MTCD is notified outside 3GPP, "Service Request procedures" is selected within 3GPP. Non-Patent Document 13 discloses the details of "Service Request procedures". (1) In a case where power OFF of an MTCD is notified outside 3GPP, "Detach procedure" is selected within 3GPP. Non-Patent Document 13 discloses the details of "Detach procedure". (g) In a case where an installation cancellation of an MTCD is notified outside 3GPP, "Detach procedure" is selected within 3GPP. (h) In a case where a failure of an MTCD is notified outside 3GPP, "Detach procedure" is selected within 3GPP. As to specific examples of the concentration process, the following four (a) to (d) are disclosed as specific examples of parameters required for a protocol when the specific example (1) above is selected.

(a) In a case of selecting "Attach procedure" within 3GPP, (a1) to (a4) below; (a1) MTCD identity, (a2) HeNB identity, (a3) tracking area of HeNB, and (a4) combination of (a1) to (a3) above.

(b) In a case where "Tracking Area Update procedure" is selected within 3GPP, (b1) to (b4) below; (b1) MTCD identity, (b2) HeNB identity, (b3) tracking area of HeNB, and (b4) combination of (b1) to (b3).

(c) In a case where "Service Request procedures" is selected, (c1) to (c4) below; (c1) MTCD identity, (c2) HeNB identity, (c3) tracking area of HeNB, and (c4) combination of (c1) to (c3) above.

(d) In a case of selecting "Detach procedure, (d1) MTCD identity.

A specific operation example using the fourth embodiment is described with reference to FIG. 27. FIG. 27 is a diagram showing a sequence of a mobile communication system in the fourth embodiment. The steps of FIG. 27 corresponding to the steps shown in FIG. 17 and FIG. 26 are denoted by the same reference symbols, and the common description is not given here.

This operation example discloses a case in which the combination of the specific example (1) and the specific example (2), which is the specific example (3) above, is used as a specific example of the concentration process. In addition, a case in which the installation of an MTCD is notified outside 3GPP and a case in which "Attach procedure" is selected within 3GPP are disclosed as a specific example of the combination of the access contents outside 3GPP and the protocol within 3GPP corresponding to the access contents. Further disclosed is a case in which (a1) MTCD identity, (a2) HeNB identity, and (a3) tracking area of HeNB in the specific example (a) are specific examples of the parameters required for "Attach procedure" when the protocol within 3GPP is applied to access outside 3GPP.

In Step ST2701, the MTCD_1 transmits a notification of installation of MTCD with the identity of the MTCD_1 to the HeNB.

In Step ST2702, the MTCD_n transmits a notification of MTCD installation with the identity of the MTCD_n to the HeNB.

In Step ST2703, the HeNB checks whether or not to have received the notification of MTCD installation with the identity of the MTCD_n in Step ST2702 outside 3GPP, and judges whether or not the notification of MTCD installation is the data from the MTCD. In a case of judging to have received the notification of MTCD installation with the identity of the MTCD outside 3GPP, the HeNB judges that the notification is the data from the MTCD and moves to Step ST2704. In a case of judging to not have received the notification of MTCD installation with the identity of the MTCD outside 3GPP, the HeNB judges that the notification is not the data from the MTCD and ends the process, which is not essential in the present embodiment and thus is not described here.

In a case of receiving the notification outside 3GPP without checking whether or not the MTCD identity is included, the HeNB may judge that the notification is the data from the MTCD and move to Step ST2704. In a case of receiving the notification within 3GPP, the HeNB may judge that the notification is the data from the normal UE and end the process, which is not essential in the present embodiment and thus is not described here.

In Step ST2704, the HeNB stores the identities of the MTCDs on which the concentration process is performed. In this operation example, the HeNB stores the identity of the MTCD_1 and the identity of the MTCD_n.

In Step ST2705, the HeNB performs the concentration process. In this operation example, the HeNB collectively notifies the MME of the pieces of data from the MTCD_1 and MTCD_n to the core network. In addition, the HeNB interprets the contents of Step ST2701 and Step ST2702 each being access outside 3GPP and understands that the access is related to "installation". Then, the HeNB selects "Attach procedure" as the protocol within 3GPP corresponding to the access related to "installation". Further, the HeNB maps, as parameters, the identity of the MTCD_1 received in Step ST2701, the identity of the MTCD_n received in Step ST2702, the identity of the own HeNB, and the tracking area of the HeNB to "Attach procedure".

The processes corresponding to those of Step ST2703, Step ST2704, and Step ST2705 are performed after the process of Step ST2701 in this operation example, which are not described here for easy understanding.

In Step ST2706, the HeNB notifies the MME of the attach message concentrated through the concentration process in Step ST2705. The attach message contains the identity of the MTCD_1 and the identity of the MTCD_n, which are identities of the MTCDs being targets of the concentration process, the identity of the HeNB, and the TAI. The second embodiment, the first modification of the second embodiment, the second modification of the second embodiment, and the third modification of the second embodiment can be used for this notification.

After the process of Step ST2706, the MME performs the process of Step ST2605, and the HSS performs the process of Step ST2606. Then, the MME receives an incoming call directed to the MTCD_1 in Step ST2607, and the MME performs the processes of Step ST2608 and Step ST2609.

Then, in Step ST2707, the HeNB judges whether or not to have performed the concentration process on the MTCD_1 included in the paging received in Step ST2609. The information stored in Step ST2704 may be used for the judgment process of Step ST2707. In a case of judging to have performed the concentration process, the HeNB moves to Step ST2708. In a case of judging to not have performed the concentration process, the HeNB moves to Step ST2709. In this operation example, the HeNB has performed the concentration process on the MTCD_1, and accordingly moves to Step ST2708.

In Step ST2708, the HeNB notifies the MTCD_1 of the incoming call directed to the MTCD_1. The HeNB notifies an incoming call in Step ST2708 in a communication system other than the communication system by 3GPP used in Step ST2701. In Step ST2709, the HeNB judges whether or not the own HeNB is included in the tracking area contained in the tracking area list of the MTCD_1 included in the paging received in Step ST2609. In a case of judging that the own HeNB is included, the HeNB moves to Step ST2710. In a case of judging that the own HeNB is not included, the HeNB does not perform the process of Step ST2710. In Step ST2710, the HeNB notifies an incoming call in the communication system within 3GPP.

While the present embodiment has mainly described the example in combination with the first embodiment, the second embodiment, the first modification of the second embodiment, the second modification of the second embodiment, and the third modification of the second embodiment, the present embodiment can be used also in combination with the first modification of the first embodiment, the second modification of the first embodiment, the third modification of the first embodiment, and the fourth modification of the second embodiment.

While the present embodiment has described the case in which the communication method between the HeNB and MTCD is one outside 3GPP, the present embodiment can also be used in a case where the communication method between the HeNB and MTCD is one within 3GPP.

The fourth embodiment described above discloses a paging method in which the first embodiment is executed and a communication system other than the mobile communication system standardized by 3GPP is used as the communication system between the HeNB and MTCD. The execution of the fourth embodiment enables paging in a case where a communication system other than the mobile communication system standardized by 3GPP is used.

First Modification of Fourth Embodiment

A problem below occurs in a case where the fourth embodiment above is used. Even in a case where an MTCD moves and cannot communicate with an MTC server via a HeNB, the MTCD identity continues to be stored assuming that this MTCD is an MTCD on which the concentration process has been performed by the HeNB. This causes a problem that the memory area of the HeNB is used for unnecessary data.

The following two (1) and (2) are disclosed as the solutions in a first modification of the fourth embodiment. (1) In a case of moving and being unable to communicate with an MTC server via a HeNB, the MTCD_notifies the HeNB of this. In a case of moving, the MTCD_notifies a source HeNB of this. The HeNB that has received this notification deletes this MTCD from the memory of the MTCD on which the concentration process has been performed.

(2) In a case of moving and being unable to communicate with an MTC server via a HeNB, the MTCD_notifies a core network of this via the HeNB. In a case of moving, the MTCD_notifies the core network of this via a source HeNB. The core network that has received this notification judges whether or not to change a source cell of the MTCD. In a case of having determined to change a source cell, the core network notifies the HeNB that the source cell will be changed. The HeNB that has received this notification deletes the MTCD from the memory of the MTCD on which the concentration process has been performed. The notification indicating that the source cell will be changed from the core network to the HeNB includes the MTCD identity.

The following three (1) to (3) are disclosed as specific examples of the contents notified from an MTCD to a HeNB; (1) moving, (2) changing of a serving cell, and (3) handover.

The first modification of the fourth embodiment can achieve the following effects in addition to the effects of the fourth embodiment. In a case where an MTCD moves and cannot communicate with an MTC server via a HeNB, that is, in a case where a HeNB cannot perform the concentration process on the MTCD, it is possible to delete the data of the MTCD from the memory area of the HeNB. This enables to prevent the use of a memory area of the HeNB for unnecessary data.

Fifth Embodiment

A fifth embodiment discloses a paging method when the first embodiment is executed. The fifth embodiment discloses a paging method per HeNB, not paging per MTCD, which may be paging per HeNB on which the concentration process has been performed.

A solution in the fifth embodiment is described below. A portion different from the solution of the first embodiment is mainly described. A portion that is not described here is as in the first embodiment.

The registration with an operator or MTC user is performed on a HeNB-basis, on which the concentration process is performed, not on an MTCD-basis. To take one example of service, a contract is made as one MTCD per HeNB installed in a building. One contract is made as a HeNB even in a case where a plurality of MTCDs to be served by a HeNB are located. Registration is made with a core network on a HeNB-basis on which the concentration process has been performed, and paging is made to the HeNB. The HeNB that has received the paging notifies the all MTCDs being served thereby of an incoming call.

A specific example of the concentration process is disclosed below. The operation of a specific example (5) below is performed together with the specific examples (1) to (4) disclosed in the first embodiment. (5) The MTCD identity included in the data from the MTCD being served thereby to a core network is deleted, and the identity of the own HeNB is mapped in place of the deleted identity. In a case of a message notified to the core network, to which the identity of the HeNB has been added, it is merely required to delete the MTCD identity.

A specific example of the method of registering with a core network is disclosed below. An MME notifies an HSS of the identity of a HeNB on which the data of the MTCD to the core network has been concentrated, not of the identity of an MTCD. The HSS registers the identity of the HeNB, on which the concentration process has been performed, not the MTCD identity.

The following two (1) and (2) are disclosed as specific examples in which a HeNB notifies all MTCDs being served thereby of an incoming call; (1) broadcast information is used, and (2) group calling is used.

Figure 28:
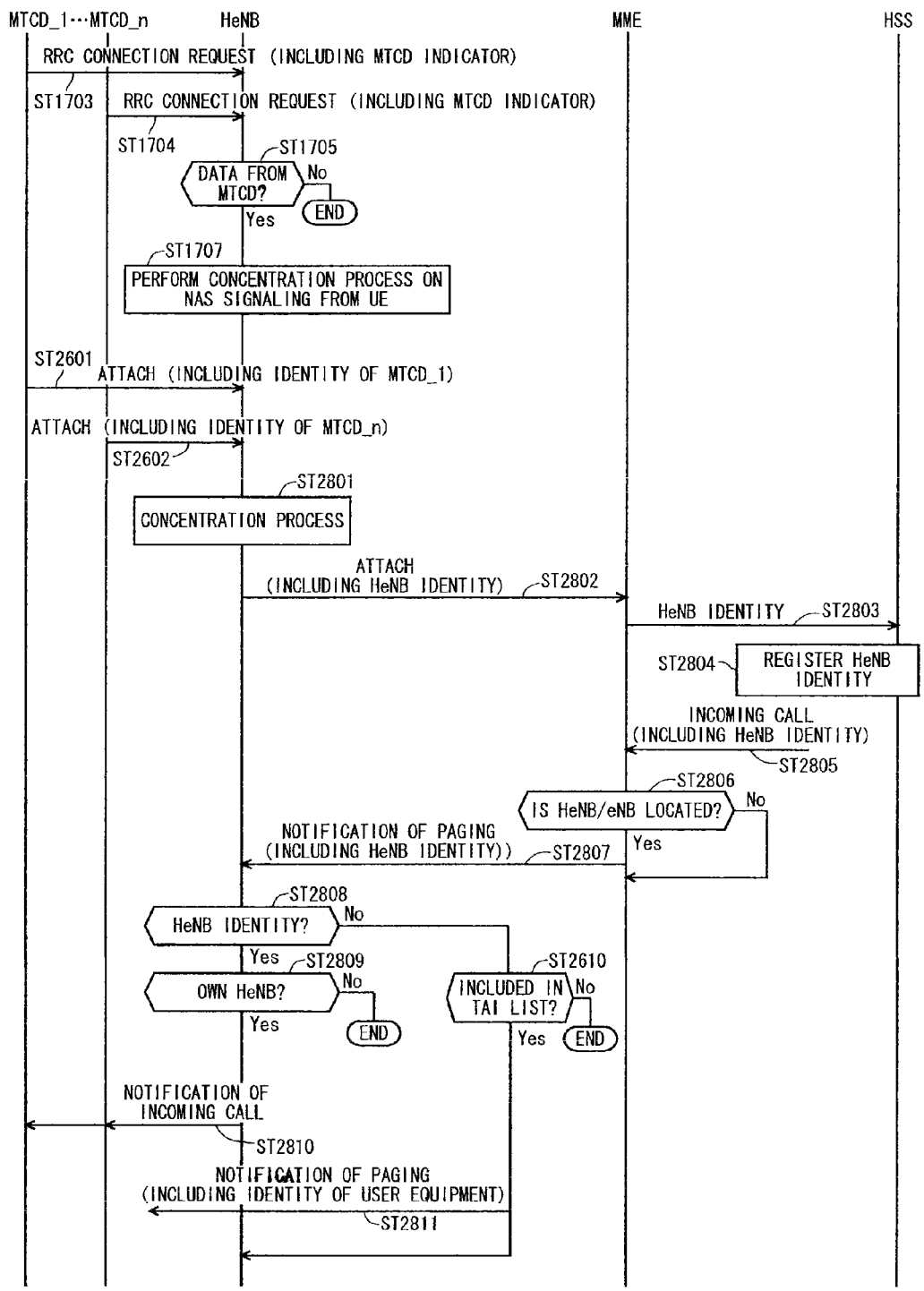
FIG. 28 is a diagram showing a sequence of a mobile communication system in a fifth embodiment.

A specific operation example using the fifth embodiment is described with reference to FIG. 28. FIG. 28 is a diagram showing a sequence of a mobile communication system in the fifth embodiment. The steps of FIG. 28 corresponding to the steps shown in FIG. 17 and FIG. 26 are denoted by the same reference symbols, and the common description is not given here.

This operation example discloses a case of NAS signaling as a specific example of the data from an MTCD, on which a HeNB performs a concentration process, to a core network. A case in which an MTCD indicator is mapped to an RRC message "RRC Connection Request" is disclosed as a specific example of the method in which a HeNB distinguishes whether a user equipment (UE) being served thereby is an MTCD or not an MTCD. In addition, a case of using broadcast information is disclosed as a specific example in which a HeNB notifies all MTCDs being served thereby of an incoming call.

First, the MTCD_1 performs the process of Step ST1703, and the MTCD_n performs the process of Step ST1704. Then, a HeNB that has received "RRC Connection Requests" transmitted from the MTCD_1 and MTCD_n performs the processes of Step ST1705 and Step ST1707. Then, the MTCD_1 performs the process of Step ST2601, and the MTCD_n performs the process of Step ST2602.

Then, in Step ST2801, the HeNB performs the concentration process on the attach message from the MTCD_1, which has been received in Step ST2601, and the attach message from the MTCD_n, which has been received in Step ST2602. In this operation example, as the concentration process, the HeNB collectively notifies the MME of the attach messages being data from a plurality of MTCDs to a core network. On that occasion, the HeNB does not notify the MME of the identity of the MTCD_1 and the identity of the MTCD_n, which are identities of MTCDs included in the data from an MTCD being served thereby to a core network. In place of notifying the identity of the MTCD, the HeNB notifies the identity of the own HeNB. Note that the identity of the own HeNB is a parameter notified in "Attach procedure" from an eNB to an MME in the current specifications (see Non-Patent Document 13). In Step ST2801 in this operation example, it suffices that the HeNB deletes only the MTCD identity from the attach message received from an MTCD being served thereby.

In Step ST2802, the HeNB notifies the MME of the attach message concentrated through the concentration process in Step ST2801. The attach message does not contain the identity of the MTCD_1 and the identity of the MTCD_n which are identities of MTCDs being subjects of the concentration process, but contains the identity of the HeNB and the TAI. The TAI is notified as required. The second embodiment, the first modification of the second embodiment, the second modification of the second embodiment, and the third modification of the second embodiment can be used for the notification of Step ST2802.

In Step ST2803, the MME notifies the HSS of the identity of the HeNB received through the attach message. In Step ST2804, the HSS registers and manages the HeNB on which attaching has been performed.

In Step ST2805, the MME receives an incoming call directed to a HeNB. Non-Patent Document 13 and Non-Patent Document 14 disclose a detailed method regarding an incoming call. The incoming call includes the identity of a HeNB. This enables an incoming call on a HeNB-basis.

In Step ST2806, the MME judges whether or not a HeNB to be served by the own MME is located. The MME moves to Step ST2807 in a case of judging that a HeNB is located, or ends the process in a case of judging that a HeNB is not located. In this operation example, a HeNB to be served by the own MME is located, and thus, the MME moves to Step ST2807. The MME may notify an eNB, HeNB, or the like being a base station being served thereby of paging in Step ST2807, without performing the process of Step ST2806.

In Step ST2807, the MME notifies the HeNB of paging directed to the HeNB. This paging does not include a tracking area list of the MTCD_1, an identity of the MTCD_1, and "UE Identity Index value". A sixth embodiment below describes "UE Identity Index value". The paging includes the identity of the HeNB in place of including the tracking area list of the MTCD_1 and the identity of the MTCD_1. Inclusion of the identity of a HeNB allows an incoming call on a HeNB-basis.

In Step ST2808, the HeNB judges whether or not the identity included in the paging received in Step ST2807 is the identity of the HeNB. In a case of judging that the identity is that of the HeNB, the HeNB moves to Step ST2809. In a case of judging that the identity is not that of the HeNB, the HeNB judges that the identity is that of a user equipment and moves to Step ST2610. In this operation example, the identity included in the paging received in Step ST2807 is the identity of the HeNB, and thus moves to Step ST2809.

In Step ST2809, the HeNB judges whether or not the identity of the HeNB included in the paging received in Step ST2807 is the identity of the own HeNB. In a case of judging that the identity is that of the own HeNB, the HeNB moves to Step ST2810. In a case of judging that the identity is not that of the own HeNB, the HeNB ends the process. In this operation example, the identity of the HeNB included in the paging received in Step ST2807 is the identity of the own HeNB, and thus, the HeNB moves to Step ST2810.

In Step ST2810, the HeNB notifies the all MTCDs being served thereby of an incoming call through the broadcast information.

In Step ST2811, the HeNB notifies paging that includes a user equipment identity as usual. This paging is notified in the mobile communication system standardized by 3GPP. Specifically, the paging message is mapped to the PCCH being a logical channel, the PCCH is mapped to the PCH being a transport channel, and the PCH is mapped to the PDSCH being a physical channel. The paging indicator common to all user equipments is transmitted over the PDCCH. The resources of the PDSCH, on which the paging message has been mapped, are allocated with the PDCCH on which the paging indicator has been transmitted. Non-Patent Document 1, Non-Patent Document 2, and Non-Patent Document 16 disclose a detailed paging notification method.

While the present embodiment has mainly described the example in combination with the first embodiment, the second embodiment, the first modification of the second embodiment, the second modification of the second embodiment, and the third modification of the second embodiment, the present embodiment can be used also in combination with the first modification of the first embodiment, the second modification of the first embodiment, the third modification of the first embodiment, and the fourth modification of the second embodiment.

While this embodiment has described the case in which the communication method between the HeNB and MTCD is within 3GPP, the present embodiment can be used also in a case where the communication method between the HeNB and MTCD is outside 3GPP.

The fifth embodiment has described the paging method in which the first embodiment is executed and paging is performed per HeNB, not per MTCD. The execution of the fifth embodiment enables to realize paging per HeNB.

First Modification of Fifth Embodiment

A first modification of the fifth embodiment discloses the method in which the fifth embodiment is executed, and paging per MTCD is performed even in a case in which, for example, the registration with an operator or MTC user is made on a HeNB-basis on which the concentration process is performed, not on an MTCD-basis.

A solution in the first modification of the fifth embodiment is described below. A portion different from the solutions of the first embodiment and the fifth embodiment is mainly described. A portion that is not described here is as in the first embodiment and the fifth embodiment.

A HeNB stores an identity of the MTCD on which the concentration process has been performed, and notifies the MTCD being served thereby of an incoming call when receiving a paging message containing the MTCD identity separately from the identity of the HeNB from the MME.

Figure 29:
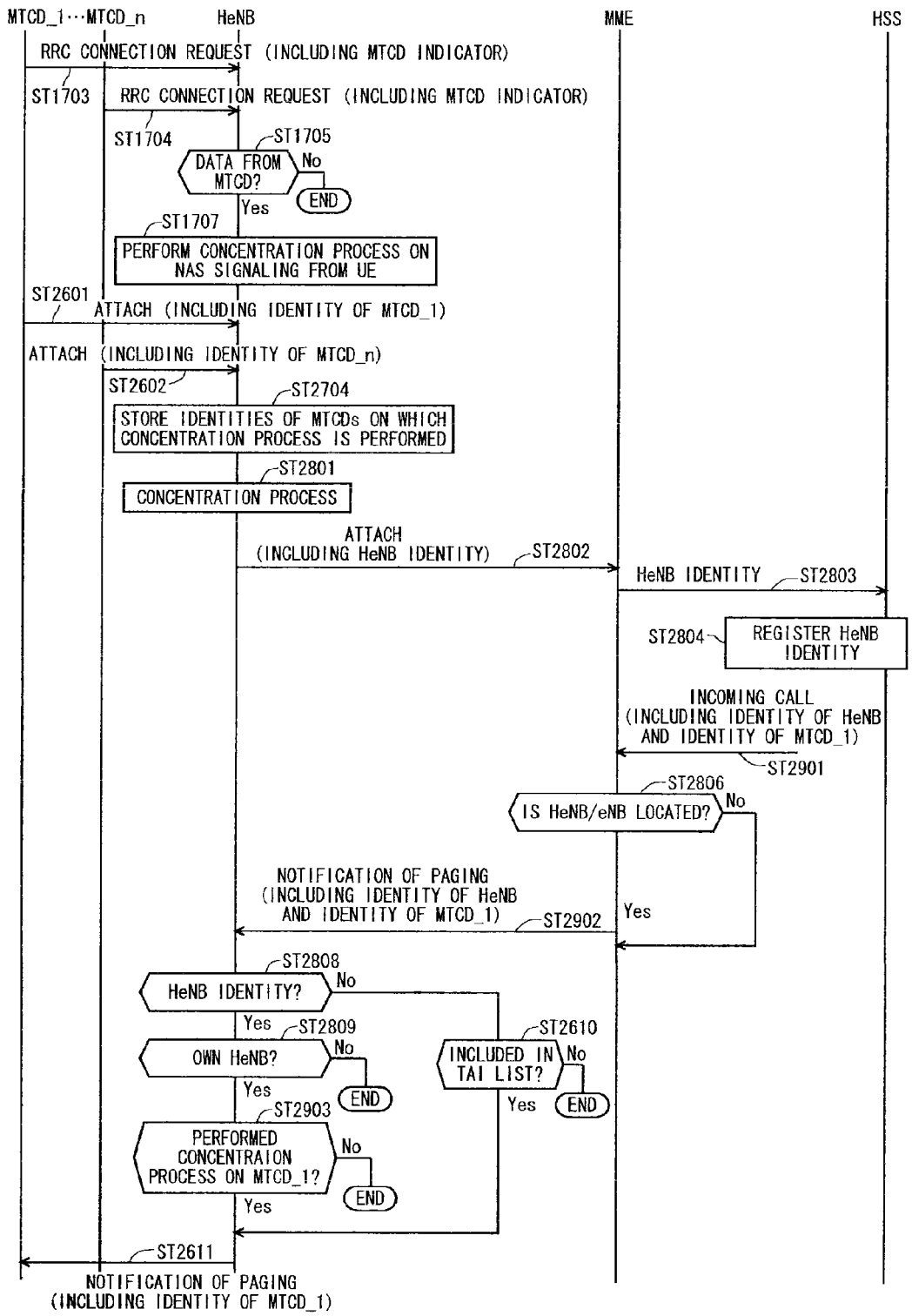
FIG. 29 is a diagram showing the sequence of the mobile communication system in a first modification of the fifth embodiment.

A specific operation example using the first modification of the fifth embodiment is described with reference to FIG. 29. FIG. 29 is a diagram showing a sequence of a mobile communication system in the first modification of the fifth embodiment. The steps of FIG. 29 corresponding to the steps shown in FIG. 17, FIG. 26, and FIG. 28 are denoted by the same reference symbols, and the common description is not given here.

This operation example discloses a case of NAS signaling as a specific example of the data from an MTCD, on which a HeNB performs a concentration process, to a core network. In addition, a case in which an MTCD indicator is mapped to the RRC message "RRC Connection Request" is disclosed as a specific example of the method in which a HeNB distinguishes whether a user equipment (UE) being served thereby is an MTCD or is not an MTCD.

First, the MTCD_1 performs the process of Step ST1703, and the MTCD_n performs the process of Step ST1704. Then, the HeNB that has received "RRC Connection Requests" transmitted from the MTCD_1 and MTCD_n performs the processes of Step ST1705 and Step ST1707. Then, the MTCD_1 performs the process of Step ST2601, and the MTCD_n performs the process of Step ST2602. The HeNB that has received the attach messages transmitted from the MTCD_1 and MTCD_n performs the processes of Step ST2704, Step ST2801, and Step ST2802. Then, the MME performs the process of Step ST2803, and the HSS performs the process of Step ST2804.

In Step ST2901, the MME receives an incoming call directed to a HeNB. Non-Patent Document 13 and Non-Patent Document 14 disclose a detailed method regarding an incoming call. An incoming call includes the identity of the MTCD_1 that is required to be called individually, separately from the identity of the HeNB. This enables to perform paging per MTCD even in a case where the registration with an operator or the like is performed on a HeNB-basis on which the concentration process is performed, not on an MTCD-basis. The MME performs the process of Step ST2806 after the process of Step ST2901. In Step ST2806, the MME moves to Step ST2902 in a case of judging that a HeNB to be served by the own MME is located.

In Step ST2902, the MME notifies the HeNB of the paging directed to a HeNB. This paging includes the identity of the MTCD_1 but does not include the tracking area list of the MTCD_1. The HeNB performs the processes of Step ST2808 and Step ST2809. The HeNB moves to Step ST2903 in a case of judging that the identity of the HeNB included in the paging received in Step ST2902 is the identity of the own HeNB in ST2809.

In Step ST2903, the HeNB judges whether or not to have performed the concentration process on the MTCD_1 with the MTCD_1 identity included in the paging received in Step ST2902. The information stored in Step ST2704 may be used in the judgment of Step ST2903. In a case of judging to have performed the concentration process, the HeNB moves to Step ST2611. In a case of judging to not have performed the concentration process, the HeNB ends the process.

While the present modification has mainly described the example in combination with the first embodiment, the second embodiment, the first modification of the second embodiment, the second modification of the second embodiment, and the third modification of the second embodiment, the present modification can be used also in combination with the first modification of the first embodiment, the second modification of the first embodiment, the third modification of the first embodiment, and the fourth modification of the second embodiment.

While the present modification has described a case in which the communication method between the HeNB and MTCD is within 3GPP, the present modification can be used also in a case where the communication method between the HeNB and MTCD is outside 3GPP.

The first modification of the fifth embodiment has disclosed the method in which the fifth embodiment is executed in addition to the first embodiment, and paging per MTCD is performed even in a case where, for example, the registration with an operator or MTC user is performed on a HeNB-basis on which the concentration process is performed, not on an MTCD-basis. The execution of the first modification of the fifth embodiment enables to realize paging per MTCD in a case where, for example, the registration with an operator or MTC user is performed on a HeNB-basis on which a concentration process is performed.

Sixth Embodiment

A problem to be solved by the sixth embodiment is described below. In a case of using broadcast information when a HeNB notifies all MTCDs being served thereby of an incoming call in the fifth embodiment, a radio interval, that is, an interval between the HeNB and MTCD is different from that in normal paging transmission. There are parameters for use in setting a radio interval in paging from the MME to the HeNB. Accordingly, there are unnecessary parameters, and thus, unused resources are generated.

A solution in the sixth embodiment is described below. A portion different from the solution of the first embodiment or the fifth embodiment is mainly described. A portion that is not described here is as in the first embodiment or the fifth embodiment.

In a case of performing paging per HeNB, not paging per MTCD, a paging message from an MME to a HeNB is varied from that in the current specifications (see Non-Patent Document 14). In a case where a received incoming call includes a HeNB identity, not an MTCD identity, the paging message from the MME to the HeNB is varied from that in the current specifications.

The following two (1) and (2) are disclosed as specific examples of the paging message varied from that in the current specifications.

(1) A new paging message on a HeNB-basis is provided. Alternatively, a paging message in a case where a new concentration process is performed is provided. Specific examples of the parameter contained in the new message include the HeNB identity.

(2) "Paging" being the existing S1 signaling is used in paging on a HeNB-basis.

"Paging" being the existing S1 signaling is used in paging in a case where a concentration process is performed.

Next, the parameters needed to be added to and changed in "Paging" are described. The specific examples of the parameters needed to be added include the HeNB identity. The following three (a) to (c) are disclosed as the specific examples of the parameters need to be changed.

(a) "UE Identity Index value". In the current specifications, "UE Identity Index value" is used for calculating "Paging Frame (PF)" being a radio frame for use in the transmission of paging by an eNB. In a case where a HeNB notifies an MTCD being served thereby of an incoming call through broadcast information, the HeNB does not need to calculate a radio frame for use in the transmission of paging. This causes a situation in which "UE Identity Index value" cannot be designated in a mobile communication system. In addition, in the current specifications, it is always required to map "UE Identity Index value" to "Paging". That is, in a case where not paging per MTCD but paging per HeNB is transmitted through the current "Paging", a problem that unity is lost as a mobile communication system occurs in handling "UE Identity Index value". If unity is not achieved as a mobile communication system, a problem that, for example, a stable communication network cannot be provided arises. Therefore, as long as the HeNB identity is mapped to, for example, "Paging", it is judged that the paging is per HeNB. Then, if "UE Identity Index value" has been mapped, it is treated as an ineffective parameter by a receiver or is not necessarily but optionally mapped by a transmitter. This clarifies the processes by an MME and a HeNB and enables to construct a unified mobile communication network, and hence, a stable communication network can be provided.

(b) "UE Paging Identity". In the current specifications, "UE Paging Identity" is an identity of a user equipment to be called. In a case where a HeNB notifies all MTCDs being served thereby of an incoming call through the broadcast information, the HeNB does not require a dedicated identity of an MTCD, which is one type of user equipment. It is also assumed that a dedicated identity of an MTCD is not notified also from a caller. This causes a situation in which "UE Paging Identity" cannot be designated in a mobile communication system. In the current specifications, it is always required to map "UE Paging Identity" to "Paging". That is, in a case where not paging per MTCD but paging per HeNB is transmitted through the current "Paging", a problem that unity is lost as a mobile communication system occurs in handling "UE Paging Identity". If unity is not achieved as a mobile communication system, such a problem arises that a stable communication network cannot be provided. Therefore, if the identity of the HeNB is mapped to, for example, "Paging", it is judged that paging is per HeNB. Then, even if "UE Paging Identity" has been mapped, it is treated as an ineffective parameter by a receiver or is not necessarily but optionally mapped by a transmitter. This clarifies the processes by an MME and a HeNB and enables to construct a unified mobile communication network, and hence, a stable communication network can be provided.

(c) "TA information". In the current specifications, as to "TA information", an eNB belonging to the TA information transmits paging. In a case where a HeNB notifies an MTCD being served thereby of an incoming call through the broadcast information, the paging includes the HeNB identity. This may allow a HeNB with the identity matching the identity of the HeNB included in paging to notify an MTCD being served thereby of an incoming call. Therefore, "TA information" is a parameter that is not particularly needed. Meanwhile, in the current specifications, it is required to necessarily map "TA information" to "Paging". That is, in a case where not paging per MTCD but paging per HeNB is transmitted through the current "Paging", "TA information" being an unnecessary parameter is notified. Hence, if the HeNB identity is mapped to, for example, "Paging", it is judged that paging is per HeNB and "TA information" is not necessarily but optionally mapped by a transmitter. This enables to prevent the transmission of unnecessary parameters.

The sixth embodiment can achieve the following effects in addition to the effects of the fifth embodiment. Unnecessary parameters in paging from an MME to a HeNB can be reduced, and thus, resources can be used effectively.

Seventh Embodiment

A problem to be solved by a seventh embodiment is described below. First, the current paging method is described. Non-Patent Document 14 discloses the following. In each cell belonging to a tracking area shown in a TAI list contained in a paging message notified an eNB by an MME, paging occurs on a radio interface.

Figure 30:
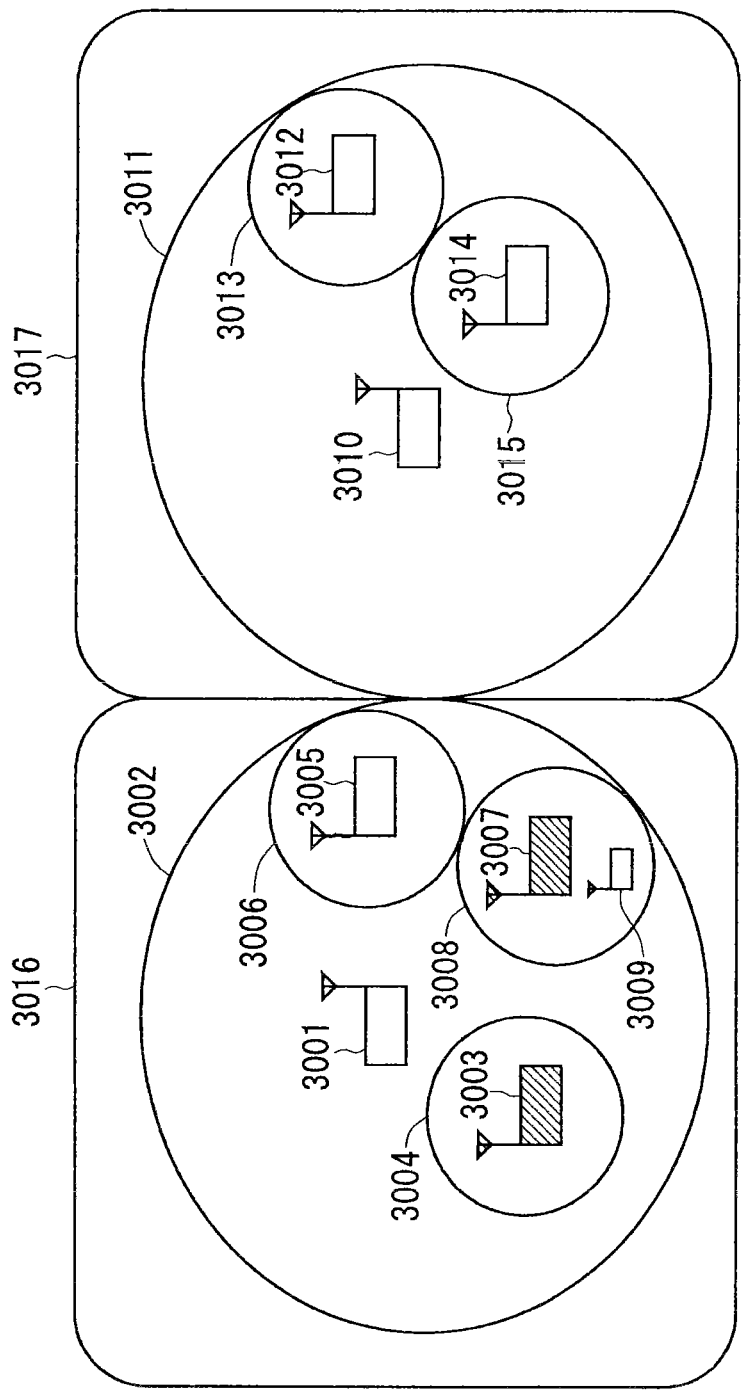
FIG. 30 shows a diagram showing a location for describing a current paging method.

The current paging method is described again with reference to FIG. 30. FIG. 30 is a diagram showing the location for describing the current paging method. First, the location of FIG. 30 is described. An eNB 3001, a HeNB 3003, a HeNB 3005, and a HeNB 3007 are installed. The eNB 3001 has a coverage 3002. The HeNB 3003 has a coverage 3004. The HeNB 3005 has a coverage 3006. The HeNB 3007 has a coverage 3008. A user equipment 3009 is located within the coverage 3008 of the HeNB 3007. The eNB 3001, HeNB 3003, HeNB 3005, and HeNB 3007 are located within the coverage 3002 of the eNB 3001. The eNB 3001, HeNB 3003, HeNB 3005, and HeNB 3007 are included in a tracking area #1 (TA#1) 3016.

An eNB 3010, a HeNB 3012, and a HeNB 3014 are installed. The eNB 3010 has a coverage 3011. The HeNB 3012 has a coverage 3013. The HeNB 3014 has a coverage 3015. The eNB 3010, HeNB 3012, and HeNB 3014 are located within the coverage 3011 of the eNB 3010. The eNB 3010, HeNB 3012, and HeNB 3014 are included in a tracking area #2 (TA#2) 3017.

Considered here is a case in which the tracking area #1 (TA#1) 3016 and the tracking area #2 (TA#2) 3017 are registered as a tracking area list of the user equipment 3009. The current paging method in a case where an incoming call to the user equipment 3009 is made in the location is described.

In the current specifications, in each cell belonging to a tracking area shown in a TAI list contained in a paging message notified an eNB by an MME, paging occurs on a radio interface. Therefore, paging occurs on a radio interface from the eNB 3001, HeNB 3003, HeNB 3005, and HeNB 3007 belonging to the tracking area #1 (TA#1) 3016 and the eNB 3010, HeNB 3012, and HeNB 3014 belonging to the tracking area #2 (TA#2) 3017. Meaningless paging transmission has conventional problems that radio resources cannot be used effectively and that interference occurs.

Next, the problem to be solved in the seventh embodiment is described below. Considered here is a case in which a HeNB with the capability of performing a concentration process and a HeNB without the capability of performing a concentration process are located. In a case where the third embodiment and fourth embodiment above are executed, the notification of paging or notification of an incoming call from a HeNB without the concentration processing capability to an MTCD becomes unnecessary. This causes a problem that radio resources cannot be used effectively.

Figure 31:
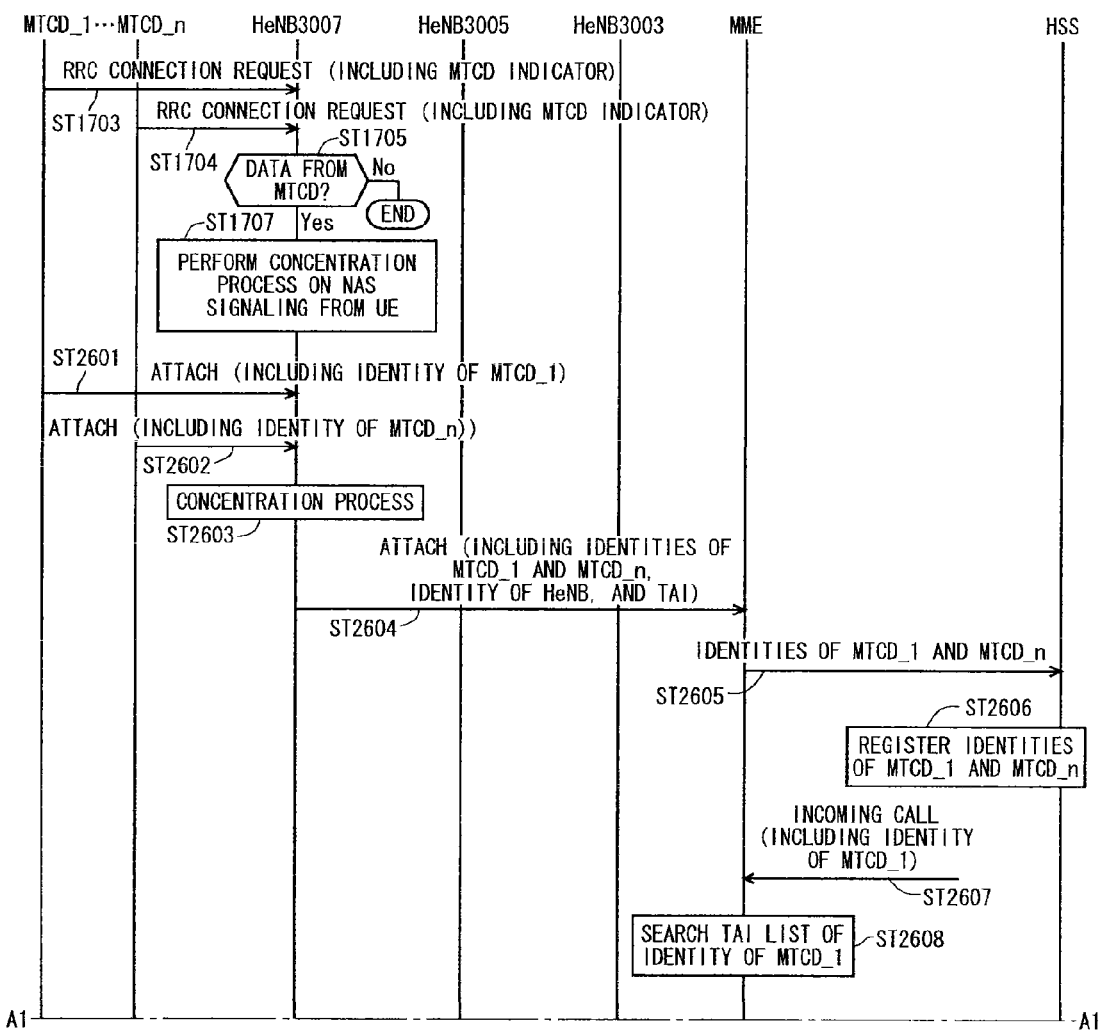
FIG. 31 is a diagram showing a sequence of a mobile communication system for describing unused radio resources in a case where the third embodiment is executed.
Figure 32:
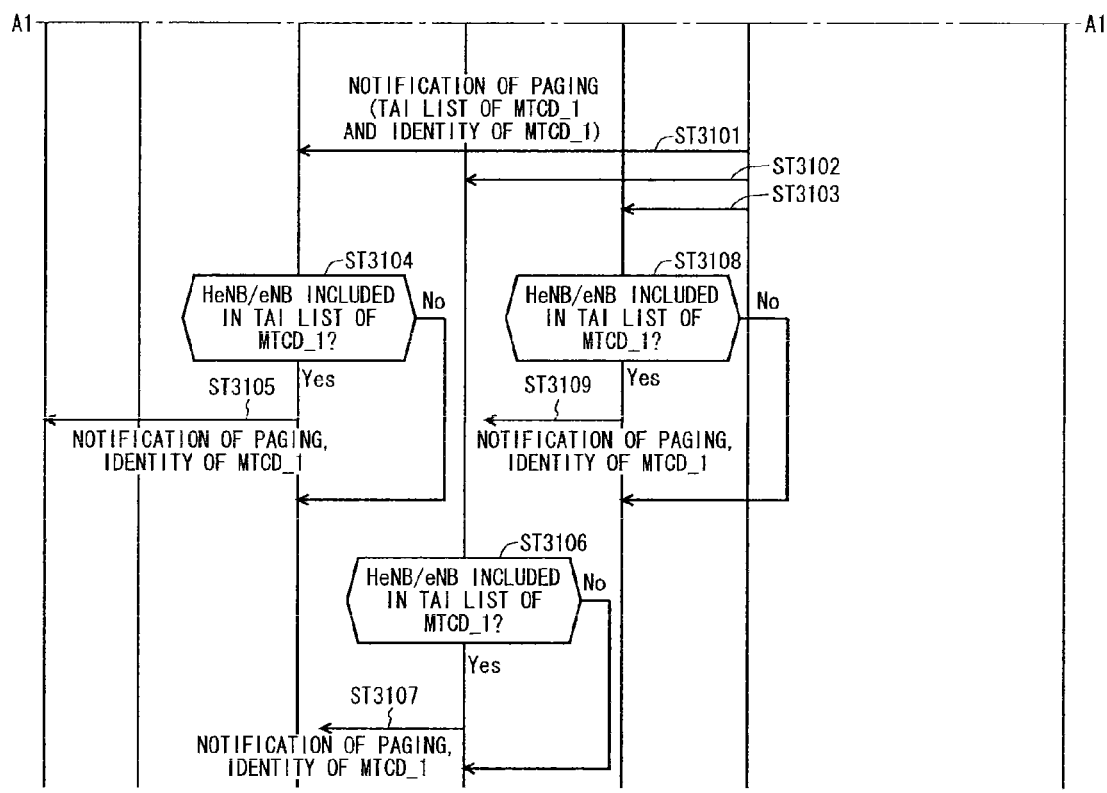
FIG. 32 is another diagram showing the sequence of the mobile communication system for describing unused radio resources in the case where the third embodiment is executed.

Unused radio resources in a case of executing the third embodiment above are described with reference to FIG. 31 and FIG. 32. FIG. 31 and FIG. 32 are diagrams showing a sequence of a mobile communication system for describing the unused radio resources in the case where the third embodiment is executed. FIG. 31 and FIG. 32 are continuous from each other at a position of a boundary A1. The steps of FIG. 31 and FIG. 32 corresponding to the steps shown in FIG. 17 and FIG. 26 are denoted by the same reference symbols, and the common description is not given here.

First, the MTCD_1 performs the process of Step ST1703, and the MTCD_n performs the process of Step ST1704. Then, the HeNB 3007 that has received "RRC Connection Requests" transmitted from the MTCD_1 and MTCD_n performs the processes of Step ST1705 and Step ST1707. Then, the MTCD_1 performs the process of Step ST2601, and the MTCD_n performs the process of Step ST2602. Then, the HeNB 3007 that has received the attach messages transmitted from the MTCD_1 and MTCD_n performs the processes of Step ST2603 and Step ST2604. Then, the MME performs the process of Step ST2605. Then, the HSS performs the process of Step ST2606.

The MME receives an incoming call directed to the MTCD_1 in Step ST2607, and then, in Step ST2608, the MME searches the tracking area list (also referred to as TAI list) of the MTCD_1. In this operation example, it is revealed to the MME that the tracking area list of the MTCD_1 includes the tracking area #1 (TA#1) 3016 and the tracking area #2 (TA#2) 3017.

In Step ST3101, the MME notifies the HeNB 3007 of paging directed to the MTCD_1. This paging includes the tracking area list of the MTCD_1 and the identity of the MTCD_1.

In Step ST3102, the MME notifies the HeNB 3005 of paging directed to the MTCD_1. This paging includes the tracking area list of the MTCD_1 and the identity of the MTCD_1.

In Step ST3103, the MME notifies the HeNB 3003 of paging directed to the MTCD_1. This paging includes the tracking area list of the MTCD_1 and the identity of the MTCD_1.

In Step ST3104, the HeNB 3007 judges whether or not the tracking area included in the tracking area list of the MTCD_1, which is contained in the paging received in Step ST3101, includes the own HeNB. In a case of judging that the own HeNB is included, the HeNB 3007 moves to Step ST3105. In a case of judging that the own HeNB is not included, the HeNB 3007 does not perform the process of Step ST3105. In this operation example, the tracking area #1 (TA#1) 3016 included in the tracking area list includes the own HeNB 3007 as shown in FIG. 30. Accordingly, the HeNB 3007 moves to Step ST3105 after the process of Step ST3104.

In Step ST3105, the HeNB 3007 notifies the MTCD_1 of paging directed to the MTCD_1. This paging is notified in the mobile communication system standardized by 3GPP. Non- Patent Document 1, Non-Patent Document 2, and Non-Patent Document 16 disclose a detailed notification method for the paging.

In Step ST3106, the HeNB 3005 judges whether or not the tracking area included in the tracking area list of the MTCD_1, which is contained in the paging received in Step ST3102, includes the own HeNB. In a case of judging that the own HeNB is included, the HeNB 3005 moves to Step ST3107. In a case of judging that the own HeNB is not included, the HeNB 3005 does not perform the process of Step ST3107. In this operation example, the tracking area #1 (TA#1) 3016 included in the tracking area list includes the own HeNB 3005 as shown in FIG. 30. Accordingly, the HeNB 3005 moves to Step ST3107 after the process of Step ST3106.

In Step ST3107, the HeNB 3005 notifies paging directed to the MTCD_1. This paging is notified in the mobile communication system standardized by 3GPP. Non-Patent Document 1, Non-Patent Document 2, and Non-Patent Document 16 disclose a detailed notification method for the paging.

In Step ST3108, the HeNB 3003 judges whether or not the tracking area included in the tracking area list of the MTCD_1, which is contained in the paging received in Step ST3103, includes the own HeNB. In a case of judging that the own HeNB is included, the HeNB 3003 moves to Step ST3109. In a case of judging that the own HeNB is not included, the HeNB 3003 does not perform the process of Step ST3109. In this operation example, the tracking area #1 (TA#1) 3016 included in the tracking area list includes the own HeNB 3003 as shown in FIG. 30. Therefore, the HeNB 3003 moves to Step ST3109 after the process of Step ST3108.

In Step ST3109, the HeNB 3003 notifies paging directed to the MTCD_1. This paging is notified in the mobile communication system standardized by 3GPP. Non-Patent Document 1, Non-Patent Document 2, and Non-Patent Document 16 disclose a detailed notification method for the paging.

As described above, the user equipment 3009 whose MTCD identity is MTCD_1 is located within the coverage 3008 of the HeNB 3007, and thus receives paging from the HeNB 3007 in Step ST3105. Therefore, the paging from the HeNB 3005 in Step ST3107 and the paging from the HeNB 3003 in Step ST3109 become unnecessary.

Figure 34:
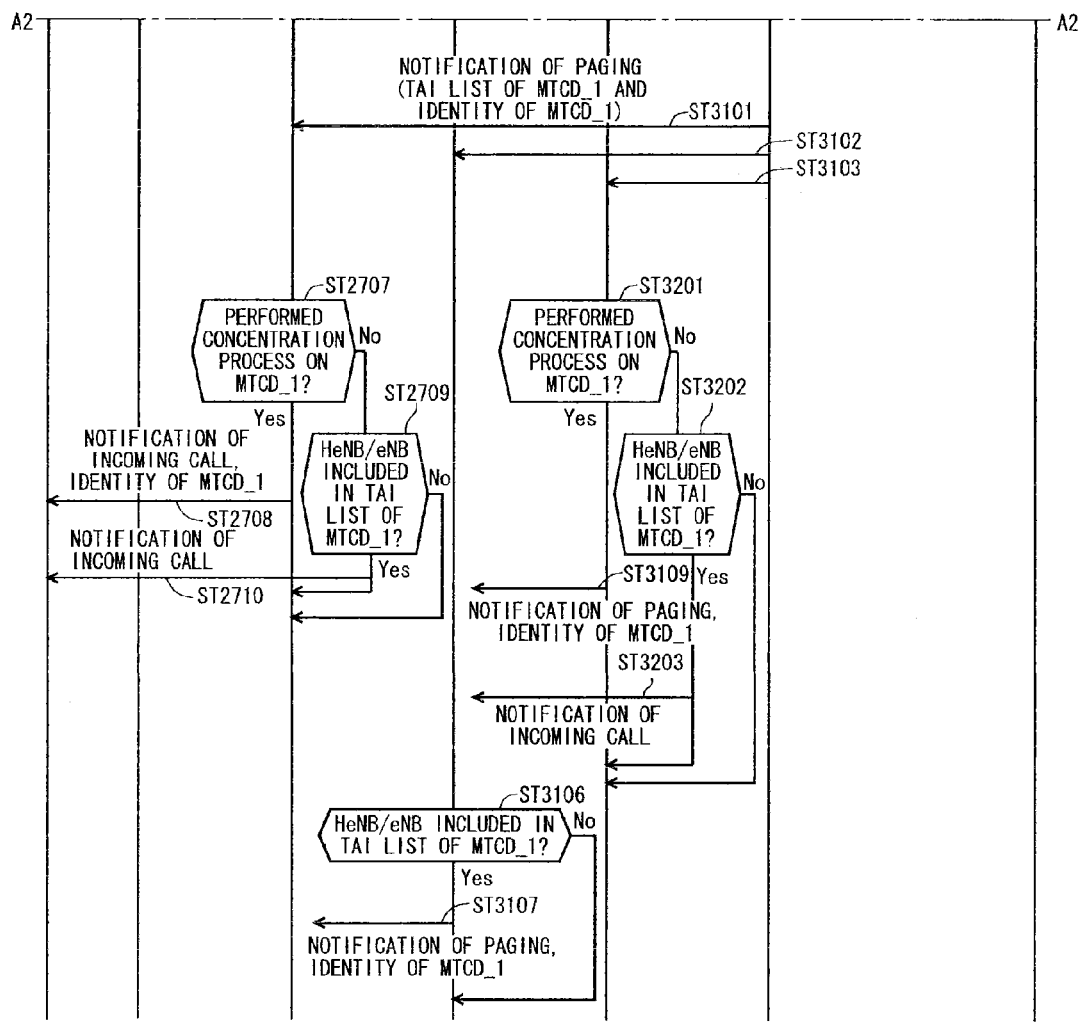
FIG. 34 is another diagram showing the sequence of the mobile communication system for describing unused radio resources in the case where the fourth embodiment is executed.

Next, unused radio resources in a case where the fourth embodiment is executed are described with reference to FIG. 33 and FIG. 34. FIG. 33 and FIG. 34 are diagrams showing a sequence of a mobile communication system for describing the unused radio resources in the case where the fourth embodiment is executed. FIG. 33 and FIG. 34 are continuous from each other at a position of a boundary A2. The steps of FIG. 33 and FIG. 34 corresponding to the steps shown in FIG. 26, FIG. 27, FIG. 31, and FIG. 32 are denoted by the same reference symbols, and the common description is not given here.

In this operation example, description is given with reference to the location diagram shown in FIG. 30. The HeNB 3003 and the HeNB 3007 are HeNBs with the capability of performing a concentration process, and the HeNB 3005 is a HeNB without the capability of performing a concentration process. The user equipment 3009 is an MTCD, and the identity of the MTCD is MTCD_1. The HeNB 3007 concentrates the data from the user equipment 3009.

First, the MTCD_1 performs the process of Step ST2701, and the MTCD_n performs the process of Step ST2702. Then, the HeNB 3007 performs the processes of Step ST2703 to Step ST2706. Then, the MME performs the process of Step ST2605, and the HSS performs the process of Step ST2606.

The MME receives an incoming call directed to the MTCD_1 in Step ST2607, and then, in Step ST2608, the MME searches the tracking area list (also referred to as TAI list) of the MTCD_1. In this operation example, it is revealed to the MME that the tracking area list of the MTCD_1 includes the tracking area #1 (TA#1) 3016 and the tracking area #2 (TA#2) 3017.

In Step ST3101, the MME notifies the HeNB 3007 of the paging directed to the MTCD_1. This paging includes the tracking area list of the MTCD_1 and the identity of the MTCD_1.

In Step ST3102, the MME notifies the HeNB 3005 of paging directed to the MTCD_1. This paging includes the tracking area list of the MTCD_1 and the identity of the MTCD_1.

In Step ST3103, the MME notifies the HeNB 3003 of the paging directed to the MTCD_1. This paging includes the tracking area list of the MTCD_1 and the identity of the MTCD_1.

The HeNB 3007 has the capability of performing a concentration process. Accordingly, in Step ST2707, the HeNB judges whether or not to have performed a concentration process on the MTCD_1 included in the paging received in Step ST3101. The information stored in Step ST2704 may be used for the judgment process of Step ST2707. In a case of judging to have performed the concentration process, the HeNB 3007 moves to Step ST2708. In a case of judging to not have performed the concentration process, the HeNB 3007 moves to Step ST2709. In this operation example, the HeNB 3007 has performed the concentration process on the MTCD_1. Accordingly, the HeNB 3007 judges to have performed the concentration process and moves to Step ST2708.

The HeNB 3005 does not have the capability of performing a concentration process. Accordingly, in Step ST3106, the HeNB 3005 judges whether or not the tracking area included in the tracking area list of the MTCD_1, which is contained in the paging received in Step ST3102, includes the own HeNB as in the current paging method. In a case of judging that the own HeNB is included, the HeNB 3005 moves to Step ST3107. In a case of judging that the own HeNB is not included, the HeNB 3005 does not perform the process of Step ST3107. In this operation example, the tracking area #1 (TA#1) 3016 included in the tracking area list includes the own HeNB 3005 as shown in FIG. 30. Accordingly, the HeNB 3005 moves to Step ST3107 after the process of Step ST3106.

The HeNB 3003 has the capability of performing a concentration process. Accordingly, in Step ST3201, the HeNB judges whether or not to have performed the concentration process on the MTCD_1 included in the paging received in Step ST3103. In a case of judging to have performed the concentration process, the HeNB 3003 moves to Step ST3109. In a case of judging to not have performed the concentration process, the HeNB 3003 moves to Step ST3202. In this operation example, the HeNB 3003 has not performed the concentration process on the MTCD_1. Accordingly, the HeNB 3003 judges not to have performed the concentration process and moves to Step ST3202.

In Step ST3202, the HeNB judges whether or not the tracking area included in the tracking area list of the MTCD_1, which is contained in the paging received in Step ST3103, includes the own HeNB. In a case of judging that the own HeNB is included, the HeNB moves to Step ST3203. In a case of judging that the own HeNB is not included, the HeNB does not perform the process of Step ST3203. In Step ST3203, the HeNB notifies an incoming call in the communication system within 3GPP. In this operation example, the HeNB 3003 is included in the tracking area of the MTCD_1, and thus performs the process of Step ST3203.

As described above, the user equipment 3009 whose MTCD identity is MTCD_1 is located within the coverage 3008 of the HeNB 3007, and thus receives paging from the HeNB 3007 in Step ST3105. Therefore, the paging from the HeNB 3005 in Step ST3107 and the paging from the HeNB 3003 in Step ST3203 become unnecessary.

The solution in the seventh embodiment is described below. The execution of the concentration process by the HeNB is registered with the MME, HSS, or the like being a core network, together with the MTCD identity. The information regarding whether or not to perform a concentration process is also referred to as "concentration process situation" below. In a case where paging directed to an MTCD has occurred, the concentration process situation is contained in the paging message. In a case of having received the paging message containing the information indicating to perform the concentration process, the HeNB transmits the paging message in a case where the own HeNB has the capability of performing a concentration process.

The following four (1) to (4) are disclosed as specific examples of the timing of registering with a core network that a HeNB performs a concentration process. (1) Every time a HeNB concentrates data from an MTCD being served thereby to a core network. (2) In a case of performing a concentration process on an attach message from an MTCD or in a case of selecting "Attach procedure" in the concentration process. In this specific example (2), the number of times of registering with a core network that a HeNB performs a concentration process is fewer than that of the specific example (1). Accordingly, communication resources can be used effectively, leading to a reduction of the processing load of the HeNB. (3) In a case of performing a concentration process on a TAU message from an MTCD or in a case of selecting "Tracking Area Update procedure" in the concentration process. In this specific example (3), the number of times of registering with a core network that a HeNB performs a concentration process is fewer than that of the specific example (1). Accordingly, communication resources can be used effectively, leading to a reduction of the processing load of the HeNB. (4) Combination of (2) and (3) above.

One specific example of the timing of deleting the registration that a core network performs a concentration process is a time when the core network receives "Detach procedure" from an MTCD. A specific example of the registration method is disclosed below. The core network stores a concentration process situation in association with the MTCD identity.

The following two (1) and (2) are disclosed as specific examples of the entity for registration. (1) MME. In a case of processing an incoming call, it is not required to inquire of another entity. This prevents a control delay and is effective in a reduction of the processing load of a communication system. (2) HSS. This enables to store a concentration process situation together with the other registration information and is effective in that data can be integrally managed. The specific example (2) is more advantageous than the specific example (1) in that even in a case where an MME changes upon moving of a user equipment, the registration information can be used effectively. That is, the number of times of registering a concentration process with an HSS from a HeNB can be reduced. This enables to effectively use communication resources, leading to a reduction of the processing load of a HeNB.

The following two (1) and (2) are disclosed as specific examples of the method of causing, when paging occurs, a paging message to contain the information indicating that a concentration process has been performed. (1) In a case where a registration location is an HSS, a caller or an MME being a receiver inquires a concentration process situation of the HSS. The MME maps the inquiry results to a paging message. (2) In a case where a registration location is an MME, an MME being a receiver searches a concentration process situation of an MTCD to which an incoming call is made. The MME maps the search results to a paging message.

Figure 35:
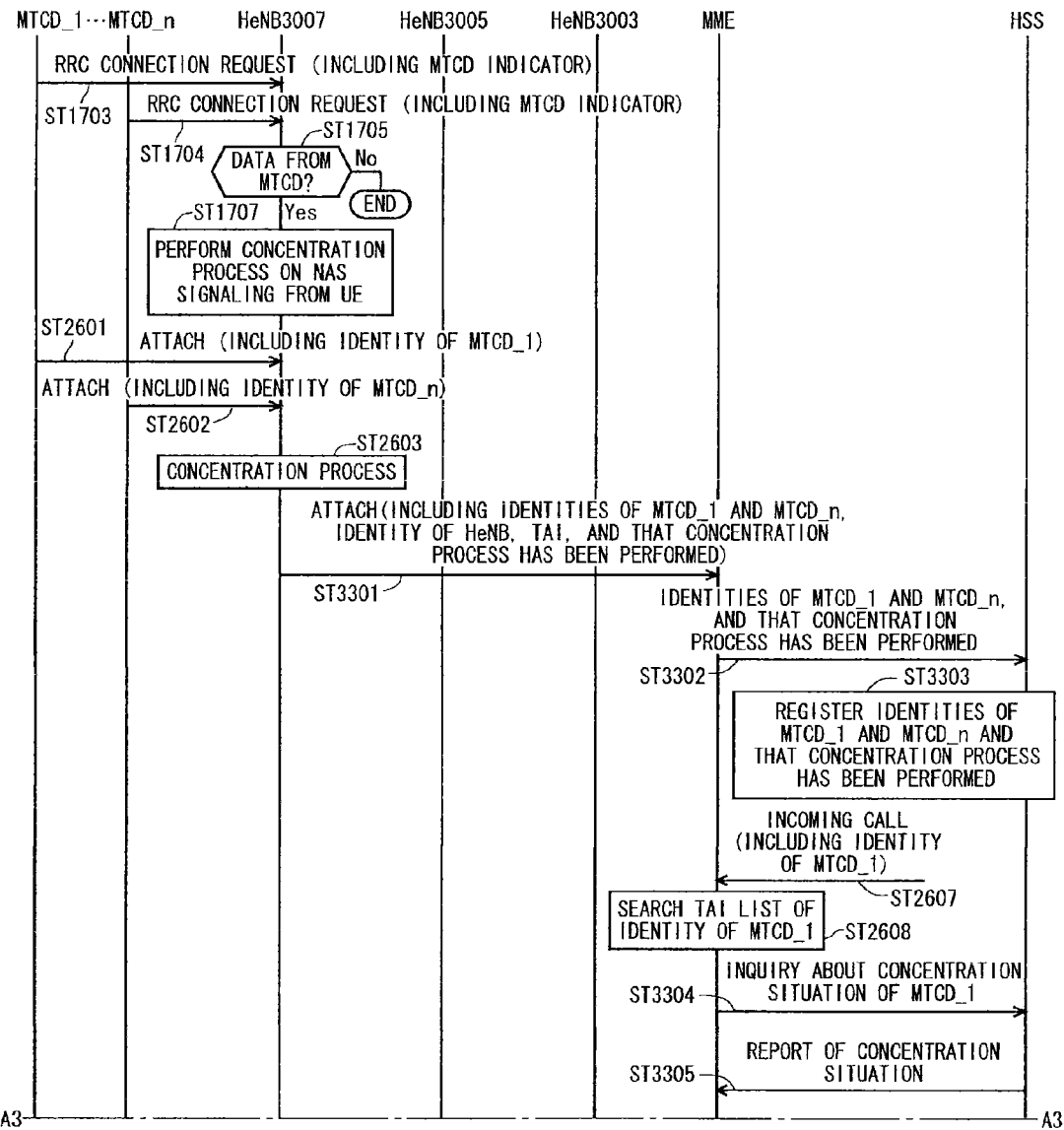
FIG. 35 is a diagram showing a sequence of a mobile communication system in a seventh embodiment.
Figure 36:
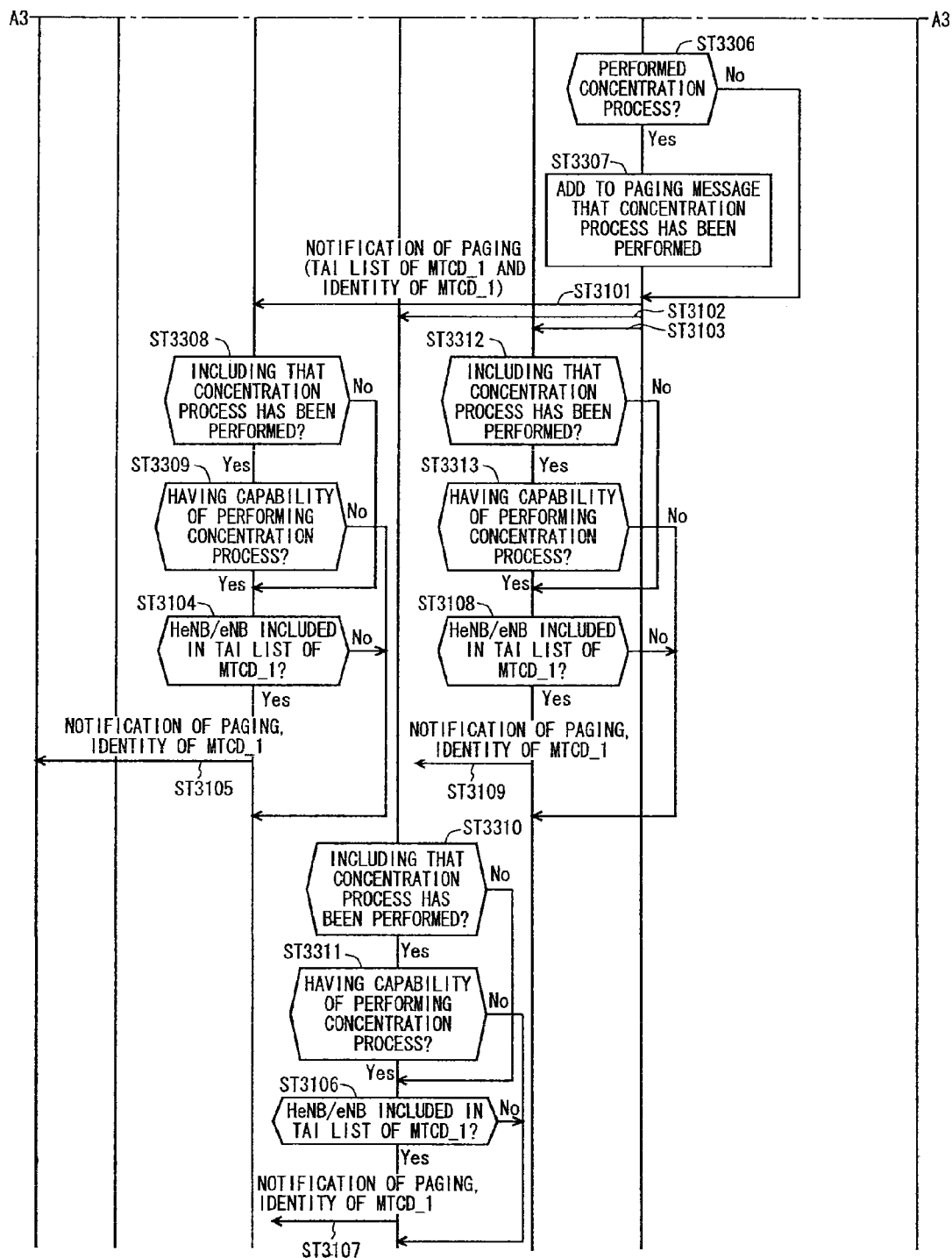
FIG. 36 is another diagram showing the sequence of the mobile communication system in the seventh embodiment.

A specific operation example using the seventh embodiment is described with reference to FIG. 35 and FIG. 36. FIG. 35 and FIG. 36 are diagrams showing a sequence of a mobile communication system in the seventh embodiment. FIG. 35 and FIG. 36 are continuous from each other at a position of a boundary A3. The steps of FIG. 35 and FIG. 36 corresponding to the steps shown in FIG. 17, FIG. 26, FIG. 31, and FIG. 32 are denoted by the same reference symbols, and the common description is not given here.

In this operation example, description is given with reference to the location diagram shown in FIG. 30. The HeNB 3003 and HeNB 3007 are HeNBs with the capability of performing a concentration process, and the HeNB 3005 is a HeNB without the capability of performing a concentration process. The user equipment 3009 is an MTCD, and the MTCD identity is MTCD_1. As a specific example of the timing of registering with a core network that a HeNB performs a concentration process, a case of concentrating attach messages of MTCDs is disclosed. In addition, a case in which a specific example of the entity for registration is an HSS is disclosed. Further, a case in which the third embodiment is executed is disclosed.

First, the MTCD_1 performs the process of Step ST1703, and the MTCD_n performs the process of Step ST1704. Then, the HeNB 3007 that has received "RRC Connection Requests" transmitted from the MTCD_1 and MTCD_n performs the processes of Step ST1705 and Step ST1707. Then, the MTCD_1 performs the process of Step ST2601, and the MTCD_n performs the process of Step ST2602. Then, in Step ST2603, the HeNB 3007 that has received the attach messages transmitted from the MTCD_1 and MTCD_n performs the concentration process on the attach message from the MTCD_1, which has been received in Step ST2601, and the attach message from the MTCD_n, which has been received in Step ST2602. That is, the HeNB performs the concentration process on the attach messages. Accordingly, in this operation example, the HeNB 3007 registers with a core network that a concentration process is performed.

Then, in Step ST3301, the HeNB 3007 notifies the MME of the attach message concentrated through the concentration process in Step ST2603 and of that a concentration process is performed. The attach message contains the identity of the MTCD_1 and the identity of the MTCD_n being identities of MTCDs that are targets of the concentration process, the identity of the HeNB, and the TAI. The attach message may contain that a concentration process is performed. The second embodiment, the first modification of the second embodiment, the second modification of the second embodiment, and the third modification of the second embodiment can be used in this notification.

In Step ST3302, the MME notifies a home subscriber server (HSS) of the identity of the MTCD_1 and the identity of the MTCD_n, which are identities of MTCDs that have been received as attach messages, and of that a concentration process is performed.

In Step ST3303, the HSS registers and manages the identity of the MTCD_1 and the identity of the MTCD_n that have been attached, and that the concentration process is performed. In registration and management, the concentration process situation is associated with the MTCD identity. The MME receives an incoming call directed to the MTCD_1 in Step ST2607, and then, the MME performs the process of Step ST2608.

Then, in Step ST3304, the MME inquires the concentration situation of the MTCD_1 of the HSS. In Step ST3305, the HSS reports the concentration situation of the MTCD_1 to the MME. The concentration process has been performed on the MTCD_1 in this operation example, and thus, the HSS reports that the concentration process is performed.

In Step ST3306, the MME judges whether or not the concentration process has been performed on the MTCD_1 based on the concentration situation report received in Step ST3305. In a case of judging that the concentration process has been performed on the MTCD_1, the MME moves to Step ST3307. In a case of judging that the concentration process has not been performed on the MTCD_1, the MME moves to Step ST3101. In this operation example, the concentration process has been performed on the MTCD_1, and the HSS reports that the concentration process is performed in Step ST3305. Therefore, the MME judges that the concentration process has been performed on the MTCD_1 and moves to Step ST3307.

In Step ST3307, the MME adds, to the paging message directed to the MTCD_1, that the concentration process has been performed. Therefore, in this operation example in which the process of Step ST3307 is performed, the paging message directed to the MTCD_1, which is notified the HeNB 3007 by the MME in Step ST3101, contains that the concentration process has been performed in addition to the tracking area list of the MTCD_1 and the identity of the MTCD_1. Similarly, the paging message directed to the MTCD_1, which is notified the HeNB 3005 by the MME in Step ST3102, contains that the concentration process has been performed in addition to the tracking area list of the MTCD_1 and the identity of the MTCD_1. Similarly, the paging message directed to the MTCD_1, which is notified the HeNB 3003 by the MME in Step ST3103, contains that the concentration process has been performed in addition to the tracking area list of the MTCD_1 and the identity of the MTCD_1.

In Step ST3308, the HeNB 3007 judges whether or not the paging received in Step ST3101 includes that the concentration process has been performed. In a case of judging that the concentration process has been performed is included, the HeNB 3007 moves to Step ST3309. In a case of judging that the paging does not include the concentration process has been performed, the HeNB 3007 moves to Step ST3104. In this operation example, the paging received in Step ST3101 includes that the concentration process has been performed. Therefore, the HeNB 3007 moves to Step ST3309 after the process of Step ST3308.

In Step ST3309, the HeNB 3007 judges whether or not the own HeNB has the concentration processing capability. In a case of judging that the own HeNB has the concentration processing capability, the HeNB 3007 moves to Step ST3104. In a case of judging that the own HeNB does not have the concentration processing capability, the HeNB 3007 does not perform the processes of Step ST3104 and Step ST3105. In this operation example, the HeNB 3007 has the concentration processing capability, and thus moves to Step ST3104. Then, the HeNB 3007 performs the processes of Step ST3104 and Step ST3105.

In Step ST3310, the HeNB 3005 judges whether or not the paging received in Step ST3102 includes that the concentration process has been performed. In a case of judging that the paging includes that the concentration process has been performed, the HeNB 3005 moves to Step ST3311. In a case of judging that the paging does not include the concentration process has been performed, the HeNB 3005 moves to Step ST3106. In this operation example, the paging received in Step ST3102 includes that the concentration process has been performed. Accordingly, the HeNB 3005 moves to Step ST3311 after the process of Step ST3310.

In Step ST3311, the HeNB 3005 judges whether or not the own HeNB has the concentration processing capability. In a case of judging that the own HeNB has the concentration processing capability, the HeNB 3005 moves to Step ST3106. In a case of judging that the own HeNB does not have the concentration processing capability, the HeNB 3005 does not perform the processes of Step ST3106 and Step ST3107. In this operation example, the HeNB 3005 does not have the concentration processing capability, and thus does not perform the processes of Step ST3106 and Step ST3107. In FIG. 31 and FIG. 32 for describing unused radio resources in a case where the third embodiment is executed, as shown in Step ST3107 of FIG. 32, the HeNB 3005 notifies the unnecessary paging directed to the MTCD_1, which is not received by the MTCD_1. In the present embodiment, unnecessary paging as shown in Step ST3107 of FIG. 32 can be reduced.

In Step ST3312, the HeNB 3003 judges whether or not the paging received in Step ST3103 includes that the concentration process has been performed. In a case of judging that the concentration process has been performed is included, the HeNB 3003 moves to Step ST3313. In a case of judging that the paging does not include the concentration process has been performed, the HeNB 3003 moves to Step ST3108. In this operation example, the paging received in Step ST3103 includes that the concentration process has been performed. Accordingly, the HeNB 3003 moves to Step ST3313 after the process of Step ST3312.

In Step ST3313, the HeNB 3003 judges whether or not the own HeNB has the concentration processing capability. In a case of judging that the own HeNB has the concentration processing capability, the HeNB 3003 moves to Step ST3108. In a case of judging that the own HeNB does not have the concentration processing capability, the HeNB 3003 does not perform the processes of Step ST3108 and Step ST3109. In this operation example, the HeNB 3003 has the concentration processing capability, and thus moves to Step ST3108. Then, the HeNB 3003 performs the processes of Step ST3108 and Step ST3109.

Figure 37:
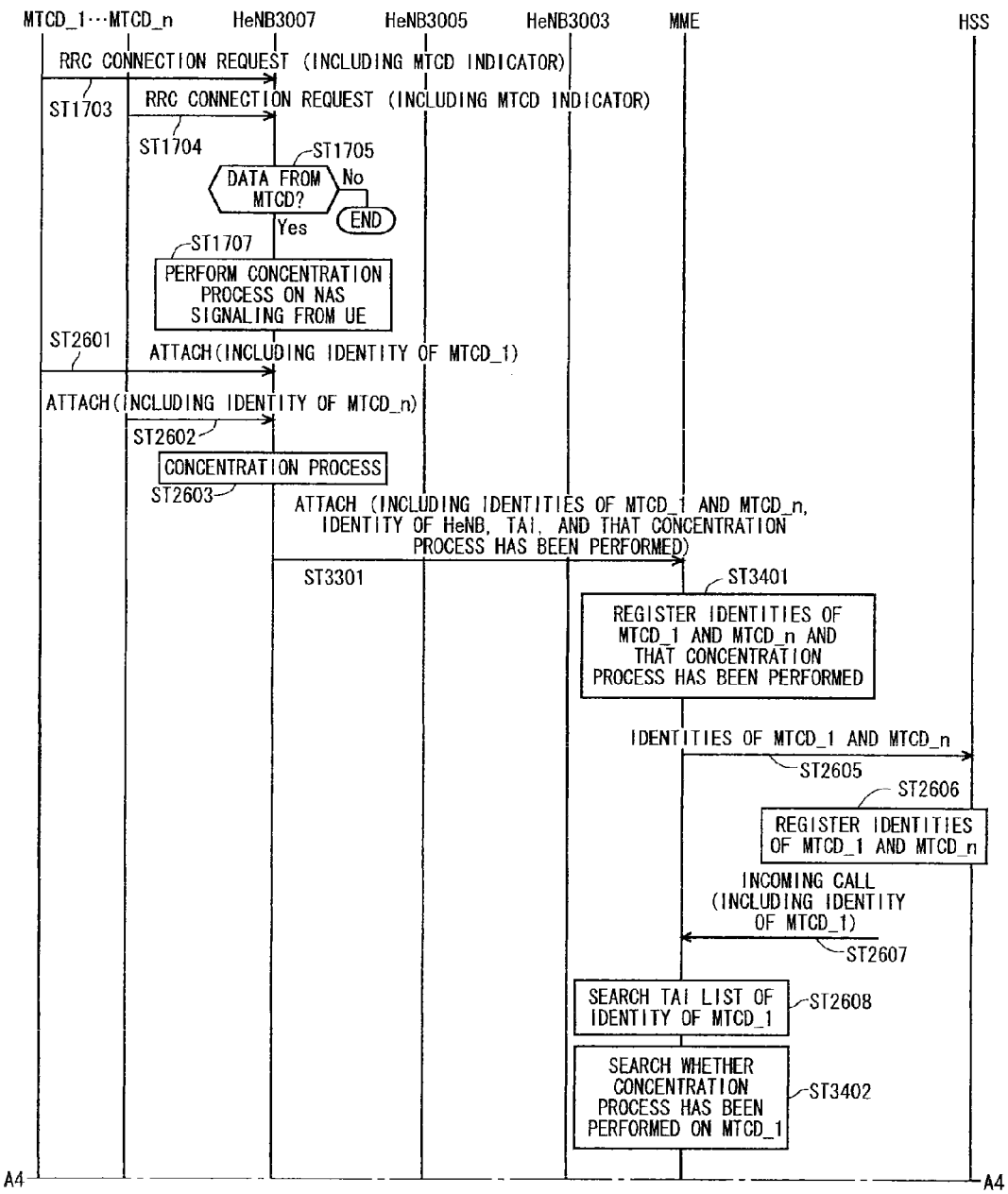
FIG. 37 is a diagram showing another sequence of the mobile communication system in the seventh embodiment.
Figure 38:
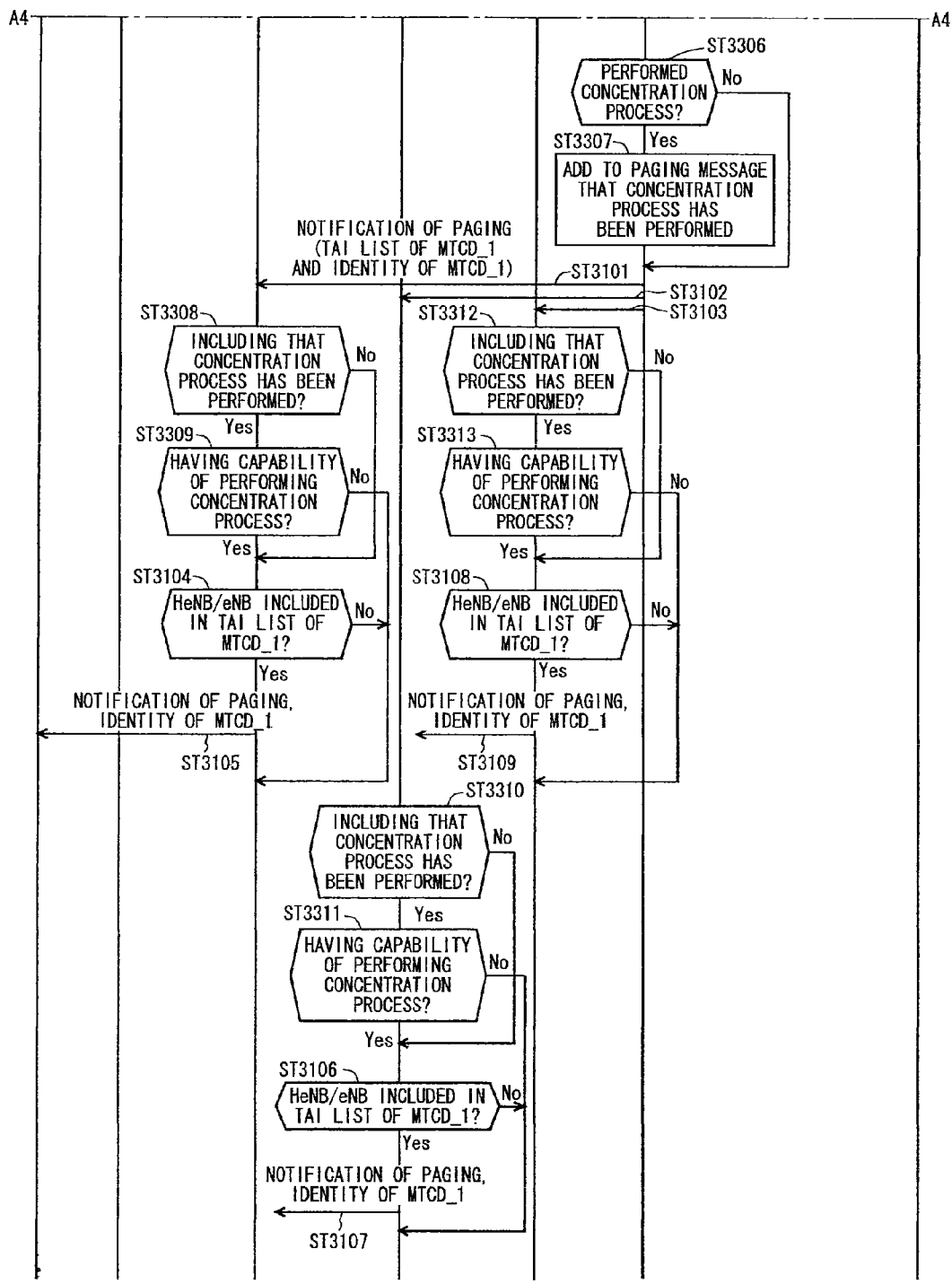
FIG. 38 is another diagram showing the another sequence of the mobile communication system in the seventh embodiment.

A specific operation example using the seventh embodiment is described with reference to FIG. 37 and FIG. 38. FIG. 37 and FIG. 38 are diagrams showing another sequence of the mobile communication system in the seventh embodiment. FIG. 37 and FIG. 38 are continuous from each other at a position of a boundary A4. The steps of FIG. 37 and FIG. 38 corresponding to the steps shown in FIG. 17, FIG. 26, and FIG. 31 to FIG. 36 are denoted by the same reference symbols, and the common description is not given here.

In this operation example, description is given with reference to the location diagram shown in FIG. 30. The HeNB 3003 and the HeNB 3007 are HeNBs with the capability of performing a concentration process, and the HeNB 3005 is a HeNB without the capability of performing a concentration process. The user equipment 3009 is an MTCD and the MTCD identity is MTCD_1. As a specific example of the timing of registering with a core network that a HeNB performs a concentration process, a case of concentrating attach messages of MTCDs is disclosed. In addition, a case in which a specific example of the entity for registration is an MME is disclosed. Further, a case in which the third embodiment is executed is disclosed.

First, the MTCD_1 performs the process of Step ST1703, and the MTCD_n performs the process of Step ST1704. Then, the HeNB 3007 that has received "RRC Connection Requests" transmitted from the MTCD_1 and MTCD_n performs the processes of Step ST1705 and Step ST1707. Then, the MTCD_1 performs the process of Step ST2601, and the MTCD_n performs the process of Step ST2602. Then, the HeNB 3007 that has received the attach messages transmitted from the MTCD_1 and MTCD_n performs the processes of Step ST2603 and Step ST3301.

Then, in Step ST3401, the MME registers and manages the identity of the MTCD_1 and the identity of the MTCD_n, which are identities of MTCDs received through the attach message in Step ST3301. In registration and management, the concentration process situation is associated with the MTCD identity. Then, the MME performs the process of Step ST2605, and the HSS performs the process of Step ST2606. The MME receives an incoming call directed to the MTCD_1 in Step ST2607, and then, the MME performs the process of Step ST2608.

Then, in Step ST3402, the MME searches a concentration situation of the MTCD_1. After the process of Step ST3402, the MME performs the processes of Step ST3306, Step ST3307, and Step ST3101 to Step ST3103, as in FIG. 36. The HeNB 3007 performs the processes of Step ST3308, Step ST3309, Step ST3104, and Step ST3105. The HeNB 3005 performs the processes of Step ST3310, Step ST3311, Step ST3106, and Step ST3107. The HeNB 3003 performs the processes of Step ST3312, Step ST3313, Step ST3108, and Step ST3109.

In this operation example, in Step ST3311, the HeNB 3005 judges whether or not the own HeNB has the concentration processing capability, as in the sequence shown in FIG. 36. In a case of judging that the own HeNB has the concentration processing capability, the HeNB 3005 moves to Step ST3106. In a case of judging that the own HeNB does not have the concentration processing capability, the HeNB 3005 does not perform the processes of Step ST3106 and Step ST3107. In this operation example, the HeNB 3005 does not have the concentration processing capability, and thus does not perform the processes of Step ST3106 and Step ST3107. In FIG. 31 and FIG. 32 for describing unused radio resources in a case of executing the third embodiment, as shown in Step ST3107 of FIG. 32, the HeNB 3005 notifies the unnecessary paging directed to the MTCD_1, which is not received by the MTCD_1. In the present embodiment, unnecessary paging as shown in Step ST3107 of FIG. 32 can be reduced.

Figure 39:
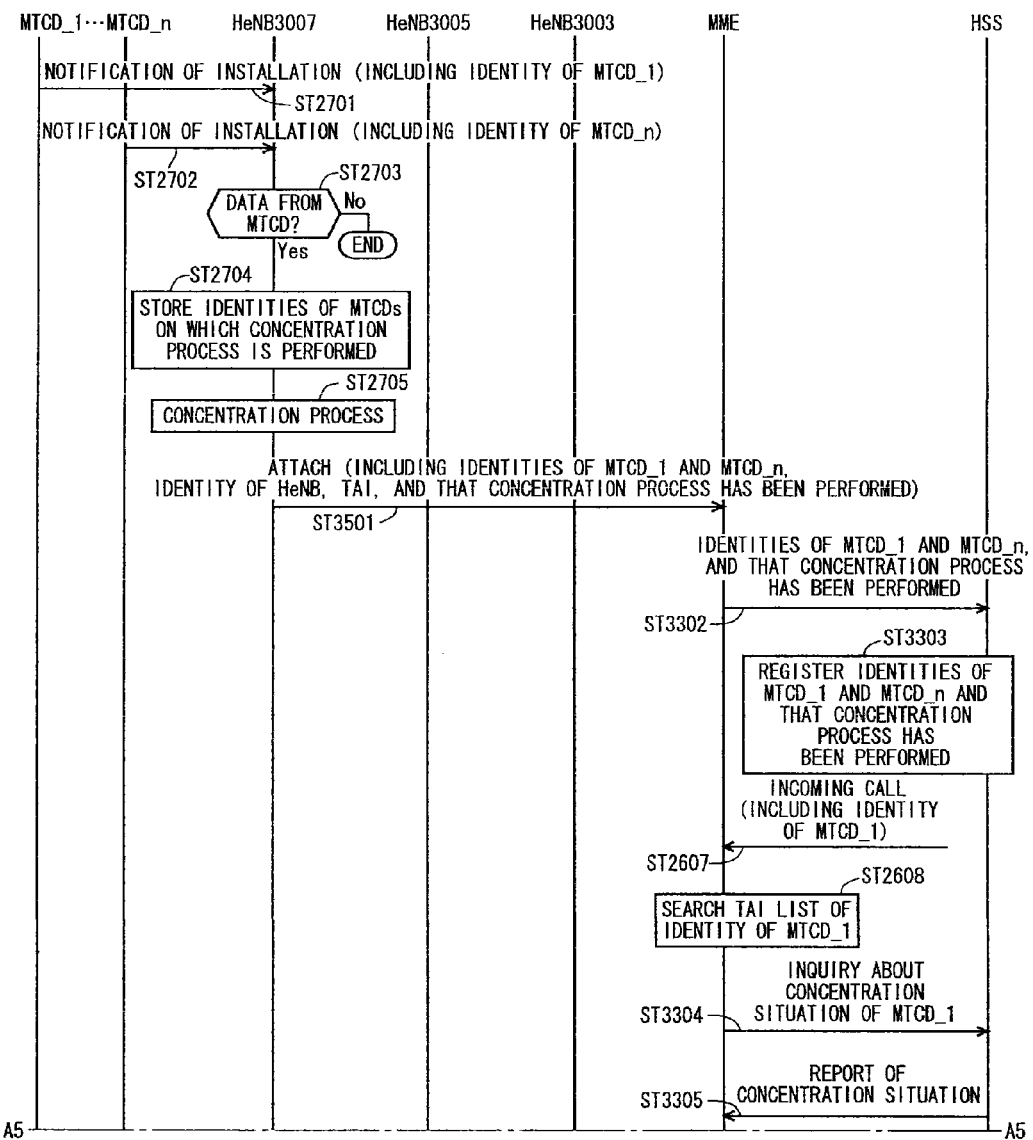
FIG. 39 is a diagram showing still another sequence of the mobile communication system in the seventh embodiment.
Figure 40:
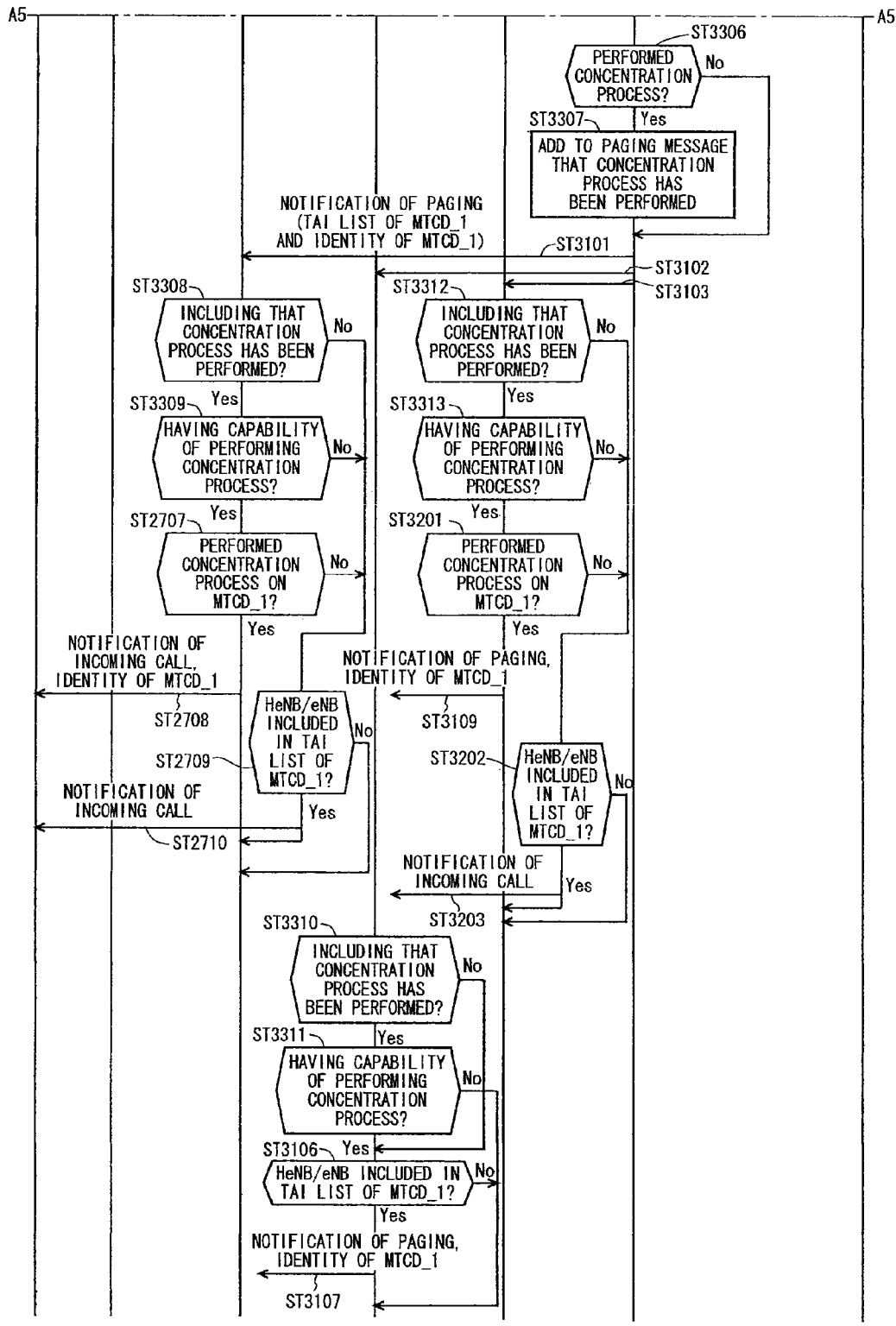
FIG. 40 is another diagram showing the still another sequence of the mobile communication system in the seventh embodiment.

A specific operation example using the seventh embodiment is described with reference to FIG. 39 and FIG. 40. FIG. 39 and FIG. 40 are diagrams showing another sequence of a mobile communication system in the seventh embodiment. FIG. 39 and FIG. 40 are continuous from each other at a position of a boundary A5. The steps of FIG. 39 and FIG. 40 corresponding to the steps shown in FIG. 26, FIG. 27, and FIG. 31 to FIG. 36 are denoted by the same reference symbols, and the common description is not given here.

In this operation example, description is given with reference to the location diagram shown in FIG. 30. The HeNB 3003 and the HeNB 3007 are HeNBs with the capability of performing a concentration process, and the HeNB 3005 is a HeNB without the capability of performing a concentration process. The user equipment 3009 is an MTCD and the MTCD identity is MTCD_1. As a specific example of the timing of registering with a core network that a HeNB performs a concentration process, a case of selecting "Attach procedure" in the concentration process is disclosed. In addition, a case in which a specific example of the entity for registration is an HSS is disclosed. Further, a case in which the fourth embodiment is executed is disclosed.

First, the MTCD_1 performs the process of Step ST2701, and the MTCD_n performs the process of Step ST2702. Then, the HeNB 3007 performs the processes of Step ST2703 and Step ST2704.

Then, in Step ST2705, the HeNB 3007 performs a concentration process. In this operation example, the HeNB 3007 collectively notifies the MME of pieces of data from the MTCD_1 and the MTCD_n to the core network. The HeNB 3007 interprets the contents of Step ST2701 and Step ST2702 accessed outside 3GPP, and grasps the contents as the access related to "installation". Then, the HeNB 3007 selects "Attach procedure" as the protocol within 3GPP, which is in accordance with the access related to "installation". The HeNB 3007 selects "Attach procedure" in the concentration process. Accordingly, in this operation example, the HeNB 3007 registers with the core network that the concentration process is performed.

In Step ST3501, the HeNB 3007 notifies the MME of the attach message concentrated through the concentration process in Step ST2705, and of that the concentration process is performed. The attach message may contain the identity of the MTCD_1 and the identity of the MTCD_n, which are identities of MTCDs being targets of the concentration process, the identity of the HeNB, and the TAI. The attach message may contain that the concentration process is performed. The second embodiment, the first modification of the second embodiment, the second modification of the second embodiment, and the third modification of the second embodiment can be used in this notification.

After the process of Step ST3501, the MME performs the processes of Step ST3302, Step ST2608, Step ST3304, Step ST3306, Step ST3307, and Step ST3101 to Step ST3103. The HSS performs the processes of Step ST3303, Step ST2607, and Step ST3305. The HeNB 3007 performs the processes of Step ST3308, Step ST3309, Step ST2707, Step ST2708, Step ST2709, and Step ST2710. The HeNB 3005 performs the processes of Step ST3310, Step ST3311, Step ST3106, and Step ST3107. The HeNB 3003 performs the processes of Step ST3312, Step ST3313, Step ST3201, Step ST3109, Step ST3202, and Step ST3203.

In Step ST3310, the HeNB 3005 judges whether or not the paging received in Step ST3102 includes that the concentration process has been performed. In a case of judging that the paging includes that the concentration process has been performed, the HeNB 3005 moves to Step ST3311. In a case of judging that the paging does not include the concentration process has been performed, the HeNB 3005 moves to Step ST3106. In this operation example, the paging received in Step ST3102 includes that the concentration process has been performed. Accordingly, the HeNB 3005 moves to Step ST3311 after the process of Step ST3310.

In Step ST3311, the HeNB 3005 judges whether or not the own HeNB has the concentration processing capability. In a case of judging that the own HeNB has the concentration processing capability, the HeNB 3005 moves to Step ST3106. In a case of judging that the own HeNB does not have the concentration processing capability, the HeNB 3005 does not perform the processes of Step ST3106 and Step ST3107. In this operation example, the HeNB 3005 does not have the concentration processing capability, and thus does not perform the processes of Step ST3106 and Step ST3107. In FIG. 33 and FIG. 34 for describing unused radio resources in a case where the fourth embodiment is executed, as shown in Step ST3107 of FIG. 34, the HeNB 3005 notifies the unnecessary paging directed to the MTCD_1, which is not received by the MTCD_1. In the present embodiment, unnecessary paging as shown in Step ST3107 of FIG. 34 can be reduced.

Figure 41:
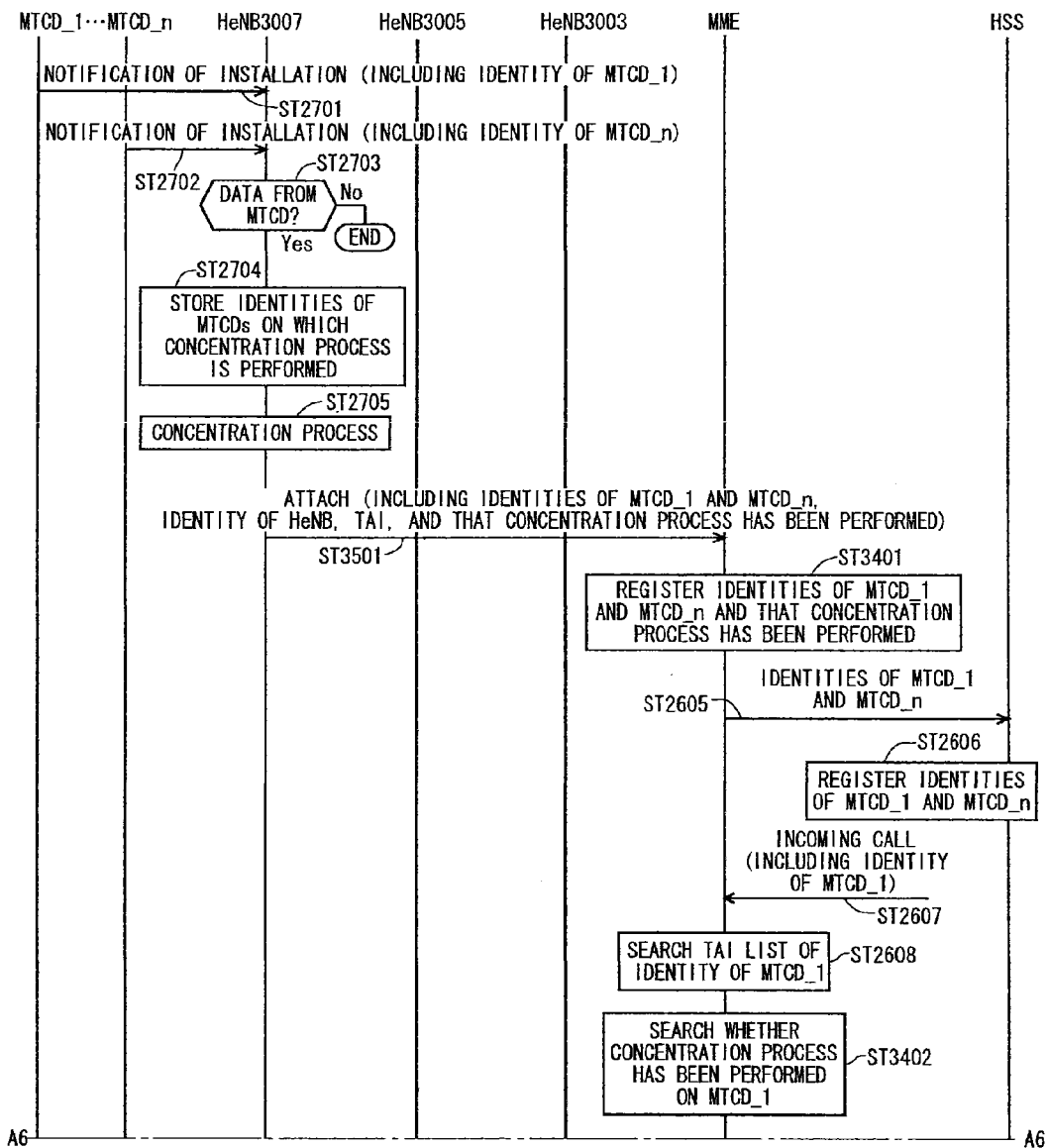
FIG. 41 is a diagram showing yet still another sequence of the mobile communication system in the seventh embodiment.
Figure 42:
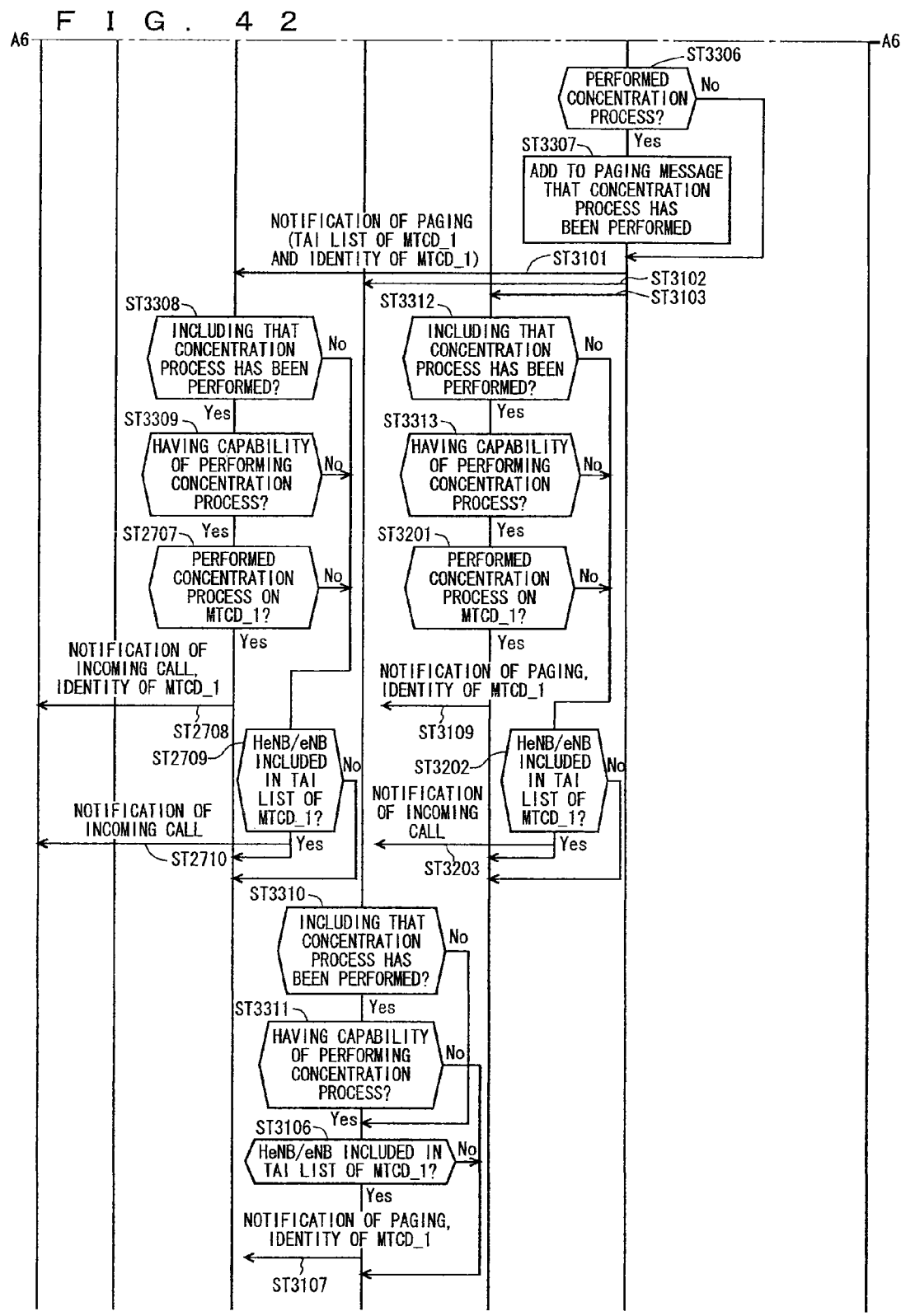
FIG. 42 is another diagram showing the yet still another sequence of the mobile communication system in the seventh embodiment.

A specific operation example using the seventh embodiment is described with reference to FIG. 41 and FIG. 42. FIG. 41 and FIG. 42 are diagrams showing another sequence of the mobile communication system in the seventh embodiment. FIG. 41 and FIG. 42 are continuous from each other at a position of a boundary A6. The steps of FIG. 41 and FIG. 42 corresponding to the steps shown in FIG. 26, FIG. 27, FIG. 31 to FIG. 36, FIG. 39, and FIG. 40 are denoted by the same reference symbols, and the common description is not given here.

In this operation example, description is given with reference to the location diagram shown in FIG. 30 above. The HeNB 3003 and the HeNB 3007 are HeNBs with the capability of performing a concentration process, and the HeNB 3005 is a HeNB without the capability of performing a concentration process. The user equipment 3009 is an MTCD and the MTCD identity is MTCD_1. As a specific example of the timing of registering with a core network that a HeNB performs a concentration process, a case of concentrating attach messages of MTCDs is disclosed. In addition, a case in which a specific example of the entity for registration is an MME is disclosed. Further, a case in which the fourth embodiment is executed is disclosed.

In this operation example, in Step ST3311, the HeNB 3005 judges whether or not the own HeNB has the concentration processing capability, as in the sequence shown in FIG. 39 and FIG. 40. In a case of judging that the own HeNB has the concentration processing capability, the HeNB 3005 moves to Step ST3106. In a case of judging that the own HeNB does not have the concentration processing capability, the HeNB 3005 does not perform the processes of Step ST3106 and Step ST3107. In this operation example, the HeNB 3005 does not have the concentration processing capability, and thus does not perform the processes of Step ST3106 and Step ST3107. In FIG. 33 and FIG. 34 for describing unused radio resources in a case where the fourth embodiment is executed, as shown in Step ST3107 of FIG. 34, the HeNB 3005 notifies the unnecessary paging directed to the MTCD_1, which is not received by the MTCD_1. In the present embodiment, unnecessary paging as shown in Step ST3107 of FIG. 34 can be reduced.

The seventh embodiment can achieve the following effects in addition to the effects of the third embodiment and the fourth embodiment. In a case of receiving a paging message containing the information indicating that a concentration process is performed, the HeNB transmits the paging message if the own HeNB has the capability of performing a concentration process. This enables to reduce the notification of the paging directed to the MTCD, on which a concentration process is performed, by a HeNB without the capability of performing a concentration process. An MTCD, to be served by a HeNB without concentration processing capability, on which the concentration process is performed will not be located. This enables to reduce only the transmission of unnecessary paging from a HeNB and effectively use radio resources while preventing an oversight of incoming calls. Accordingly, interference can be reduced.

First Modification of Seventh Embodiment

A solution to be solved in a first modification of the seventh embodiment is described below. In a case where the seventh embodiment is used, the following problem occurs. The problem is described with reference to FIG. 36. The use of the seventh embodiment enables to reduce the notification of the paging directed to the MTCD, on which a concentration process is performed, by a HeNB without the capability of performing a concentration process. Meanwhile, for example in Step ST3102 of FIG. 36, a paging message, which is not notified a HeNB without the capability of performing a concentration process, is notified. This causes a problem that unused communication resources are generated, and in Step ST3310, Step ST3311, and the like of FIG. 36, unnecessary processing load occurs in an MME or a HeNB without the capability of performing a concentration process.

A solution in the first modification of the seventh embodiment is described below. A portion different from the solution of the seventh embodiment is mainly described. A portion that is not described here is as in the seventh embodiment.

That a HeNB performs a concentration process is registered with an MME, HSS, or the like being a core network, together with the MTCD identity. The information regarding whether or not to perform a concentration process is also referred to as "concentration process situation". In a case where paging directed to an MTCD, on which a concentration process is performed, occurs, the MME transmits a paging message to a HeNB with the capability of performing a concentration process. In a case where paging directed to an MTCD, on which a concentration process is performed, occurs, the MME does not transmit a paging message to a HeNB without the capability of performing a concentration process.

A specific example in which an MME grasps the capability of performing a concentration process by a HeNB being served thereby is disclosed below. With the third modification of the first embodiment described above, a HeNB notifies an MME, SGSN, or the like being a core network of the capability information regarding the concentration process for the data from an MTCD.

Figure 43:
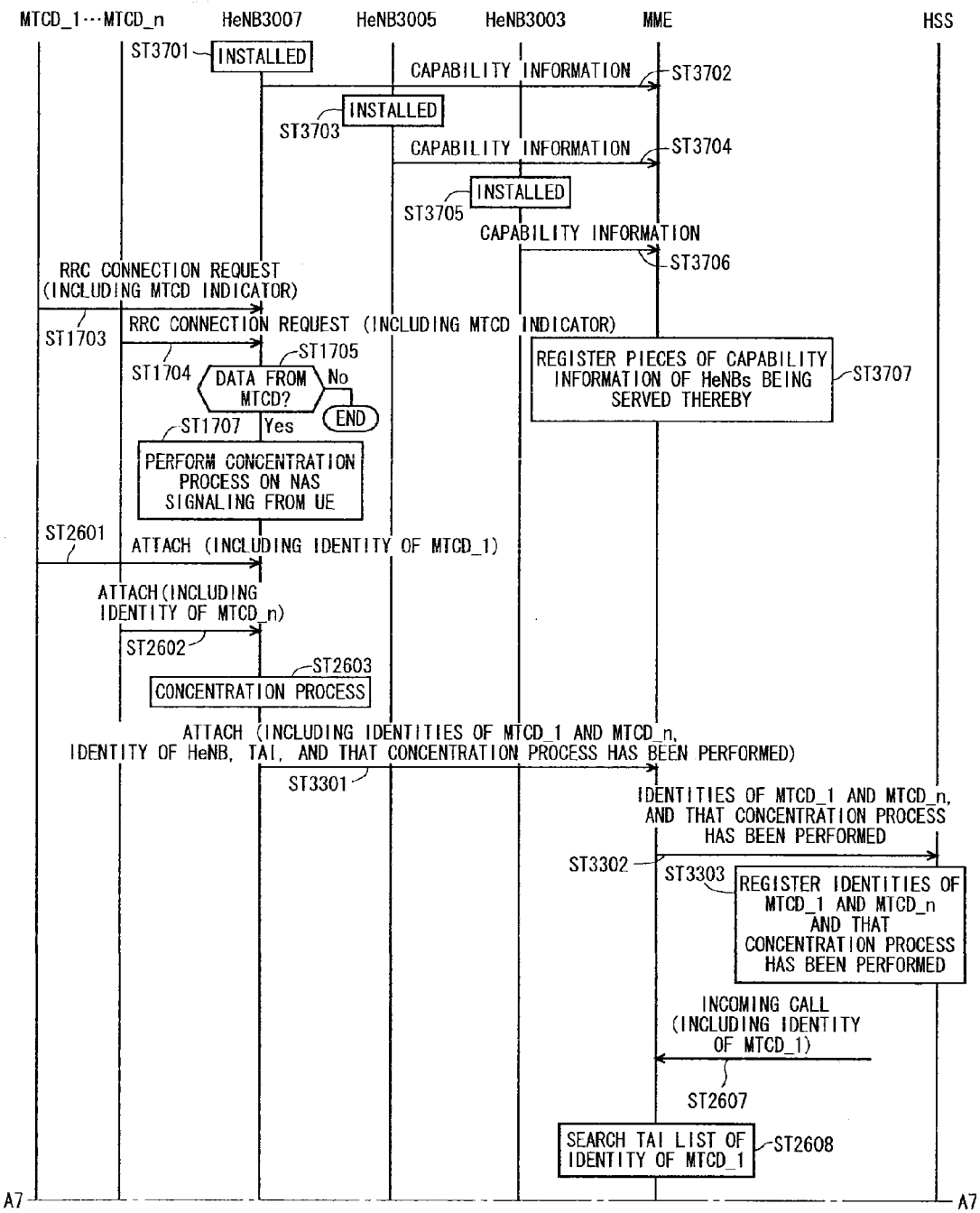
FIG. 43 is a diagram showing a sequence of a mobile communication system in a first modification of the seventh embodiment.
Figure 44:
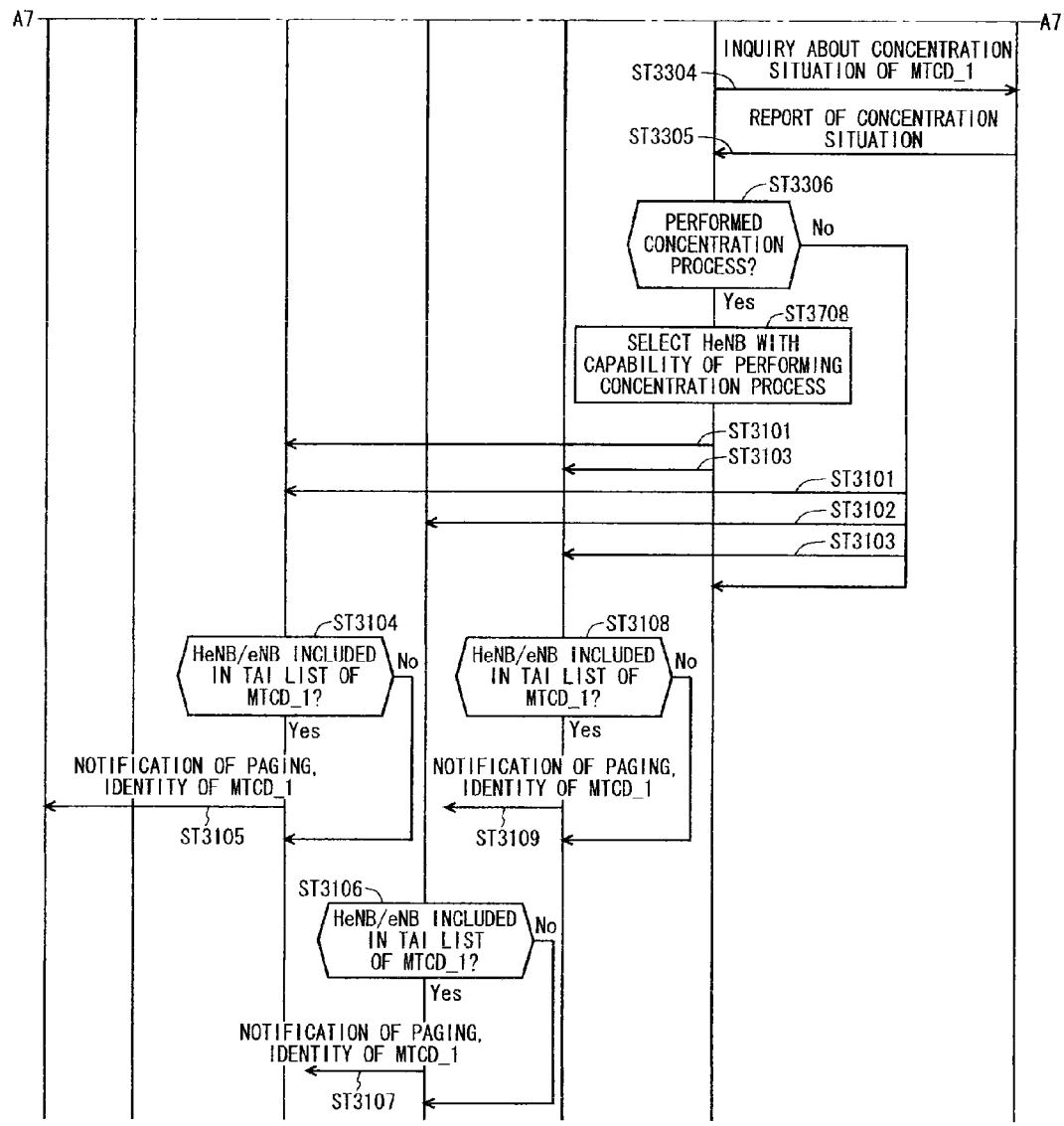
FIG. 44 is another diagram showing the sequence of the mobile communication system in the first modification of the seventh embodiment.

A specific operation example using the first modification of seventh embodiment is described with reference to FIG. 43 and FIG. 44. FIG. 43 and FIG. 44 are diagrams showing a sequence of a mobile communication system in the first modification of the seventh embodiment. FIG. 43 and FIG. 44 are continuous from each other at a position of a boundary A7. The steps of FIG. 43 and FIG. 44 corresponding to the steps shown in FIG. 17, FIG. 26, FIG. 31, FIG. 32, FIG. 35, and FIG. 36 are denoted by the same reference symbols, and the common description is not given here.

In this operation example, description is given with reference to the location diagram shown in FIG. 30 above. The HeNB 3003 and the HeNB 3007 are HeNBs with the capability of performing a concentration process, and the HeNB 3005 is a HeNB without the capability of performing a concentration process. The user equipment 3009 is an MTCD and the MTCD identity is MTCD_1. As a specific example of the timing at which a HeNB notifies a core network of the capability information regarding the concentration process, a time when a HeNB is installed is disclosed. As a specific example of the timing of registering with a core network that a HeNB performs a concentration process, a case of concentrating attach messages of MTCDs is disclosed. In addition, a case in which a specific example of the entity for registration is an HSS is disclosed. Further, a case in which the third embodiment is executed is disclosed.

In Step ST3701, the HeNB 3007 is installed. In Step ST3702, the HeNB 3007 notifies the MME of the capability information regarding the concentration process by the HeNB 3007.

In Step ST3703, the HeNB 3005 is installed. In Step ST3704, the HeNB 3005 notifies the MME of the capability information regarding the concentration process by the HeNB 3005.

In Step ST3705, the HeNB 3003 is installed. In Step ST3706, the HeNB 3003 notifies the MME of the capability information regarding the concentration process of the HeNB 3003.

In Step ST3707, the MME registers and manages pieces of capability information of the HeNBs being served thereby. In registration and management, the capability information is associated with the HeNB identity.

In Step ST3306, the MME judges whether or not that the concentration process has been performed on the MTCD_1 based on the concentration situation report received in Step ST3305. In a case of judging that the concentration process has been performed on the MTCD_1, the MME moves to Step ST3708. In a case of judging that the concentration process has not been performed on the MTCD_1, the MME moves to Step ST3101. In this operation example, the concentration process has been performed on the MTCD_1, and it is reported that the concentration process is performed in Step ST3305. Therefore, the MME judges that the concentration process has been performed on the MTCD_1 and moves to Step ST3708.

In Step ST3708, the MME selects a HeNB with the capability of performing a concentration process from HeNBs being served thereby. The information registered in Step ST3707 may be used in the selection. In this operation example, the HeNB 3003 and the HeNB 3007 are selected as HeNBs with the capability of performing a concentration process. Meanwhile, the HeNB 3005 is not selected as a HeNB with the capability of performing a concentration process. The MME transmits a paging message to the HeNBs with the capability of performing a concentration process and does not transmit a paging message to the HeNB without the capability of performing a concentration process.

Accordingly, in Step ST3101, the MME notifies the HeNB 3007 of paging directed to the MTCD_1. This paging includes the tracking area list of the MTCD_1 and the identity of the MTCD_1. In Step ST3103, the MME notifies the HeNB 3003 of the paging directed to the MTCD_1. This paging includes the tracking area list of the MTCD_1 and the identity of the MTCD_1. The MME does not notify the HeNB 3005 of the paging directed to the MTCD_1. In FIG. 36, the MME notifies the HeNB 3005 of the paging message that is not notified, as shown in Step ST3102. The present embodiment can reduce unnecessary communication as shown in Step ST3102 of FIG. 36.

Meanwhile, in a case where the MME judges that the concentration process has not been performed on a user equipment to which an incoming call had been made in Step ST3306, in Step ST3101, the MME notifies the HeNB 3007 of the paging directed to the MTCD_1. This paging includes the tracking area list of the MTCD_1 and the identity of the MTCD_1. In Step ST3102, the MME notifies the HeNB 3005 of the paging directed to the MTCD_1. This paging includes the tracking area list of the MTCD_1 and the identity of the MTCD_1. In Step ST3103, the MME notifies the HeNB 3003 of the paging directed to the MTCD_1. This paging includes the tracking area list of the MTCD_1 and the identity of the MTCD_1.

While the present modification has mainly described an example in combination with the third embodiment, the present modification can be used also in combination with the fourth embodiment.

The first modification of the seventh embodiment can achieve the following effects in addition to the effects of the seventh embodiment. In a case of receiving a paging message directed to an MTCD on which a concentration process is performed, the MME transmits a paging message to a HeNB with the capability of performing a concentration process. This enables to reduce the notification of the paging directed to the MTCD, on which a concentration process is performed, for a HeNB without the capability of performing a concentration process. An MTCD, to be served by a HeNB without the concentration processing capability, on which a concentration process is performed will not be located. This enables to reduce only the notification of unnecessary paging for a HeNB and effectively use radio resources while preventing an oversight of incoming calls. Accordingly, the processing load of an MME or a HeNB without the capability of performing a concentration process can be reduced.

Second Modification of Seventh Embodiment

A problem to be solved by a second modification of the seventh embodiment is described below. In the case where the seventh embodiment, the following problem occurs. The problem is described with reference to FIG. 35 and FIG. 36. The use of the seventh embodiment enables to reduce the notification of paging directed to an MTCD, on which a concentration process is performed, by a HeNB without the capability of performing a concentration process. Meanwhile, paging directed to a HeNB to an MTCD, on which a concentration process is not performed, is still notified as shown in Step ST3103 and Step ST3109 in FIG. 36. The meaningless paging transmission has a problem that radio resources cannot be used effectively and interference occurs.

A solution in the second modification of the seventh embodiment is described below. A HeNB registers the identity of a HeNB that has performed a concentration process with an MME, HSS, or the like being a core network, together with an MTCD identity.

In a case where paging directed to an MTCD occurs as in the seventh embodiment, a paging message contains the identity of the HeNB that has performed a concentration process. In a case where a HeNB receives the paging message containing the identity of the HeNB that has performed a concentration process, the HeNB transmits the paging message if the identity of the HeNB is that of the own HeNB.

A specific example of the timing at which a HeNB registers the identity of the HeNB that has performed a concentration process with the core network is similar to a specific example of the "timing of registering with a core network that a HeNB performs a concentration process" in the seventh embodiment, which is not described here.

Specific examples of the timing at which a core network deletes the registration of the identity of the HeNB that has performed a concentration process include a time of receiving "Detach procedure" from an MTCD.

A specific example of the registration method is described below. The identity of the HeNB that has performed a concentration process is stored in association with the MTCD identity.

A specific example of an entity for registration is similar to that of the seventh embodiment, which is not described here. A specific example of the method of causing a paging message to contain the identity of the HeNB that has performed a concentration process when paging has occurred is similar to a specific example of the method of causing a paging message to contain the information indicating that a concentration process has been performed when paging has occurred in the seventh embodiment, which is not descried here.

Alternatively, as in the first modification of the seventh embodiment, when paging directed to an MTCD on which a concentration process is performed occurs, an MME transmits a paging message to a HeNB that has performed a concentration process. In a case where paging directed to an MTCD on which a concentration process is performed occurs, an MME does not transmit a paging message to HeNBs other than the HeNB that has performed the concentration process.

The second modification of the seventh embodiment can achieve the following effects in addition to the effects of the seventh embodiment and the first modification of the seventh embodiment.

It is possible to reduce paging directed to an MTCD from a HeNB other than a HeNB that has performed a concentration process. Alternatively, it is possible to reduce paging notification to a HeNB other than the HeNB that has performed a concentration process. An MTCD, to be served by a HeNB other than the HeNB that has performed the concentration process, on which a concentration process is performed will not be located. This enables to reduce only unnecessary paging from a HeNB or the notification of unnecessary paging for a HeNB and effectively use radio resources while preventing an oversight of incoming calls. Accordingly, communication resources can be used effectively. Further, the processing load of an MME or a HeNB without the capability of performing a concentration process can be reduced.

The methods disclosed in the present invention are applicable not only to eNBs/NBs, but also to so-called local nodes such as HeNB, HNB, pico eNB (LTE pico cell (EUTRAN pico cell)), pico NB (WCDMA pico cell (UTRAN pico cell)), and node for hotzone cells. The methods disclosed in the present invention are performed on a local node that supports MTC service, which enables to avoid congestion in a core network.

While the LTE system (E-UTRAN) has been mainly described in the respective embodiments, the communication system of the present invention is also applicable to the W-CDMA system (UTRAN, UMTS) and LTE-Advanced.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS

1301 to 1304 MTCD, 1305 NB/eNB, 1306 SGSN/MME, 1307 HLR/HSS, 1308 MTC server, 1309 MTC user, 1310 API, 1311 to 1314 Uu interface, 1315 IuPS/S1 interface, 1316 Gr/S6a interface, 1317 communication operator domain, 3001, 3010 eNB, 3003, 3005, 3007, 3012, 3014 HeNB, 3002, 3004, 3006, 3008, 3011, 3013, 3015 coverage, 3009 user equipment, 3016 tracking area #1 (TA#1), 3017 tracking area #2 (TA#2).

The invention claimed is:

1. A communication system, comprising:
   a base station device connected to a core network; and
   a plurality of terminal device groups including communication terminal devices connected to said base station device to perform radio communication,
   wherein upon reception of data transmitted from a plurality of said communication terminal devices to said core network, said base station device performs a concentration process of concentrating the received data from said terminal device groups based on whether communication terminal devices in the terminal device groups are delay-tolerant, the base station transmitting data obtained through said concentration process to said core network.

2. The communication system according to claim 1, wherein said base station device transmits the data obtained through said concentration process to said core network in an allowed period predetermined as a period in which transmission is allowed.

3. The communication system according to claim 1, wherein said base station device transmits the data obtained through said concentration process to said core network over allowed resources predetermined as radio resources in which transmission is allowed.

4. The communication system according to claim 1, wherein upon reception of a predetermined message or signal from said communication terminal device, said base station device transmits the data obtained through said concentration process to said core network.

* * * * *